(12) United States Patent
Steenblik et al.

(10) Patent No.: US 6,847,480 B2
(45) Date of Patent: Jan. 25, 2005

(54) LENSES AND USES, INCLUDING MICROSCOPES

(75) Inventors: Richard A. Steenblik, Alpharetta, GA (US); Paula H. Steenblik, Alpharetta, GA (US)

(73) Assignee: Pocketscope.com LLC, Alpharetta, GA (US)

(*) Notice: Subject to any disclaimer, the term of this patent is extended or adjusted under 35 U.S.C. 154(b) by 158 days.

(21) Appl. No.: 09/826,032

(22) Filed: Apr. 3, 2001

(65) Prior Publication Data

US 2002/0044347 A1 Apr. 18, 2002

Related U.S. Application Data

(60) Provisional application No. 60/194,321, filed on Apr. 3, 2000.

(51) Int. Cl.[7] .......................... G02B 21/26; G02B 21/00
(52) U.S. Cl. ..................... 359/368; 359/382; 359/391
(58) Field of Search ................. 359/368–398, 359/800–830, 408–409, 480–482, 466–477

(56) References Cited

U.S. PATENT DOCUMENTS

| | | | | |
|---|---|---|---|---|
| 2,943,409 A | * | 7/1960 | Maiershofer | 359/804 |
| 3,450,458 A | * | 6/1969 | Potrzuski | 359/368 |
| 3,656,840 A | * | 4/1972 | Smith et al. | 359/804 |
| 4,095,874 A | * | 6/1978 | Wallace | 359/368 |
| 4,435,912 A | * | 3/1984 | Adrian et al. | 40/365 |
| 4,483,589 A | * | 11/1984 | Emmel | 359/821 |
| 4,486,078 A | * | 12/1984 | Hashimoto et al. | 359/381 |
| 4,568,148 A | * | 2/1986 | Onanian | 359/368 |
| 4,729,635 A | * | 3/1988 | Saferstein et al. | 359/368 |
| 4,737,016 A | * | 4/1988 | Russell et al. | 359/368 |
| 5,040,873 A | | 8/1991 | Takamatsu et al. | 359/808 |
| 5,062,697 A | * | 11/1991 | Mitchell | 359/368 |
| 5,267,087 A | | 11/1993 | Weidemann | 359/801 |
| 5,515,201 A | | 5/1996 | Omi | 359/385 |
| 5,572,370 A | | 11/1996 | Cho | 359/801 |
| 5,731,893 A | | 3/1998 | Dominique | 359/329 |
| 5,742,419 A | | 4/1998 | Dickensheets et al. | 359/201 |
| 5,818,634 A | * | 10/1998 | Richard et al. | 359/565 |
| 5,844,714 A | | 12/1998 | DiResta | 359/368 |
| 5,880,879 A | | 3/1999 | Foo | 359/356 |
| 5,886,813 A | * | 3/1999 | Nagasawa | 359/383 |
| 6,404,565 B2 | * | 6/2002 | Russell | 359/804 |

FOREIGN PATENT DOCUMENTS

WO    WO 01/75502    10/2001

OTHER PUBLICATIONS

Ford, Brian J., "Single Lens: The Story of the Simple Microscope," *Harper & Row*, Publishers, New York, First American Edition (1985), pp. 19, 21, 39, 40.

Ingalls, Albert G., "the Amateur Scientist" column, Scientific American, Jan. 1953, pp. 80–83.

(List continued on next page.)

Primary Examiner—Thong Q. Nguyen
(74) Attorney, Agent, or Firm—James L. Ewing, IV; Michael A. Bertelson; Kilpatrick Stockton LLP

(57) ABSTRACT

A portable single lens microscope that provides structure between the eye and the microscope slide, preferably including a single lens having an aperture optimized to attain the best image resolution, preferably including a focus mechanism, preferably including a slide holding and moving mechanism, and preferably including a slide position locking mechanism, or any combination of these structures and mechanisms. Methods are disclosed for determining an optimum aperture size for a single lens microscope (and other uses) including a lens of any type, and methods are disclosed for designing a single lens microscope lens system that provides superior image quality. A single lens microscope according to the present invention can provide substantial and unexpected imaging benefits over previous single lens microscopes and compound microscopes.

48 Claims, 30 Drawing Sheets

OTHER PUBLICATIONS

Shinn, Alan, "To Make a van Leeuwenhoek Microscope Replica," May 16, 1996, pp. 1–8.

Carboni, Georgia, Glass–Sphere Microscope, Jan. 1996 pp. 1–19.

PS–150 Pocketscope™ Microscope Brochure, "Exploring New Worlds From the Palm of Your Hand"™ 5 pages (2000).

PS–150 Pocketscope™ Microscope User Manual, 8 pages (2000).

PS–150 Pocketscope™ Microscope Brochure, "Exploring New Worlds From the Palm of Your Hand"™ postcard advertisement (2 pages) (2001).

* cited by examiner (A)

(B)

(C)

LENSES AND USES, INCLUDING MICROSCOPES

This Application claims the benefit of Provisional Application No. 60/194,321, filed Apr. 3, 2000.

BACKGROUND OF THE INVENTION

1. Field of the Invention

This invention includes aspects of lens design for use in microscopes and fiberoptics applications, among other uses, single lens microscope lens optimization processes, single lens microscope lens designs, single lens microscope structures, single lens microscope focusing structures, slide holding and moving structures, slide position locking structures, multiple lens single lens microscope designs, illumination numerical aperture control mechanisms and processes for single lens microscopes, depth of field control mechanisms and processes for single lens microscopes, LED based illumination techniques for single lens microscopes, and photomicrography techniques for single lens microscopes.

Prominent structures, mechanisms, and techniques of the invention include hand-held portable single lens microscopes and their optical systems, designed to facilitate ease of use, to enhance safety, and to provide superior quality images over previous single lens microscopes.

2. Discussion of the Prior Art

Hand-held single lens microscopes are known in the prior art. The single lens microscope has existed in rather crude form since before the time of the great English scientist Robert Hooke, c.1640. Hooke seems to have been the first to have described the single lens microscope in print. In 1667, Hooke published his groundbreaking book *Micrographia*, stating in the preface:

> If one of these lenses [a thin fiber of glass melted to form a small bead and polished with jeweler's polish] be fixed with a little wax against a needle hole pricked through a thin plate of Brass, Lead, Pewter or any other metal, and an object be placed very near be looked at through it, it will both magnify and make some objects more distinct than any of the large microscopes.

Since the compound microscopes of Hooke's time were very crude, even a crudely made single lens microscope would produce superior results. It was apparently from this account by Hooke that Leeuwenhoek learned how to make single lens microscopes.

Antony van Leeuwenhoek, of Delft, Holland, refined the early single lens microscope in the period from 1668 to 1715 by improving the spherical form of the lens and by reducing its size to attain higher magnifications. His microscopes were created before the advent of the microscope slide, so their design was not suited to modem application. Since Leeuwenhoek never documented his lens design methods, the only information we have regarding his lenses has come from recent examination and testing of the nine remaining Leeuwenhoek microscopes by British scientist Brian J. Ford. (The Leeuwenhoek Legacy, Brian J. Ford, Biopress and Farrand Press, 1991, ISBN 185083016 9). Ford concludes that Leeuwenhoek's lenses were either formed by melting the tip of a glass fiber in a flame, thereby creating a droplet of glass with a shape approximating a sphere (referred to as a 'fused lens'), or by forming a pointed glass bulb and melting the tip to form a droplet having a non-spherical unmatched pair of surfaces. This latter lens would take the form of some kind of double convex asphere, but the actual shape of the lens is largely uncontrolled, being formed by gravity, surface tension, and the physical details of the surrounding glass.

Most of Leeuwenhoek microscopes used hand-made glass lenses of roughly spherical figure held between thin metal plates, bearing crudely fashioned apertures, and attached to a screw mechanism designed to hold unmounted specimens. The design of a Leeuwenhoek microscope is impractical for use with modem microscope slides, and the lenses of Leeuwenhoek's manufacture, while remarkable for the time, were far from optimal. Furthermore, given the crudeness and irregularity of the lens apertures in the remaining Leeuwenhoek microscopes, there is no indication that Leeuwenhoek understood how to optimize the aperture of his single lens microscopes to provide the best image resolution.

During the period from 1810 to 1900 single lens microscopes were designed for use with microscope slides, but they never attained the image quality and magnifying power of Leeuwenhoek's instruments. They were awkward to use, having been patterned after the form of the compound microscope, and they soon fell into disfavor as scientists and naturalists turned to the compound microscope.

Hooke's instructions for making a single lens microscope simply refer to the use of a 'needle hole' of unspecified diameter. Neither Leeuwenhoek nor Ford have taught the need for lens aperture optimization, nor any method to do so. Three articles have been found that provide instructions for constructing a single lens microscope; none disclose an understanding of lens aperture optimization. (Build a Homemade Microscope", C. L. Stong, The Amateur Scientist column, Scientific American, Jun. 1954, pg. 98; "To Make a van Leeuwenhoek Microscope Replica", Alan Shinn, May 1996, at http://www.sirius.com/~alshinn/Leeuwenhoekplans.html on the Internet; "Glass—Sphere Microscope", Giorgio Carboni, Jan. 1996, at http://www.funsci.com/funsci.com/fun3en/usph/usph.htm on the Internet. In fact, the lens aperture suggestions provided in all three of the articles are seriously incorrect, yielding image resolutions with full aperture illumination that are very far from optimum.

Like Hooke, the Stong article simply refers to a 'small' hole to be used as the lens aperture. The Shinn article specifies a 1 mm aperture without regard for the diameter of a hand-made fused lens. Shinn has also stated, in private correspondence, that he prefers to use a 2 mm diameter BK-7 ball lens with a 1 mm aperture. Shinn's microscope is a replica of a Leeuwenhoek microscope, typically used with unmounted specimens, without a modem microscope cover glass over the specimen. The inventor has determined an optimized aperture diameters for a 2 mm diameter BK-7 ball lens to be 0.655 mm for 550 nm green light (the standard wavelength for computing resolution), providing a resolution of 1.3 microns, and 0.567 mm for polychromatic illumination (at the standard F, d, and C wavelengths) also providing a resolution of 1.3 microns. At Shinns specified aperture of 1 mm, aberrations limit the resolution to 15.0 microns and 11.2 microns for green and polychromatic illumination, respectively.

Carboni specifies a lens diameter of 1.2–2.5 mm and an aperture of 1.2 mm, used with microscope slides having cover glasses. The best performance for the specified aperture diameter would be with a 2.5 mm diameter lens. The resolution limit, at an illumination wavelength of 550 nm, of a 2.5 mm BK-7 ball lens with an optimized aperture of 0.780 mm, determined by application of the aperture optimizing methods described herein, is 2.0 microns. Carboni's specified 1.2 mm aperture limits the resolution of this lens to 10.6 microns.

Another hand-held single lens microscope is disclosed in U.S. Pat. No. 4,729,635. This design incorporates 'lens beads' of unspecified optical figure mounted in a clamp-like unit. Focusing is accomplished by pivoting one clamp component about the center of the other clamp component with finger pressure, thereby adjusting the distance between the lens and the slide.

U.S. Pat. No. 4,095,874 also discloses a hand-held single lens microscope which utilizes finger pressure to accomplish focusing by deflection of one cantilevered part bearing the spherical lens and a second cantilevered part holding the slide. The two parts are resiliently joined along a common edge. The two parts partially enclose the slide when the unit is in use, but the slide cannot be repositioned while it is being viewed. These microscopes lack optimized lens design, aperture optimization, a precise and stable focus device or mechanism, a versatile slide holding and moving device or mechanism, an external slide position control device or mechanism, a slide position locking device or mechanism, an aperture for illumination collimation control, and complete protection of the user from the sharp edges of the slide and from the pieces of a broken slide.

U.S. Pat. Nos. 4,737,016 and 5,844,714 disclose portable microscopes having a form reminiscent of Leeuwenhoek's microscopes. These designs incorporate low magnifying power lenses in a handle combined with various detachable devices for holding both unmounted specimens and standard microscope slides. Focus is accomplished by pivoting or sliding the specimen holding means closer or further from the lens. No specification is made regarding the type of lens to be used. These microscopes lack optimized lens design, aperture optimization, a precise and stable focus device or mechanism, a slide position locking device or mechanism, an aperture for illumination collimation control, and complete protection of the user from the sharp edges of the slide and from the pieces of a broken slide.

U.S. Pat. Nos. 5,572,370 and 5,267,087 disclose simple, low magnification microscopes intended for use in determining a woman's fertile periods. These instruments are not intended for use with standard specimen slides nor for general microscopic use. The overall form of these microscopes is cylindrical and internal illumination is provided by means of battery powered light sources. There is no provision to utilize ambient light for specimen illumination. These microscopes lack optimized lens design, aperture optimization, a precise and stable focus device or mechanism, a versatile slide holding and moving device or mechanism, an external slide position control device or mechanism, compatibility with standard microscope slides, a slide position locking device or mechanism, and an aperture for illumination numerical aperture control. The overall form, function, and intention of these microscopes are completely different from those of microscopes according to this invention.

U.S. Pat. No. 5,880,879 discloses a microscope objective lens system utilizing a diffractive optical element for chromatic aberration correction. This lens system is not a singlet, single element, lens, but rather a two lens system with an aperture stop in between. One example of a lens designed for microscopes according to the present invention is a singlet lens incorporating both aspheric and diffractive surfaces.

Inexpensive microscopes providing high image quality are needed for education, Third World medicine, scientific field research, and field medicine. These disciplines would benefit from application of single lens microscopes according to the present invention, since they can be low in cost, durable, and portable. Furthermore, single lens microscopes according to the present invention are suitable for use with conventional microscope slides, can provide high image quality at microbiologically and medically useful magnification using aperture optimized lenses, can provide protection from the sharp edges of intact or broken microscope slides, can provide a precise and stable focus device or mechanism, can provide a versatile slide holding and moving device or mechanism, can provide an external slide position control device or mechanism, can provide a slide position locking device or mechanism, can provide an aperture or a multiplicity of apertures for illumination numerical aperture control, can be simple and safe to use, and can use a variety of available light sources for illumination.

Definitions

Aberration: A departure of an optical image-forming system from an ideal behavior.

Achromatic lens: A lens that brings two colors of light, typically red and blue, to substantially the same focal point Aperture stop: The optical component that limits the size of the maximum cone of rays from an axial object point that can be processed by an entire optical system. Examples include the diaphragm of a camera and the iris of the human eye.

Apochromatic lens: A lens that brings three colors of light, typically red, green, and blue, to a substantially common focus and is often considered to also be spherical aberration corrected for two of these wavelengths.

Aspheric: An optical surface having a non-spherical form, generally described mathematically by a polynomial equation.

BK-7 glass: A common optical glass often used to make ball lenses. It is a desirable glass because it has low chromatic dispersion and thus lenses made from BK-7 glass have low chromatic aberration.

Center-to-center thickness error: Deviation of the actual thickness of a lens, as measured from the center of one optical surface to the center of the second optical surface, from the designed center-to-center thickness.

Chromatic aberration: The variation of focus with wavelength. Chromatic aberrations are caused by the fact that the refraction law determining the path of light through an optical system contains the refractive index n, which is a function of wavelength λ. Thus the image position and the magnification of an optical system are not necessarily the same for all wavelengths, nor are the aberrations the same for all wavelengths.

Compound microscope: A microscope that includes an objective lens system and an eyepiece lens system, wherein the objective lens system forms a magnified real image of a microscope specimen and the eyepiece lens system further magnifies this image, presenting a virtual image to the eye. The virtual image formation is thus indirect, being the result of a two step process with an intermediate real image. The total magnification of a compound microscope is the product of the magnification of the objective lens system and the eyepiece lens system. A compound microscope may incorporate as many as 30 lens elements in one objective/eyepiece pair.

Concave surface: A lens which has either one or both sides arched in toward the center; if both the lens is said to be double concave. A lens surface which is thicker at its edges than at its center, like )(.

Convex surface: Vaulted; arched; having a surface that curves outward, like the surface of a sphere; a lens surface which is thicker at its center than at its edges, like ( ).

Decentration error: Non-zero linear displacement between the axes of rotational symmetry of one two or more optical surfaces.

Depth of field: The distance limits along the optic axis above and below the focal plane of a lens at which the Modulation Transfer Function of the image drops below the threshold of visibility for a selected spatial frequency.

Diffractive optic (kinoform): A surface structure that can control the properties of light by means of diffraction. Diffractive optics are similar to holograms and diffraction gratings in that small grooves or lines across the optical surface impart a change in phase of the wavefront passing through the surface. Kinoforms can be incorporated into the refractive surfaces of lenses, providing an additional means for correcting aberrations.

Doublet: A lens incorporating two lens elements, usually made from different materials. The two lens elements may be physically separated, called air-spaced, so that they have four optical surfaces, or they may be cemented, such that they have two external optical surfaces and one internal optical surface.

Even asphere formula: Rotationally symmetric polynomial aspheric surfaces are commonly described by a polynomial expansion of the deviation from a spherical (or aspheric described by a conic) surface. The even asphere surface model uses only the even powers of the radial coordinate to describe the asphericity. The model uses the base radius of curvature and the conic constant. The surface sag is given by Eq. 1:
$$z = \frac{cr^2}{1+\sqrt{(1-(1+k)c^2r^2)}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where Z is the surface sag,

R is the base radius of curvature of the lens, c=1/R, k is the conic constant, $\alpha_I$ are coefficients on powers of r and r is the radial lens position.

Field stop: The aperture in an imaging system that limits the field of view. This may be the same as the aperture stop or it may be different.

Flat field: A lens having a focal surface which is substantially planar is said to be a flat field lens.

Gradient index lens: A lens made from a material that has a non-uniform refractive index. Gradient index materials typically have refractive index which is a function of the radial position from the optic axis of the lens.

Huygens point spread function (PSF): The Huygens PSF computes the intensity of the diffraction image formed by the optical system of a single point source located a particular field position. One way of considering the effects of diffraction is to imagine each point on a wavefront as a perfect point source with an amplitude and phase. Each of these point sources radiates a spherical "wavelet", sometimes called a "Huygens wavelet" after Huygens, who first proposed the model. The diffraction of the wavefront as it propagates through space is given by the interference, or complex sum, of all the spherical wavelets radiated.

Meniscus lens: A lens having one concave surface and one convex surface.

Like ( (.

Modulus of the optical transfer function (MTF): The ratio of the intensity modulation in the image to that in the object as a function of the frequency (cycles/mm) of the sine-wave object pattern. MTF is a measure of image contrast and sharpness of focus. A plot of MTF against spatial frequency v is an universally applicable measure of the performance of an image-forming system. It is defined as:

Eq. 2:
$$MTF(v) = \frac{(Max_i - Min_i)/(Max_i + Min_i)}{(Max_o - Min_o)/(Max_o + Min_o)}$$

Where:

$Max_i$=maximum image intensity $Min_i$=minimum image intensity $Max_o$=maximum object intensity $Min_o$=minimum object intensity Numerical aperture (NA): The index of refraction (of the medium in which the imaged object lies) times the sine of the half angle of the cone of illumination. Numerical aperture is used for systems that work at finite conjugates (such as microscope objectives).

$$NA = n \sin U \qquad \text{Eq. 3:}$$

Where:

n=refractive index of the medium containing the object

U=half angle of the cone of illumination

Planapo: Short for Plano Apochromat, a flat-field microscope objective lens that is chromatic aberration corrected for three colors and spherical aberration corrected for two colors.

Rayleigh criterion for resolution: The theoretically limiting resolution of an aberration-free optical system, defined to be the minimum distance between two objects at which they can be distinguished as separated images:

Eq. 4:
$$Z = \frac{0.61 \sum}{NA}$$

At this limit of resolution, the two images are seen as being separated by a line which has an intensity equal to 74 percent of the peak intensity of the images. The Rayleigh criterion sets the theoretically best resolution for a lens of a given aperture. The performance of an actual lens will be degraded from this limit because of aberrations. The Rayleigh criterion is usually determined at a wavelength of $\bar{e}$=0.550 micron.

Resolution limit: The actual minimum distance between two objects at which they can be distinguished as separated images by a lens. This is different from the Rayleigh criterion because it accounts for the lens aberrations.

Real image: An image, formed by converging rays, which appears to be located at a point in space on the opposite side of a lens from the object. A real image can be focused on a screen without the need for reimaging by a second lens.

Single lens microscope: A microscope that utilizes a single optical system to directly form a magnified virtual image of a microscope specimen and to present it to the eye, or to directly form a real image onto an image recording device, such as photographic film. The lens system may consist of a singlet, containing one lens element, or it may consist of composite lens containing a multiplicity of lens elements, either air-spaced, cemented, or in combination. The single lens microscope is sometimes referred to as a 'simple' microscope, meaning that it has one lens.

Singlet: A lens incorporating two optical surfaces separated by a thickness of a single material.

Spatial frequency: The period of a black and white sine wave pattern, measured in terms of cycles per mm, which is used as a standard object for evaluating the Modulation Transfer Function performance of imaging systems.

Spheric: an optical surface having the form of a portion of a sphere.

Spherical aberration: (aperture aberration) can be defined as the variation of focus with aperture.

Strehl ratio: The ratio of the actual illumination intensity at the center of the focal spot produced by an imaging system divided by the center of the focal spot illumination intensity of an aberration-free imaging system. The Strehl ratio indicates how closely the performance of an optical system approaches the resolution limit imposed by the Rayleigh criterion. An imaging system having a Strehl ratio of 0.8 is considered to be diffraction limited.

Tilt error: Non-zero angular displacement between the planes normal to the axes of rotational symmetry of one two or more optical surfaces.

Triplet: A lens incorporating three lens elements, usually made from at least two different materials. The three lens elements may be physically separated, called air-spaced, so that they have six optical surfaces, or two elements may be cemented and one air-spaced, such that they have four external optical surfaces and one internal optical surface, or all three elements may be cemented in a stack, such that they have two external optical surfaces and two internal optical surfaces.

Virtual image: An image, formed by diverging rays, which appears to be located at a point in space on the same side of a lens as the object. A virtual image can be seen by imaging it with a positive lens, but it cannot be produced on a screen.

This invention includes a number of improvements on the single lens microscope. The design, utility, and optics of single lens microscope have not been significantly improved on since about 1700. Shortly after its initial development period, the single lens microscope was quickly replaced by the compound microscope, even though the image quality of the early single lens microscopes was superior to compound microscopes produced as late as 1850.

Short of the primitive technologies of survival, it can be argued that no development has had a greater impact on the improvement of humanity than the microscope. By means of the microscope bacteria and other pathogens were discovered, the germ theory of disease was developed, methods were developed to diagnose diseases, and methods were discovered to control pathogens. Microscopes are essential tools of modern science education, medical and veterinary training, nursing training, medical diagnosis, industrial inspection, and sciences of every persuasion.

In spite of their importance, the availability and use of high quality microscopes is limited by several factors. High quality compound microscopes are expensive, delicate, heavy instruments intended for use on a table or bench in a controlled, clean laboratory environment. Most modern compound microscopes also require AC electric power for their illumination system. Conventional compound microscopes used in schools often require dedicated facilities, including a special room equipped with dedicated work tables and electrical power drops.

The high cost, complexity, and fragility of high quality compound microscopes have limited their use in primary and secondary education. With the exception of high school biology laboratories, it is typical for schools in the United States to have just a few microscopes per school, usually with a single microscope in a classroom. Having only one microscope for a classroom of students creates a difficult classroom control problem for a teacher since she must attend to the student using the microscope while leaving the rest of the class unwatched. Compound microscopes are also difficult for children to learn to use, in part because the inverted images they produce are confusing; moving the slide in one direction results in the movement of the image in the opposite direction, making it nearly impossible to follow moving subjects.

In addition, teachers often hesitate to use conventional microscopes because of the risk of injury to the students from broken glass slides. Existing microscopes do not provide any protection to the student from the sharp edges of an intact microscope slide, nor do they provide protection from the razor-sharp edges of a broken slide. Furthermore, it is easy for a student to damage a costly microscope by running an objective lens into a slide, breaking the slide and scratching the lens. In developing nations the scarcity of microscopes is far worse.

A fundamental element of a modem education is missing for most students because of the high cost and limitations of conventional compound microscopes. The quality of education worldwide could be improved if a low cost, high resolution, durable and safe microscope was available.

An urgent need also exists for medical microscopes in developing nations; conventional laboratory microscopes are unsuitable for use in field medicine The conditions encountered by doctors in third-world refugee camps, unpowered rural villages, war zones, shantytowns, congested cities and slums are far from ideal. Even if they can afford a compound microscope suitable for medical work, it is not practical for doctors to carry such a heavy, delicate instrument to places that have no power. As a consequence, many fundamental medical diagnostic tests, such as blood cell counts, pap smears, tissue biopsies, and urinalysis, are not performed.

For example, in Africa there are two predominant strains of malaria; a less virulent strain that is treated with a low cost antimalarial drug, and a more virulent strain that requires treatment with a more expensive drug. The type of malaria infecting a person can be easily determined by microscopic examination of a blood smear, but microscopes are unavailable, so everyone gets treated with the lower cost antimalarial drug. The people with the less virulent strain survive, but those infected with the more virulent strain die. A simple blood smear examined under a suitable microscope could allow doctors to make the right choice to save these people.

It is clear that there is an urgent worldwide need for low cost, lightweight portable, safe, durable, high performance microscopes that do not require electrical power. Devices and microscopes according to the present invention can satisfy this need.

SUMMARY

This invention provides a portable single lens microscope that provides structure between the eye and the microscope slide, preferably including a single lens having an aperture optimized to attain the best image resolution, preferably including a focus mechanism, preferably including a slide holding and moving mechanism, and preferably including a slide position locking mechanism, or any combination of these structures and mechanisms. It includes methods for determining an optimum aperture size for a single lens microscope (and other uses) including a lens of any type, and methods for designing a single lens microscope lens system that provides superior image quality. A single lens microscope according to the present invention can provide substantial and unexpected imaging benefits over previous single lens microscopes and compound microscopes.

DETAILED DESCRIPTION

Figure 1:
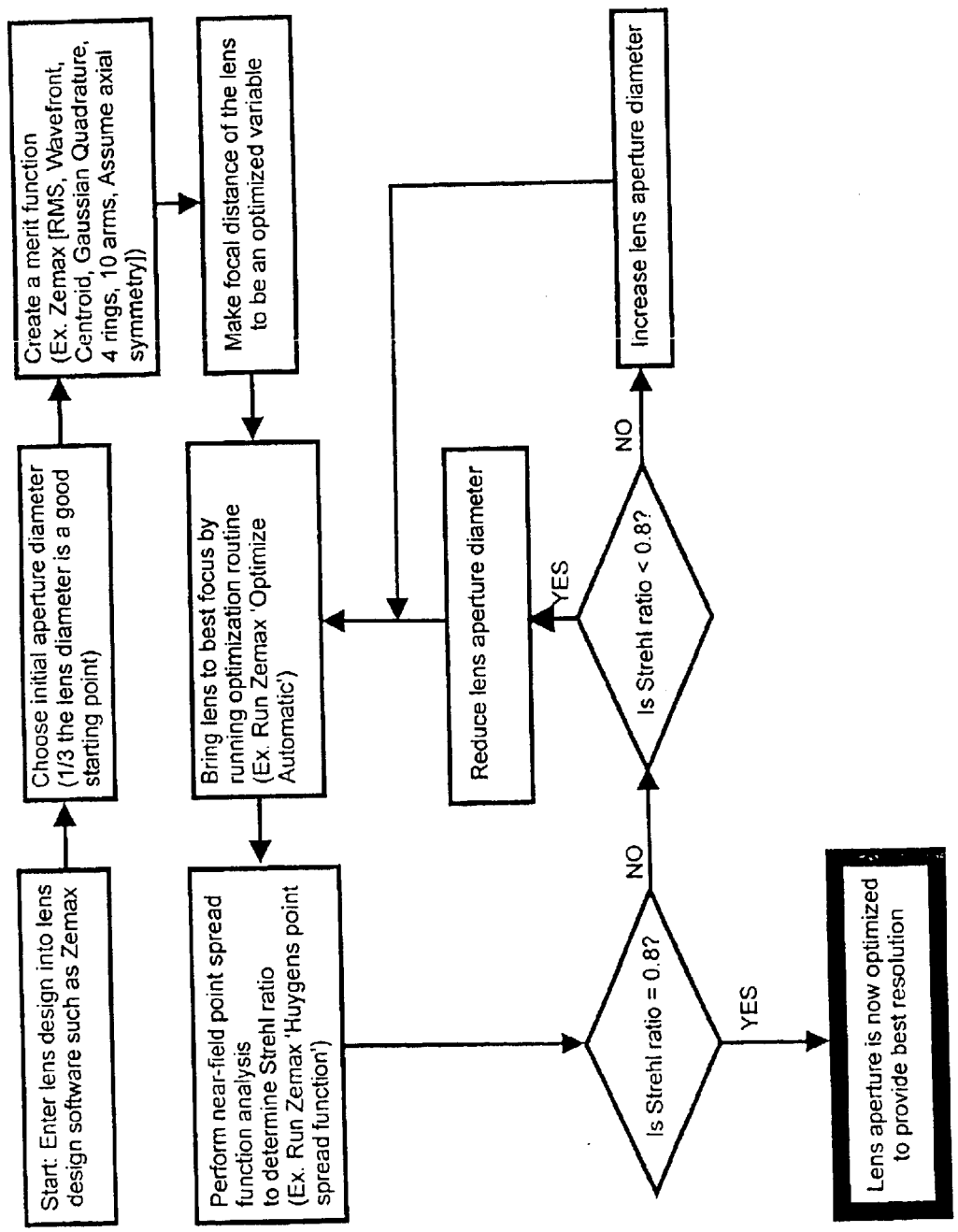
FIG. 1 illustrates one aperture optimizing method according to one embodiment of the present invention.

High magnification single lenses (having a magnification on the order of 40× and greater) suitable for use in a single lens microscope must have very small radii of curvature. Glass has traditionally been the material of choice for lenses, and forming an accurately shaped lens has traditionally required grinding and polishing. Larger lenses are commonly ground and polished to have double convex spheric shape. This is accomplished by fixing a glass disk to a rod-shaped holder and grinding and polishing the lens surface to produce a spherical figure. The lens blank is then removed from the holder, flipped over to expose the unground face, and fixed onto the holder again so the second face may be ground and polished. In order to attain a high quality lens, the two faces of the lens must have their centers of curvature aligned on a common axis, without center to center misalignment (decentration error) or substantial angular misalignment (tilt error), and having their center-to-center spacing (center-to-center thickness error) within the design tolerance. Maintaining these alignments becomes extremely difficult for small, high magnification lenses, so both Leeuwenhoek and modern optical manufacturers have resorted to utilizing polished glass spheres, called ball lenses, for short focal length lenses. Short focal length, high magnification aspheric glass lenses have also been manufactured using compression molding techniques, but these lenses have historically been far more expensive than ball lenses, making them less desirable.

Well-made ball lenses do not suffer from surface misalignment errors because they are not made one surface at a time. Ball lenses are manufactured in a manner similar to ball bearings, wherein a large number of ball lens blanks are polished at the same time between polishing plates. Progressively finer grades of polishing slurry keep grinding the rolling balls into finer and finer spheres, with all parts of the sphere being repeatedly rolled against the plates. Modem ball lenses achieve an extremely high degree of precision, commonly differing from the ideal spherical form by less than one part in 15,000. Ball lenses are used extensively for fiber optic coupling and for launching optical signals into optical fibers.

Spherical lens surfaces suffer from a number of optical aberrations, including spherical aberration and chromatic aberration, which increase as the numerical aperture (NA) of the lens is increased. The resolution limit of a microscope lens depends on its aberrations and on the Rayleigh limit set by the NA of the lens. The NA of a single lens is controlled by the size of the aperture stop, usually located at the surface of the lens nearest the observer's eye.

The present invention provides general methods to determine optimized aperture diameters for single lens microscopes that can be applied to any type of lens. Methods are disclosed as they are applied to the performance optimization of BK-7 glass ball lenses, but the aperture optimization methods can be applied to any kind or type of lens utilized for a single lens microscope, including: a plano/spheric convex lens, a plano/aspheric convex lens, a plano/diffractive lens, a plano/diffractive-spheric convex lens, a plano/diffractive-aspheric convex lens, a diffractive plano/spheric convex lens, a diffractive plano/aspheric convex lens, a double convex spheric/spheric lens, a double convex spheric/aspheric lens, a double convex aspheric/aspheric lens, a double convex diffractive-spheric/aspheric lens, a double convex spheric/diffractive-aspheric lens, a double convex aspheric/diffractive-aspheric lens, a double convex diffractive-aspheric/diffractive-aspheric lens, a spheric/spheric meniscus lens, a spheric/aspheric meniscus lens, an aspheric/aspheric meniscus lens, a diffractive/diffractive mensicus lens, a diffractive-spheric/spheric meniscus lens, a diffractive-spheric/diffractive-spheric meniscus lens, a diffractive-spheric/aspheric meniscus lens, a spheric/diffractive-aspheric meniscus lens, an aspheric/diffractive-aspheric meniscus lens, a diffractive-aspheric/diffractive-aspheric meniscus lens, a lens of any of the previously listed types fabricated from a gradient refractive index material, a doublet lens of any figure and any combination of the elements piano, spheric, aspheric, a gradient refractive index material, and diffractive, a triplet lens of any figure and any combination of the elements piano, spheric, aspheric, a gradient refractive index material, and diffractive, and any compound lens of incorporating any number of, and any combination of, the elements piano, spheric, aspheric, a gradient refractive index material, and diffractive. In this listing hyphenated terms refer to a surface combining the two elements. Thus a diffractive-aspheric surface has the overall refractive figure of an aspheric surface with a diffractive optical structure superimposed. Similarly, in this listing a slash (/) is used to separate terms referring to different lens surfaces. Thus 'double-convex spheric/aspheric' refers to a double convex lens in which one surface has a spheric figure and the other surface has an aspheric figure.

The aperture optimization methods can be applied to single lens microscopes either used with microscope slides having a cover glass or used with slides not having a cover glass, to single lens microscopes used without microscope slides, and to single lens microscopes used with liquid immersion, among other types. An optimized aperture for a 2.5 mm diameter BK-7 ball lens used without a cover glass is 0.780 mm, slightly larger than an optimized aperture, 0.750 mm, for the same lens when used with a cover glass. Blood smears are commonly examined without a cover glass while permanent mount slides and wet mount slides commonly have a cover glass.

Whatever the form of a lens, there will be a range of optimized lens aperture diameters and optimized numerical apertures to attain the best resolution for a single lens microscope incorporating that lens. The concept of the lens aperture optmizing methods is to balance the refractive aberrations of the lens against the diffractive blurring caused by the lens aperture. From a geometrical optics standpoint, increasing the size of a lens aperture will cause the lens aberrations to degrade the image resolution, while decreasing the lens aperture will reduce aberrations and improve the image resolution. The diffractive blurring introduced by the aperture, measured by the peak height of the Huygen's point spread function, responds in the opposite way; increasing the lens aperture improves the diffraction limited image resolution, while decreasing the lens aperture degrades the diffraction limited image resolution.

One aperture optimizing method finds the lens aperture diameter at which the peak of the aberrated Huygen's point spread function reaches 80 percent of the height of the ideal point spread function. Because the performance of a single lens microscope lens is dominated by the minute size of the lens, it is necessary to use analytical methods which provide accurate diffraction information in the near field. To this end, the Huygens point spread function is generally superior to the Fast Fourier Transform (FFT) point spread function because it exactly models the near field diffraction effects and the FFT does not.

Optimizing the aperture diameter provides the best image resolution for any chosen lens. If the aperture is smaller than the optimized range of values then the image resolution will be reduced by diffraction effects, as required by the Rayleigh criterion. If the aperture is larger than the optimized range of values then the image resolution will be reduced by refractive aberrations.

The methods of this invention for optimizing the aperture of a single lens microscope are most conveniently performed with the aid of an optical design software program such as Zemax. The analyses were performed with the aid of Zemax EE, version 8.1i, running under the Windows 98 operating system on a desktop computer based on a Pentium III microprocessor. While an optical design program such as Zemax simplifies the task of analysis, the aperture optimizing method can be performed by hand using traditional optical analysis methods.

One aperture optimization method, illustrated in FIG. 1, is performed in the following way. Let us assume that we wish to find an optimized lens aperture for a BK-7 glass ball lens 2.5 mm in diameter. First we choose an arbitrary value for the initial lens aperture diameter, say one third of the lens diameter, or 0.83 mm, and enter the lens geometry and the initial aperture value into the lens design software. The object plane of the lens is set to −250 mm, representing a virtual image at that distance, and the ray tracing proceeds backwards, from the image plane through the lens to the object plane. A field diameter of 0.0 (on axis field position) is used with a wavelength of 0.550 micron.

The optimization method used by Zemax and other modern optical design software utilizes a merit function which represents the performance of the lens as a single number. This number represents the weighted sum of the squares of the differences of hundreds or thousands of performance criteria from their target values. The software provides standard merit functions, which are designed to minimize the focal spot size or the wavefront error.

A merit function is created to perform focus optimization. One that works well with ball lenses in Zemax is specified as [RMS, Wavefront, Centroid, Guassian Quadrature, 4 rings, 10 arms, Assume axial symmetry].

Since the lens being optimized has a fixed surface geometry, the focal distance of the lens is tagged as the only optimization variable and the optimization function of the software is executed in order to bring the lens to its best focus. A Huygen's point spread function analysis is then performed to determine the Strehl ratio of the image. If the Strehl ratio is less than 0.8 then the lens aperture diameter is reduced, the lens is optimized again to attain best focus, and the Huygen's point spread function analysis is repeated. If Strehl ratio is greater than 0.8 then the lens aperture diameter is increased, the lens is optimized to attain best focus, and the Huygen's point spread function analysis is repeated. When the Strehl ratio is equal to 0.8 then the lens aperture has been optimized to bring the lens performance to its diffraction limit. The resolution limit of the lens can then be found by calculating the Rayleigh criterion for resolution and dividing it by 0.8. In the case of the 2.5 mm BK-7 ball lens, the aperture optimizes to a value of about 0.780 mm, at the upper end of the best aperture range.

Figure 2:
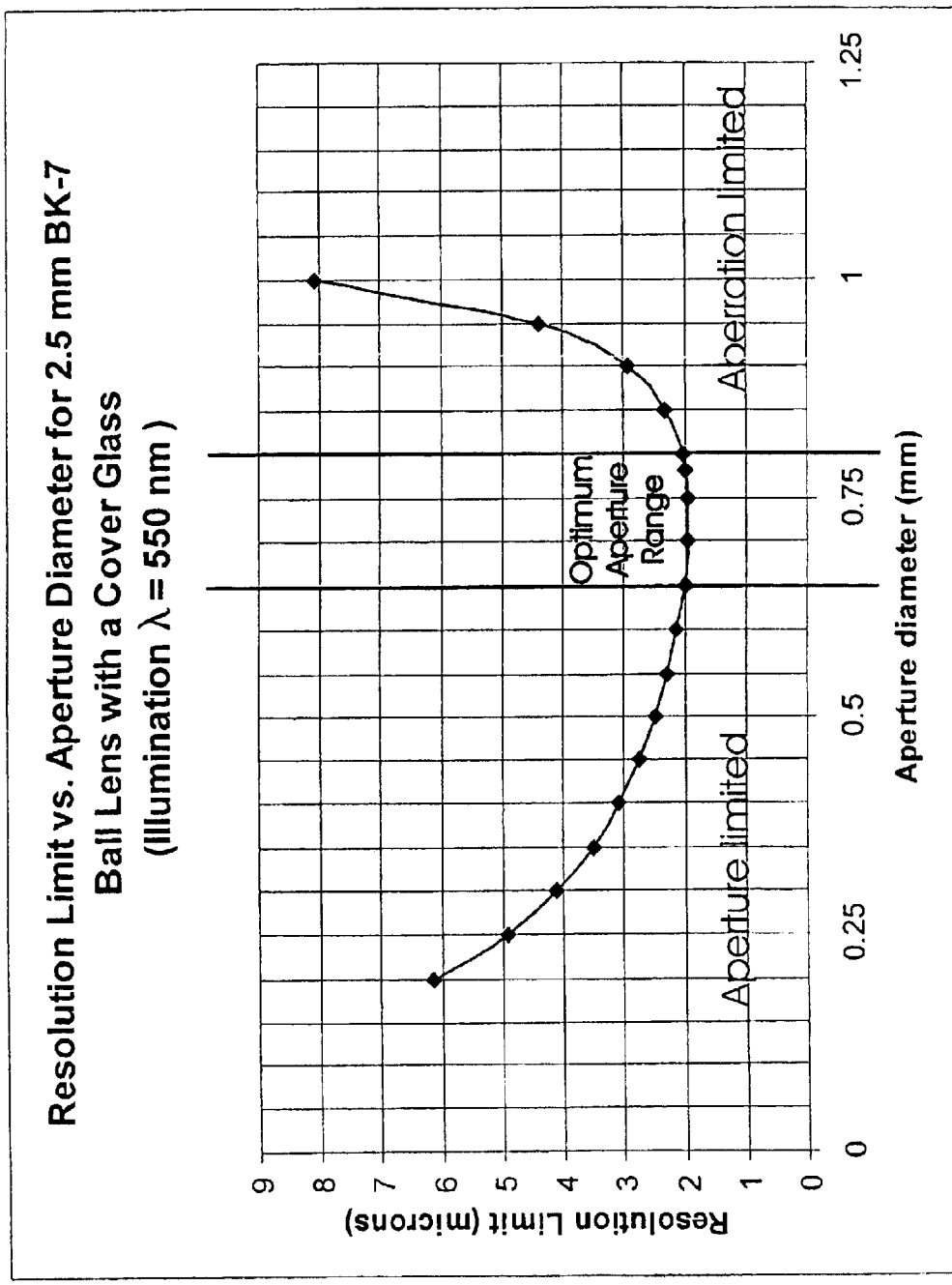
FIG. 2 illustrates the variation in resolution limit for a 2.5 mm diameter BK-7 ball lens as the aperture diameter is changed.

The optimum aperture diameter is not a single value, but a small range of values that yield substantially the same image resolution. FIG. 2 illustrates the variation in resolution limit for a 2.5 mm diameter BK-7 ball lens as the aperture diameter is varied. While any aperture value within the optimum aperture range will produce substantially identical resolution limits, a larger aperture is generally preferred over a smaller aperture, since the larger aperture will pass more light through to the eye, resulting in a brighter image. The increase in light throughput changes in proportion to the area of the aperture. FIG. 2 shows that aperture diameters ranging from 0.65 mm to 0.80 mm provide virtually identical resolution limits, but the 0.80 mm aperture will pass about 50 percent more light than the 0.65 mm aperture. Aperture diameters smaller than 0.65 mm degrade the resolution of the lens because of aperture diffraction effects, but the slope of the curve in this region is gradual, so relatively large variations in aperture diameter result in relatively small changes in resolution. Aperture diameters greater than 0.8 degrade the resolution of the lens because of lens aberrations. The slope of the curve in this region is steep, so relatively small variations in aperture diameter result in relatively large changes in image resolution. Since manufactured objects almost always exhibit variations in dimensions from part to part, it is desirable to choose an average aperture diameter that will not drift into the aberration limited zone due to manufacturing tolerances.

The single lens microscope aperture optimization methods of this invention can be applied to lenses of any figure and to the optimization of a single lens microscope aperture for any wavelength, or set of wavelengths, used for illumination. In some cases a single lens microscope may utilize natural light for illumination, so the lens aperture in these instruments is best optimized for polychromatic, full spectrum illumination. In other cases a single lens microscope may utilize narrow-band emission for illumination, such as is emitted from light emitting diodes (LEDs), so the lens aperture in those instruments is best optimized to those wavelengths.

To demonstrate an example of the aperture optimization methods of the present invention, the inventor has determined optimized apertures for BK-7 glass ball lenses, focused through a standard 0.17 mm thick microscope cover glass onto a specimen, for 550 nm green illumination. The results are presented in Table 1. The data for the 0.5 mm lens are for the lens without a cover glass, since the back focus of the lens (0.105 mm) is less than the thickness of a standard cover glass.

TABLE 1

Optimized Apertures for BK-7 Ball Lenses and their Performance

| Ball Lens Diameter (mm) (D) | Magnification (M) | Optimized Aperture Diameter (mm) (OA) | Resolution Limit (microns) (R) | Optimized Numerical Aperture (ONA) |
|---|---|---|---|---|
| 0.5 | 683 | 0.225 | 1.2 | 0.294 |
| 1.0 | 342 | 0.393 | 1.6 | 0.259 |
| 1.5 | 228 | 0.532 | 1.8 | 0.236 |
| 2.0 | 171 | 0.662 | 1.9 | 0.221 |
| 2.25 | 152 | 0.720 | 2.0 | 0.214 |
| 2.5 | 137 | 0.780 | 2.0 | 0.208 |
| 3.0 | 114 | 0.900 | 2.1 | 0.201 |
| 4.0 | 84 | 1.120 | 2.2 | 0.188 |
| 5.0 | 68 | 1.170 | 2.6 | 0.159 |
| 6.0 | 57 | 1.340 | 2.7 | 0.152 |
| 7.0 | 49 | 1.520 | 2.9 | 0.148 |
| 8.0 | 43 | 1.680 | 2.9 | 0.143 |
| 9.0 | 38 | 1.840 | 3.0 | 0.139 |

Examination of the data of Table 1 reveals the discovery of an inverse relationship between the lens diameter and the optimized numerical aperture: smaller lenses optimize to larger NA and larger lenses optimize to smaller NA. The optimized numerical aperture is therefore not a constant, but a function of the lens diameter. This demonstrates that the performance of very small diameter lenses is dominated by aperture diffraction effects, while the performance of larger diameter lenses is dominated by lens aberrations. This understanding has not been taught in the prior art.

This invention also provides derived equations which can be used to provide the information presented in Table 1 as well as for ball lens diameters between those listed. The equations are based on the diameter of the ball lens as measured in millimeters:

$M = 341.509 \times D^{-0.999728}$  Eq. 5 (magnification):

$OA = -0.006521804 \times D^3 + 0.2399876 \times D^2 + 0.175495$  EQ. 6 (optimized aperture diameter, mm):

$R = 0.00217485 \times D^3 - 0.05465941 \times D^2 + 0.531652$  EQ. 7 (550 nm resolution limit, microns):

$ONA = 0.2574598 - 0.0565941 \times \ln(D)$  EQ. 8 (optimized numerical aperture):

EQS. 5–8 are accurate over the range 0.5–9 mm ball lens diameter. The exact coefficients and form of these equations are not immutable; other mathematical functions can be easily derived or curve fitted to provide substantially the same results.

The inventor has discovered that the physical aperture of a single lens microscope may be larger than an optimized value, without compromising the image resolution, if the numerical aperture of the illumination is restricted to match an optimized numerical aperture value for the lens. The effective numerical aperture of a single lens microscope lens can thereby be controlled by the numerical aperture of the illumination. This discovery has not been taught in the prior art.

While ball lenses may not be the theoretically ideal lens form for a single lens microscope, Table 1 demonstrates that the inventor has discovered that ball lenses can be made to perform admirably if they are well made of high quality optical glass and if the lens aperture diameter is optimized. Furthermore, the inventor has determined that an aperture diameter that provides the best image resolution depends on the choice of wavelength(s) used. These discoveries have not been taught in the prior art.

Although a sphere is not ideal form for a single lens microscope lens, because of the fact that virtually perfect spheres can be easily manufactured, ball lenses do not suffer from decentration, tilt, or center-to-center thickness errors. Lenses which are not manufactured as spheres, i.e. a lenses having separate and distinct optical surfaces produced by separate processes, may suffer from these manufacturing errors. Theoretically superior lenses can be designed by incorporating aspheric and/or kinoform surfaces that reduce aberrations and produce better image resolution than a ball lens providing similar magnification, but the actual performance of lenses which are not ball lenses is often limited by manufacturing errors.

Aspheric lens surfaces are not limited to the form of spherical surfaces, but are described by a polynomial equation. The even asphere equation, presented in the Definitions, above, is commonly used for rotationally symmetric aspheric surfaces. Aspheres are difficult to create by traditional lens grinding and polishing, so mass production of aspheric optical surfaces typically depends on optical molding methods. Diamond turning lathes currently attain sufficient precision to cut optical quality aspheric surfaces into metal mold inserts. These molds can then be used to produce glass optics by compression molding, and plastic optics by compression, casting, or injection molding.

Figure 3:
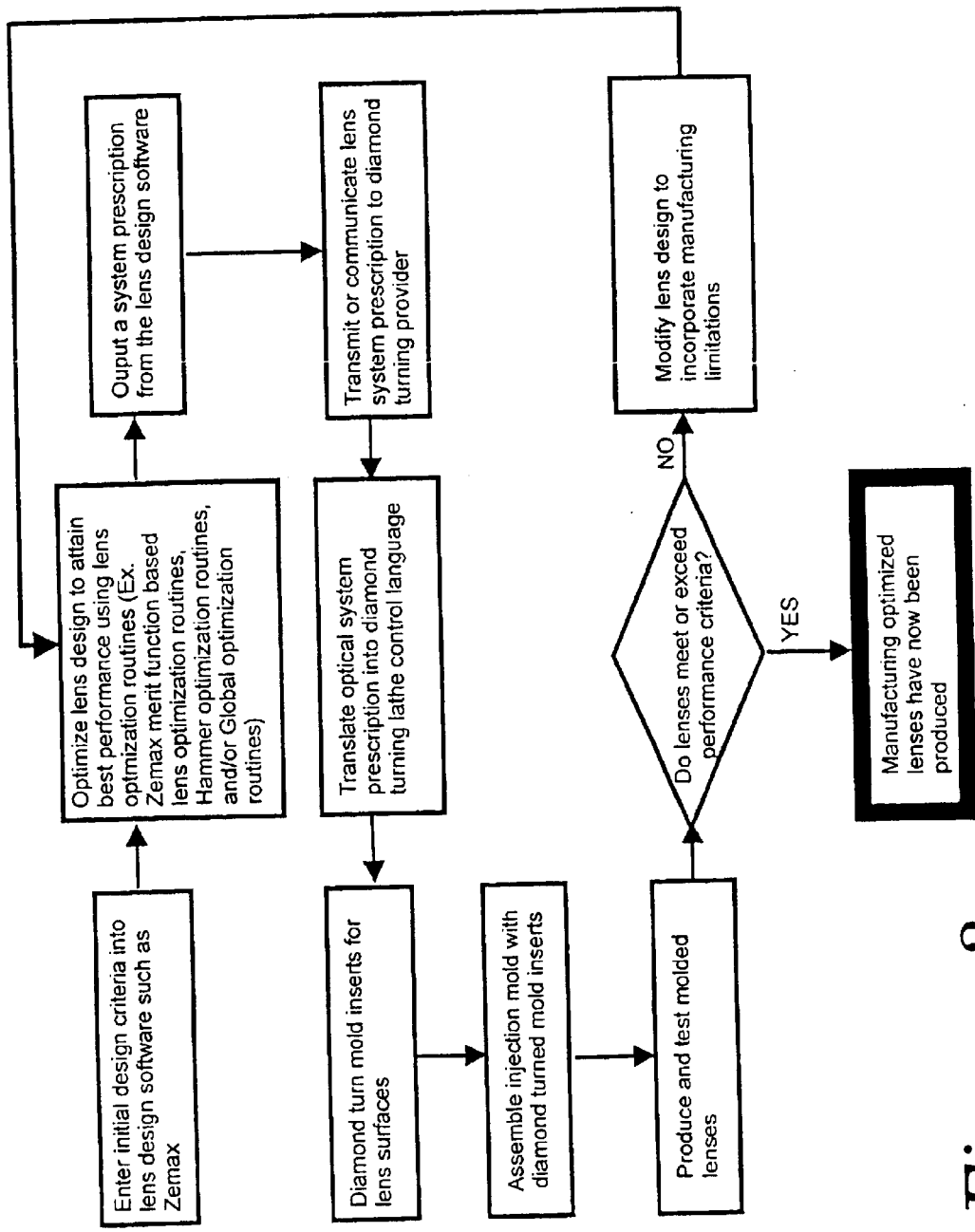
FIG. 3 schematically illustrates a production process including computer aided lens design, design transmission, and computer aided mold machining.

Designing a microscope lens for injection molding preferably includes the steps of entering lens design criteria into lens design software such as Zemax; optimizing the lens design to attain the best performance using lens optimization routines such as the Zemax merit function based lens optimization routines, Hammer optimization routines, and/or Global optimization routines; generating a system prescription, in the form of a computer data file or a printout, from the lens design software that represents the lens and lens surfaces in terms of dimensions and the coefficients of mathematical formulae, including radii of curvature, lens surface semi diameters, as well as coefficients for the asphere formula and kinoform coefficients if they are part of the design; transmitting or communicating the system prescription to a diamond turning provider, such transmission or communication being performed in person, by mail, by courier, by phone, by facsimile machine, by email, or by other physical or electronic communications method; translating the optical system prescription into a series of commands or control system inputs suitable to direct the diamond turning lathe to produce the correct form of the mold insert or inserts for the chosen molding material; assembly of the injection mold including the diamond turned insert or inserts; trial injection molding of lenses from the injection mold; testing of the molded lenses and determining if the lenses meet or exceed chosen performance criteria; if the lenses meet or exceed the chosen performance criteria, manufacturing optimized lenses have been produced, if not, then the lens design is modified to incorporate manufacturing limitations or tolerances and the process is repeated, starting with the lens optimization step, until the lenses meet or exceed the performance criteria. This process is schematically illustrated in FIG. 3.

The diamond turning lathes that are used to make the aspheric surface mold inserts are driven by software that currently expects a certain form of the asphere equation. Although it is possible to design an aspheric surface that includes each of the coefficients in the fall even asphere equation, diamond turning control software cannot currently accommodate all of those terms, although such software may in the future. As of this writing, the most stable performance is obtained by limiting the even asphere equation to the following terms:

Eq. 9:

$$z = \frac{cr^2}{1 + \sqrt{(1-c^2r^2)}} + \alpha_2 r^4 + \alpha_3 r^6 + \alpha_4 r^8 + \alpha_5 r^{10} + \alpha_6 r^{12} + \alpha_6 r^{14} + \alpha_8 r^{16}$$

The inserts produced by a diamond turning lathe are held in molds, for example, for plastic injection molding. At the present, it is not possible to guarantee perfect alignment of the two faces of a lens mold, so there are manufacturing tolerances that will affect the performance of lenses produced by that mold. The tolerances include center-to-center thickness error between the optical surfaces, tilt error, and decentration error. The tolerances of these errors are normally quite small compared to the size of a lens being molded, but the Lilliputian size of the lens of a single lens microscope renders it extremely sensitive to these errors. The inventor has discovered that optimum results are obtained by incorporating the most disruptive of these tolerances into a lens design so that the lens surfaces can be optimized to perform well in the worst tolerance case, performing even better if the manufacturing tolerance is held tighter.

Of the three major manufacturing tolerances, the inventor has found that it is preferable to only incorporate decentration error into the lens design. Decentration has the greatest effect on the image quality if the decentration is aligned along an axis perpendicular to the axis of the field positions. Thus a decentration in the direction of the x axis has the greatest effect on field points aligned along the Y axis. Tilt error may occur in any direction and will not necessarily be consistently oriented with respect to decentration. The aberrations introduced by tilt can add to decentration aberrations or they can nullify them. The average of all possible tilt errors is no tilt, so the best optimization usually results from not including tilt error into the lens design. Lenses are generally less sensitive to center-to-center thickness variation than they are to tilt and decentration, and aberrations resulting from center-to-center thickness variation do not substantially interact with tilt and decentration aberrations. Furthermore, as it is for tilt, the average of all thickness variations (assuming they are not skewed in one direction) is no thickness variation. Thus, it is preferable to only include decentration error into the lens design. Including the maximally disrupting decentration condition into the lens design makes it possible to optimize the lens surfaces to reduce their manufacturing tolerance sensitivity.

Aspheric lenses can include one plano surface and one apsheric surface, one spheric surface and one aspheric surface, or two aspheric surfaces. In general, better results are obtained for single lens microscope applications if the lens includes two aspheric surfaces. A preferred design goal for a single lens microscope lens is a large numerical aperture, to optimize resolution, combined with small image aberrations. These two characteristics can be antagonistic in lens design software, making the software unstable and tending to drive a solution in some extreme direction. The inventor has discovered methods for designing large numerical aperture double asphere single lens microscope lenses, using a lens design program such as Zemax, that prevents the lens design from diverging from the intended goals. These methods can be further extended to reduce the sensitivity of the lens to manufacturing tolerances.

To begin designing a double asphere single lens microscope lens using Zemax or other suitable lens design program, one must first choose the desired magnification of the lens, the lens material, the illumination wavelengths, the image fields, and the intended use of the lens with either uncovered specimens or mounted specimens under a cover glass. The lens design is then entered into the lens data editor of the program. The object plane is usually set at −250 mm, representing a virtual image at that distance, the first lens surface is placed at a position of 0 mm, it is assigned a surface type of even asphere, and it is made to be the aperture stop for the lens. The material of the lens is assigned; acrylic is typical because it has good molding characteristics and it has a low chromatic dispersion. The thickness of the lens must be initially chosen. A good starting value is the diameter of the ball lens that would have the same magnification. Lens thickness is considered to be a 'weak variable' in lens design. Good lens surfaces can be designed for a wide range of lens thicknesses, but allowing a program such as Zemax to vary the lens thickness usually results in the thickness being driven to its limits in one direction or the other.

Following the first lens surface description is a coordinate break. This allows the center of the next surface to be misaligned with the first surface. Assuming that the image filed points were located along the Y axis of the system, the coordinate break is used to incorporate decentration in the X axis direction. A typical X decentration is 0.015 mm. The next surface is the second surface of the lens, also specified to be an even asphere. For this example we will assume that the lens is not immersed in an immersion fluid, so the next space that follows is air, which is given a thickness. This thickness is the variable used to control the focus of the lens. It is often assigned an initial value, such as 0.7 mm, that gives the lower surface of the lens room to move above the cover glass of the slide. The next surface is the cover glass. It is assigned a material of an appropriate glass, such as BK-7, and a typical thickness of 0.17 mm. A second coordinate break surface can be added between the second lens surface and the face of the cover glass, to reverse the effect of the first coordinate break, but it is not required.

The fields and their weighting values are entered into the program. The central wavelength of the illumination is entered into the program. Since an asphere singlet cannot accomplish any substantial color correction, it is not necessary to design the lens, initially, for multiple wavelengths. By choosing a central wavelength the chromatic variations are minimized overall. The aperture type is chosen to be 'Entrance Pupil Diameter'. Ray aiming is turned on, using a paraxial reference, ray aiming cache, and fast asphere tracing.

A default merit function is created, typically using a specification of [RMS, Wavefront, Centroid, Guassian Quadrature, 16 rings, 12 arms, Do not assume axial symmetry]. The effective focal length in the x direction and the effective focal length in the y direction are added to the default merit function, with large weighting factors (such as 100) to force the merit function to converge on a solution having the desired focal length. Since the focal length of a single lens microscope lens determines the magnification of the lens, specifying the effective focal length of the lens in the merit function also specifies the magnification of the lens.

Figure 4:
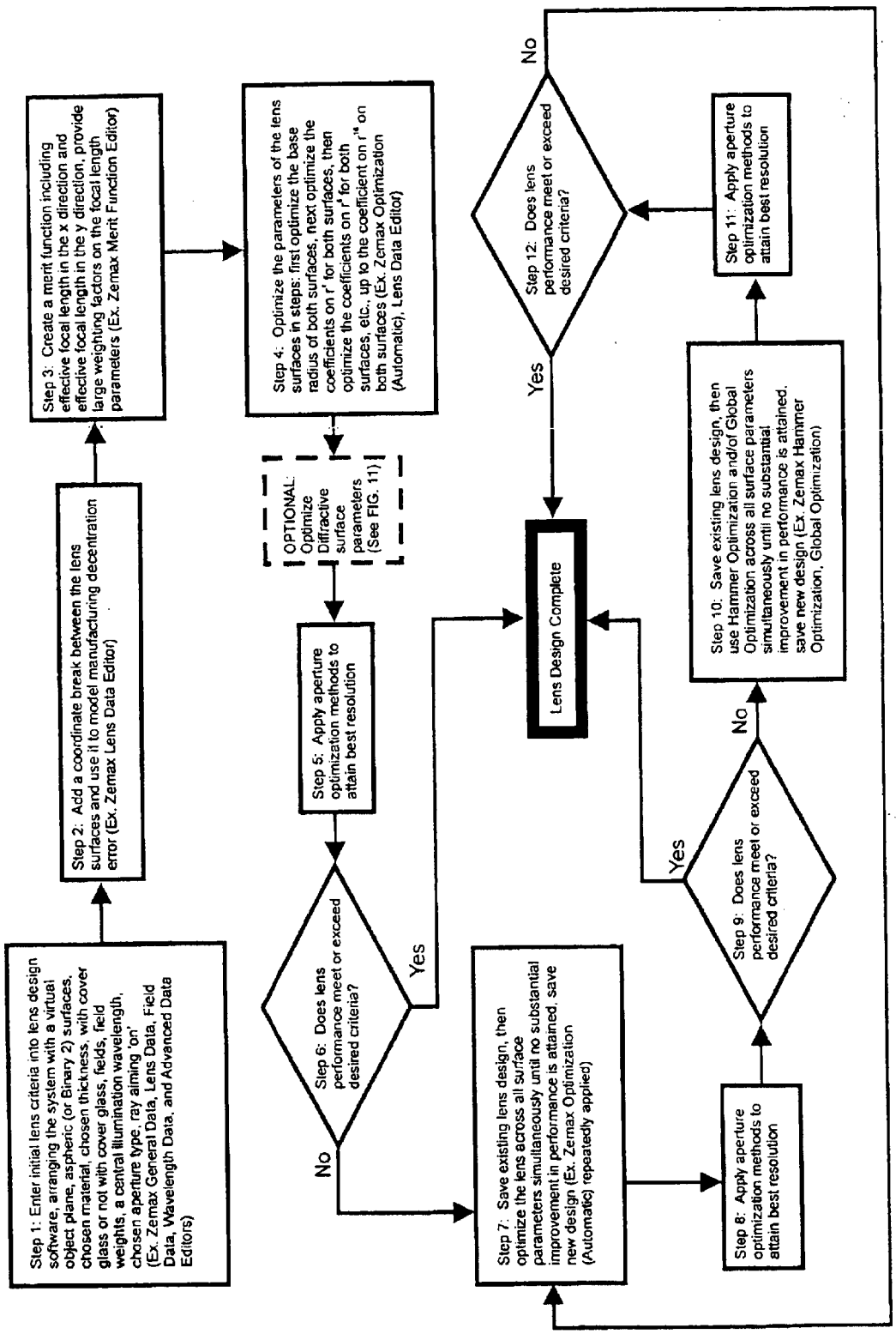
FIG. 4 illustrates a method for designing an optimized aspheric single lens microscope lens.

Initial optimization proceeds by small steps. Two initial optimization methods have proven effective. The preferred first method is faster, but it is somewhat less resistant to spurious solutions than the second method. The asphere optimization process including the first initial optimization method is schematically illustrated in FIG. 4.

The first initial optimization method is performed as follows: first the base radii of curvature of the two lens surfaces and the focus are made variable and optimization is run until the geometry is stable. At this point the lens is a double spheric. The $r^4$ coefficient of both surfaces is also made variable and optimization is run again. Both lens surfaces are now aspheric. The $r^6$ coefficient of both lens surfaces are now added to the variables being optimized, optimization is run, and so on for each coefficient in turn up through the last one, $r^{16}$ for both surfaces.

The second method for the initial optimization is used if the first method is unsuccessful. The second initial optimization method is performed as follows: first the base radii of curvature of the two lens surfaces and the focus are made variable and optimization is run until the geometry is stable. At this point the lens is a double spheric. Now one of the lens surfaces is chosen for aspheric optimization and the variable is removed from the other surface radius so it will not change during this phase. The $r^4$ coefficient of the surface to become aspheric is also made variable and optimization is run again. One lens surface is now aspheric, the other is still spheric. The $r^6$ coefficient of the aspheric surface is now added to the variables being optimized, optimization is run, and so on for each coefficient in turn up through the last one, $r^{16}$. The variables on the aspheric surface are then removed and the base radius and $r^4$ coefficient are made variable on the second surface. The same procedure is performed on the second surface, making the next r coefficient variable, then optimizing, then making the next r coefficient variable, and so on, until the second surface is an asphere of maximum order.

If the performance of the lens achieves the desired level at some intermediate point along the initial optimization method (using either the first or the second method) then the process may be stopped at that point. At any stopping point the lens data is saved and a copy made to continue optimization. This lens may be further optimized by making all the usable coefficients of each lens surface variable, along with the focus distance. By 'useable coefficients' it is meant that the conic constant, k, and the coefficient on $r^2$ are not made variable since their inclusion in the aspheric surface descriptions would make them useless, at the present, for programming the diamond turning lathe. The lens design is then usually optimized over many hundreds of optimization cycles. Small surface parameter changes can accumulate over hundreds of optimization cycles to result in significant improvements in performance. Since optimization includes randomizing factors some optimization runs may drive the lens design into worse performance, so this level of optimization is always performed on a copy of the results of the first optimization.

The best results of these second-phase optimizations are saved for further optimization. Since the optimization of aspheric surfaces to a large numerical aperture limits the aberration correction the aspheric surfaces can provide, reducing the lens aperture by a small amount and optimizing again may improve the performance of the lens. An aperture optimization method is applied to determine if the actual performance of the lens is improved by reducing the aperture diameter or if it is degraded. These methods can be repeated until no more improvement in image quality results.

If the lens will be used in with polychromatic or white light illumination, the wavelength data are then entered into the program, the merit function is rebuilt, and the lens performance is tested and the lens data is saved. The lens is optimized to the new wavelengths and tested again. The better lens design of these two is then retained.

Further optimization is possible by utilizing a method called Hammer Optimization that varies lens design parameters over large ranges in an effort to find a solution which is a better 'local minimum' of the optimization curve. It cannot be said that any aspheric lens design is the best possible design, so the optimization can continue with diminishing returns. Once a good aspheric lens design has been obtained the final step is to optimize the aperture again using an aperture optimization method.

All of the above steps do not have to be performed to design an optimized asphere for a single lens microscope, but the inventor has found that using these methods result in better lens designs with less computing time than the alternative of making all the variables active at the beginning and letting them all optimize at the same time. Such an approach often leads to divergent solutions. The present methods provide a stable path to a well-optimized aspheric lens that has manufacturing tolerant optical surfaces.

Figure 5:
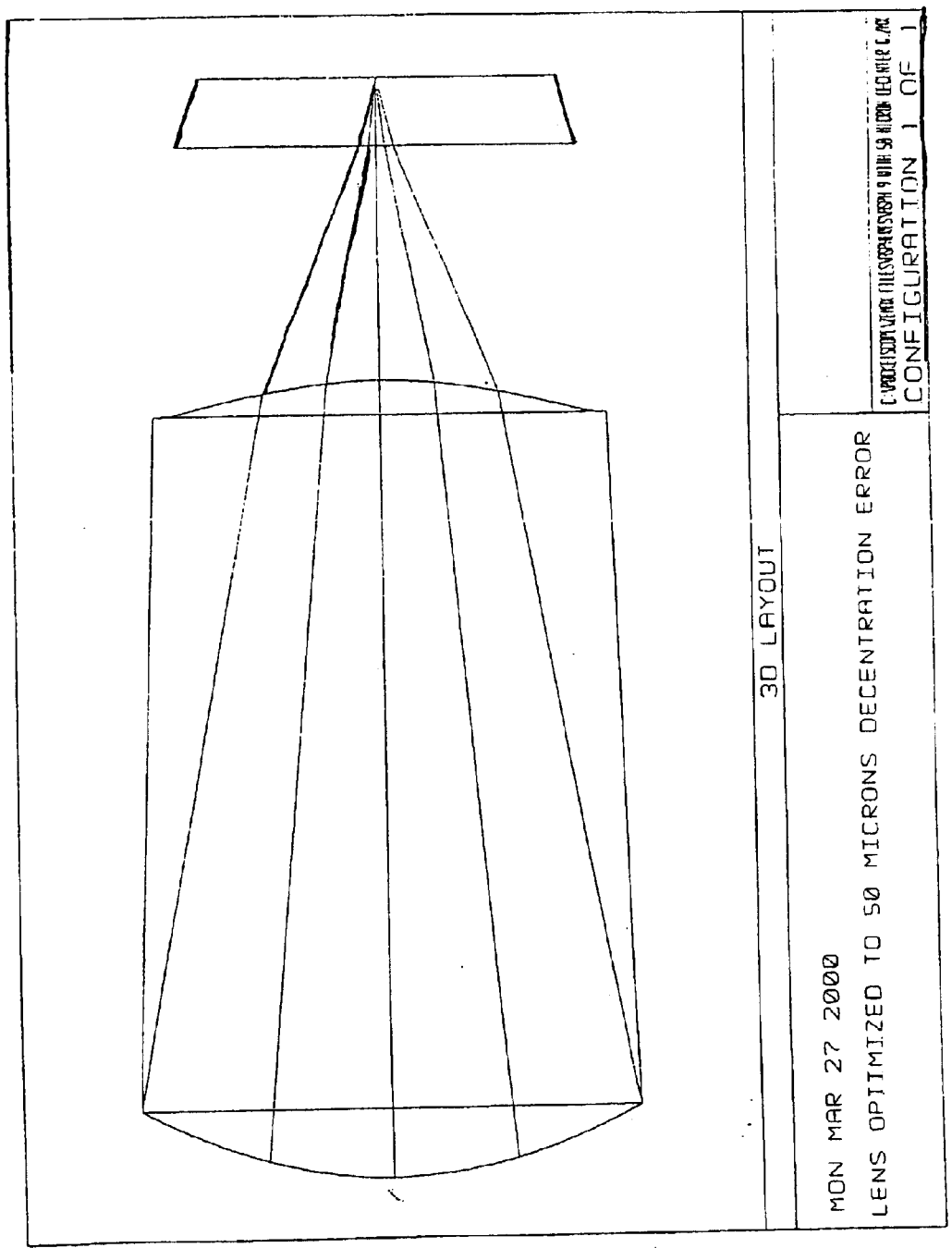
FIG. 5 illustrates a double convex aspheric single lens microscope lens designed to include a decentration error of 50 microns.
Figure 6:
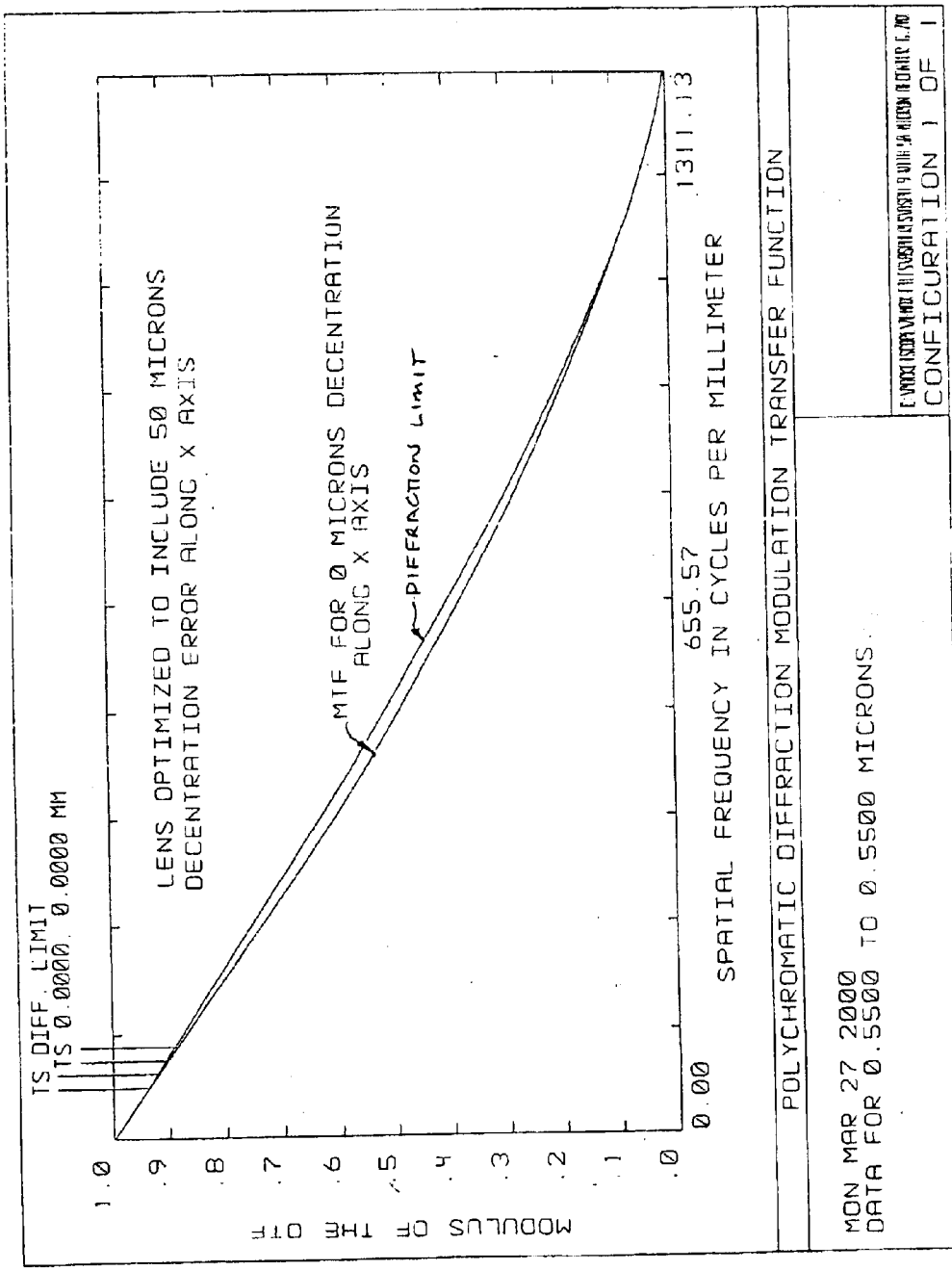
FIG. 6 illustrates the MTF plots for the lens of FIG. 5 under the conditions of zero decentration error and 50 microns decentration error.
Figure 7:
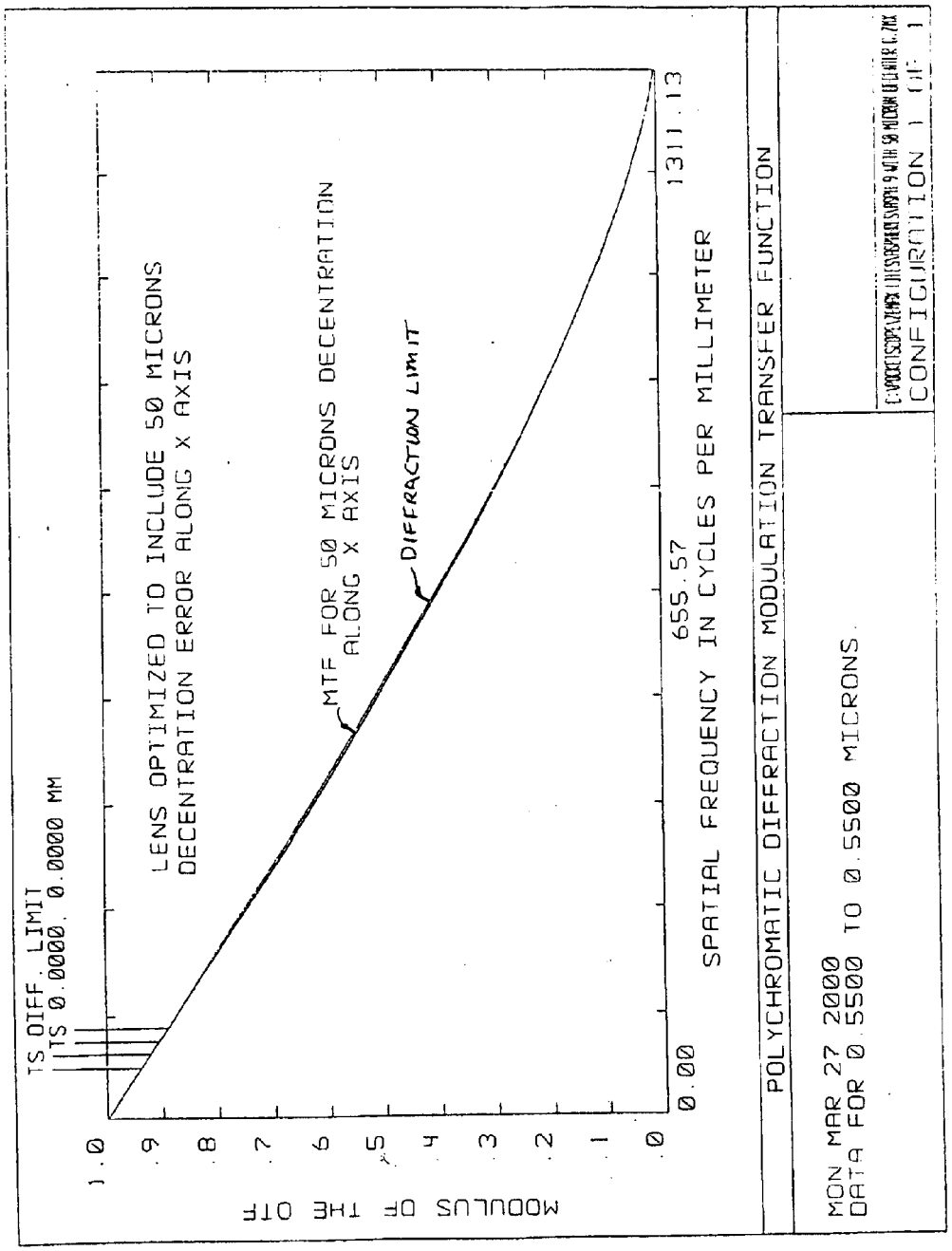
FIG. 7 illustrates the MTF plots for the lens of FIG. 5 under the conditions of 50 microns decentration error.
Figure 8:
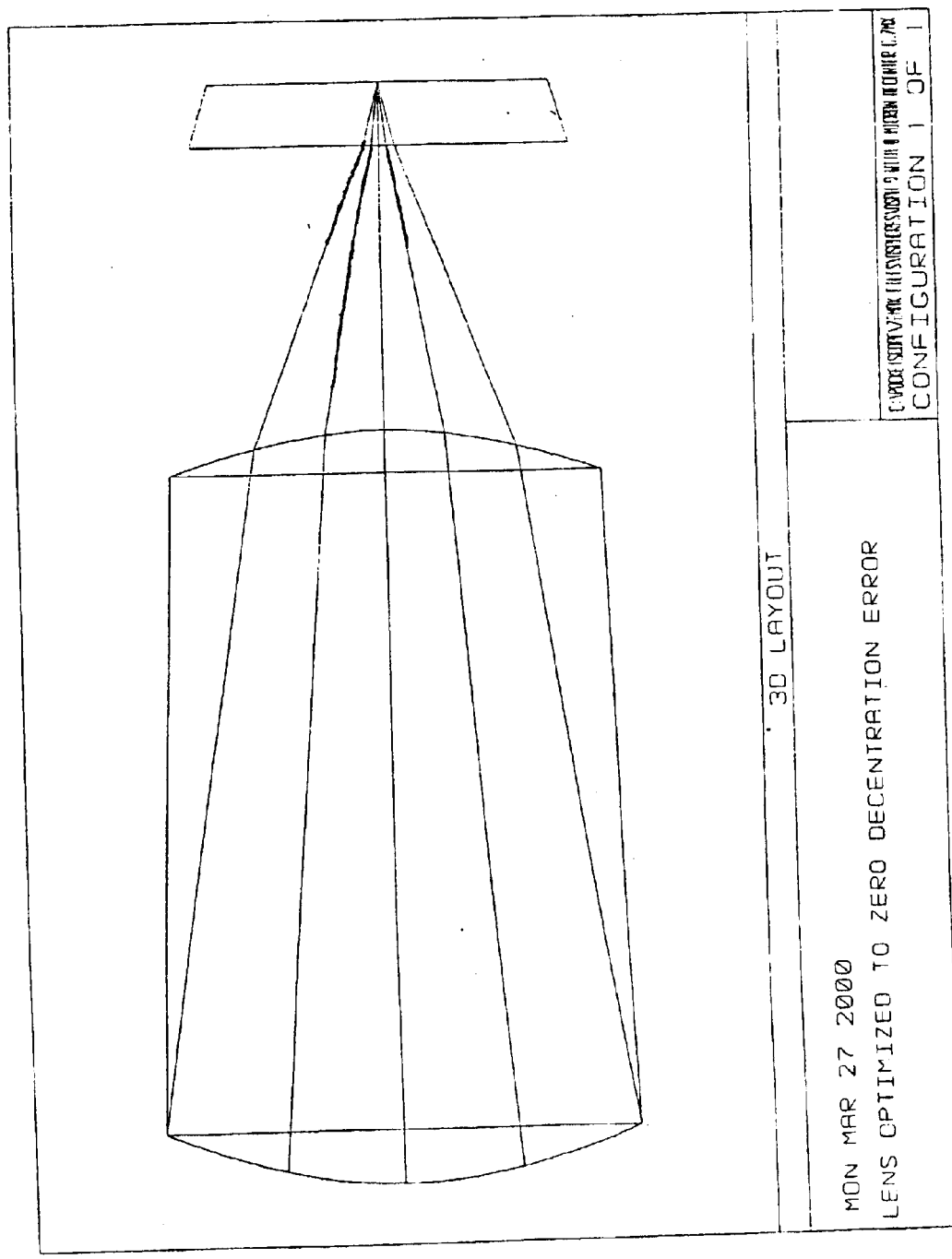
FIG. 8 illustrates a double convex aspheric single lens microscope lens designed with zero decentration error.
Figure 9:
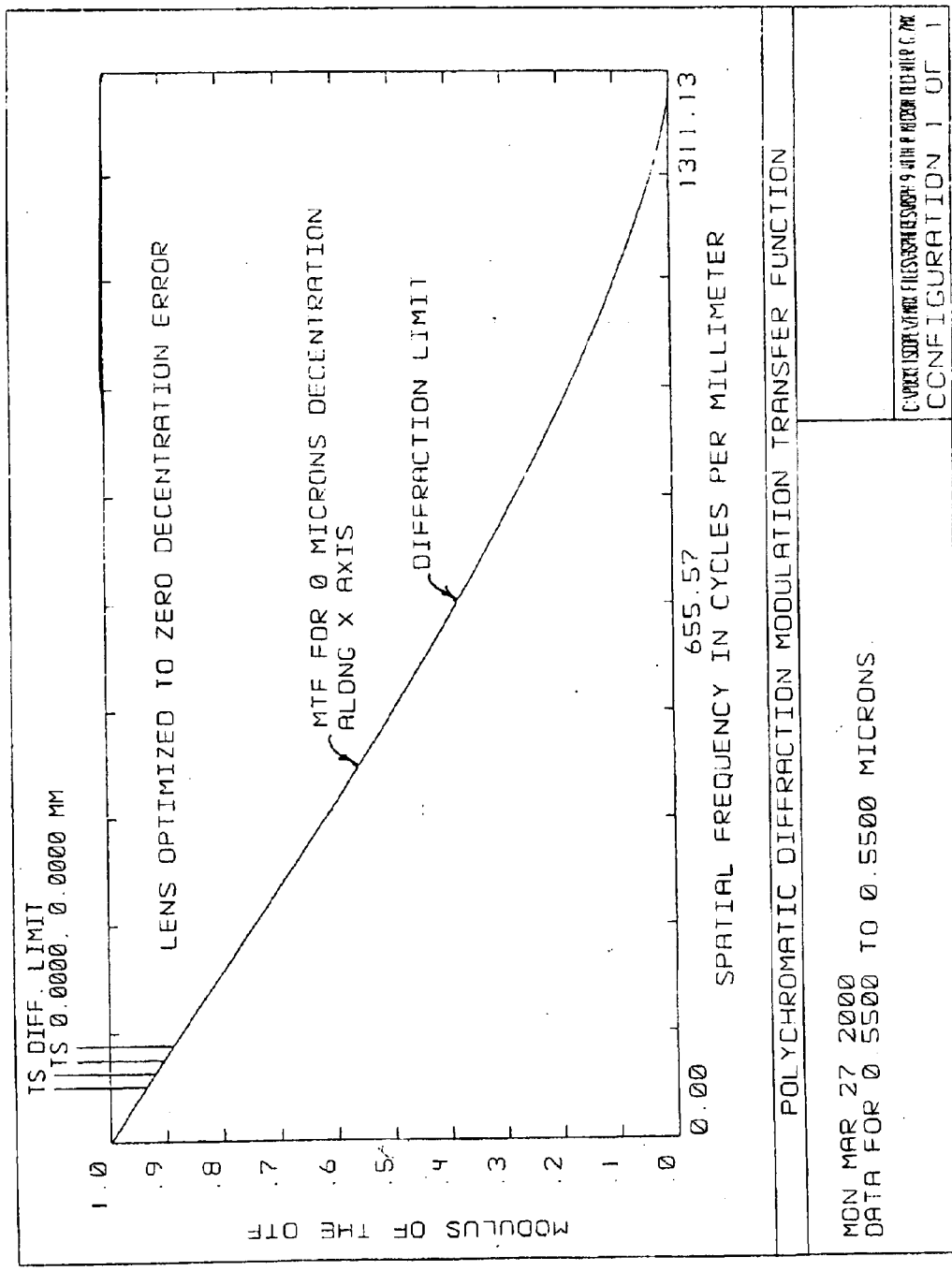
FIG. 9 illustrates the MTF plots for the lens of FIG. 8 under the conditions of zero decentration error.
Figure 10:
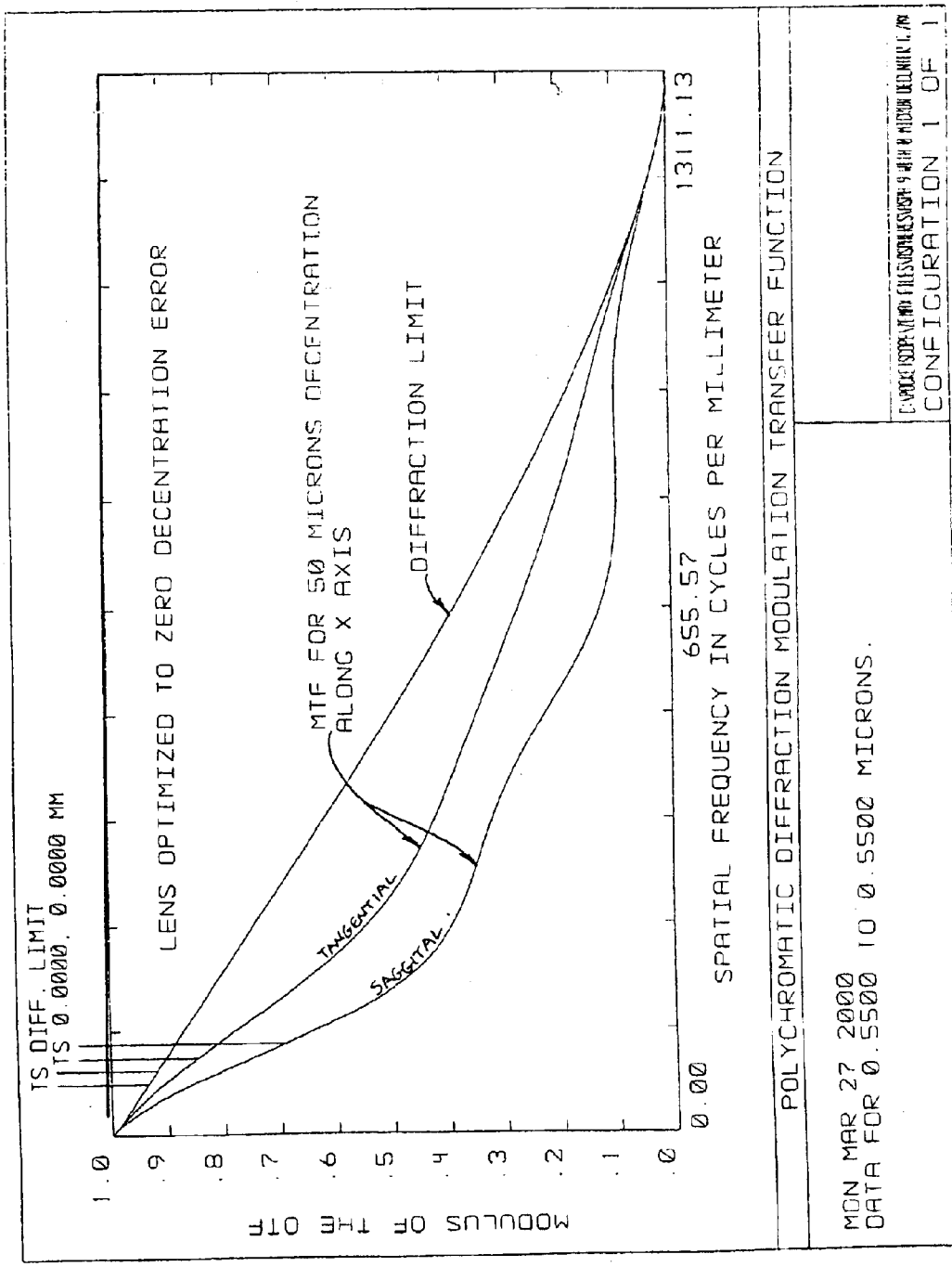
FIG. 10 illustrates the MTF plots for the lens of FIG. 8 under the conditions of 50 microns decentration error.

FIGS. 5–10 provide a demonstration of the application and utility of the present asphere optimization methods. To demonstrate the effectiveness of the methods of the present invention, a large decentration error, 50 microns, is shown in this example. FIG. 5 illustrates a 150× double convex aspheric/aspheric lens designed, according to the above methods, to include 50 microns decentration error. FIG. 6 illustrates the MTF plot for the lens of FIG. 5 under the conditions of zero decentration error. FIG. 7 illustrates the MTF plot for the lens of FIG. 5 under the condition of 50 microns decentration. FIG. 8 illustrates a double convex aspheric single lens microscope lens designed with zero decentration error. FIG. 9 illustrates the MTF plot for this lens under the conditions of zero decentration error and FIG. 10 illustrates the MTF plot for this lens under the conditions of 50 microns decentration error.

TABLE 2

System prescription data for the lens of FIG. 5
(from Zemax Prescription Data output)

| GENERAL LENS DATA: | SURFACE DATA SUMMARY: |
|---|---|
| Surfaces: 5 | Surf Type Comment |
| Stop: 1 | Radius Thickness G |
| System Aperture: Entrance Pupil | OBJ STANDARD |
| Diameter = 1.25 | Infinity −250 |
| Glass Catalogs: schott MISC | STO BINARY_2 |
| Ray aiming: Paraxial Reference, | 1.163953 2 ACR |
| cache on | 2 COORDBRK |
| X Pupil shift: 0 | −0 |
|  | 3 BINARY_2 |
| Y Pupil shift: 0 | 1.212435 0.59991 |
| Z Pupil shift: 0 | 4 STANDARD |
| Apodization: Uniform, factor= | Infinity 0.17 |
| 0.00000EE + 000 | IMA STANDARD |
| Effective Focal Length : 1.666701 | Infinity |
| (in air) |  |
| Effective Focal Length: 1.666701 | SURFACE DATA DETAIL: |
| (in image space) |  |
| Back Focal Len.: 0.008425804 | Surface OBJ: STANDARD |
| Total Track: 2.76991 | Surface STO: BINARY_2 |
| Image Space F/#: 1.333361 | Coeff on r 2: 0 |
| ParaxialWorking F/#: 1.328886 | Coeff on r 4: −0.061514673 |
| Working F/#: 1.342375 | Coeff on r 6: 0.32347474 |
| Image Space N.A.: 0.3520356 | Coeff on r 8: −3.2038276 |
| Object Space N.A.: 0.002499992 | Coeff on r 10: 14.657368 |
| Stop Radius: 0.625 | Coeff on r 12: −37.48167 |
| Paraxial Image Height: 0.3390604 | Coeff on r 14: 50.917104 |
| Paraxial Magnification: 0.006646647 | Coeff on r 16: −28.757526 |
| Entrance Pupil Diameter: 1.25 | Maximum term: 0 |
| Entrance Pupil Position: 0 | Maximum rad ap: 0.65 |
| Exit Pupil Diameter : 2.748043 | Surface 2: COORDBRLK |
| Exit Pupil Position : −3.655707 | Decenter X: 0.05 |
| Field Type : Real Image height in | Decenter Y: 0 |
| Millimeters | Tilt About X: 0 |
| Maximum Field: 0.35 | Tilt About Y: 0 |
| Primary Wave: 0.55 | Tilt About Z: 0 |
| Lens Units: Millimeters | Order: Decenter then tilt |
| Angular Magnification: 0.4548691 | Surface 3: BINARY_2 |
|  | Coeff on r 2: 0 |
| Fields: 4 | Coeff on r 4: 1.3423592 |
| Field Type: Real Image height in | Coeff on r 6: −20.448887 |
| Millimeters | Coeff on r 8: 276.87282 |
|  | Coeff on r 10: −2178.4114 |

| # | X-Value | Y-Value | Weight | Coeff on r 12: 9581.7472 |
|---|---|---|---|---|
| 1 | 0.000000 | 0.000000 | 50.000000 | Coeff on r 14 : −21885.386 |
| 2 | 0.000000 | 0.202000 | 100.000000 | Coeff on r 16: 20228.154 |
| 3 | 0.000000 | 0.286000 | 1.000000 | Maximum term: 0 |
| 4 | 0.000000 | 0.350000 | 1.000000 | Maximum rad ap: 0.3359 |
|  |  |  |  | Surface 4: STANDARD |
|  |  |  |  | Surface IMA: STANDARD |
|  |  |  |  | EDGE THICKNESS DATA: |

Vignetting Factors

| # | VDX | VDY | VCX | VCY | Surf | X-Edge | Y-Edge |
|---|---|---|---|---|---|---|---|
| 1 | 0.000000 | 0.000000 | 0.000000 | 0.000000 | OBJ | −249.827447 | −249.827447 |

TABLE 2-continued

System prescription data for the lens of FIG. 5
(from Zemax Prescription Data output)

| GENERAL LENS DATA: | | | | SURFACE DATA SUMMARY: | | |
|---|---|---|---|---|---|---|
| 2  0.000000 | 0.000000 | 0.000000 | 0.000000 | STO | 1.827447 | 1.827447 |
| 3  0.000000 | 0.000000 | 0.000000 | 0.000000 | 2   | −0.085446 | −0.085446 |
| 4  0.000000 | 0.000000 | 0.000000 | 0.000000 | 3   | 0.685356 | 0.685356 |
| | | | | 4 | 0.170000 | 0.170000 |
| | | | | IMA | 0.000000 | 0.000000 |

Wavelengths: 1
Units: Microns
\# Value Weight
1 0.550000 1.000000

TABLE 3

System prescription data for the lens of FIG. 8
(from Zemax Prescription Data output)

GENERAL LENS DATA: | SURFACE DATA SUMMARY:

| GENERAL LENS DATA | SURFACE DATA SUMMARY |
|---|---|
| | Surf Type Comment |
| Surfaces: 5 | Radius Thickness G |
| Stop: 1 | OBJ STANDARD |
| System Aperture: Entrance Pupil | Infinity −250 |
| Diameter = 1.25 | STO BINARY_2 |
| Glass Catalogs: schott MISC | 1.369367 2 ACR |
| Ray aiming: Paraxial Reference, cache on | 2 COORDBRK − 0 |
| X Pupil shift: 0 | 3 BINARY_2 −1.065983 |
| Y Pupil shift: 0 | 0.7462668 |
| Z Pupil shift: 0 | 4 STANDARD Infinity |
| Apodization: Uniform, factor= 0.00000E+000 | 0.17 |
| | IMA STANDARD |
| Effective Focal Length: 1.6667 (in air) | Infinity |
| Effective Focal Length: 1.6667 (in image space) | SURFACE DATA DETAIL: |
| Back Focal Len.: 0.004036898 | Surface OBJ: STANDARD |
| Total Track: 2.916267 | Surface STO BINARY_2 |
| Image Space F/#: 1.33336 | Coeff on r 2: 0 |
| Paraxial Working F/#: 1.329991 | Coeff on r 4: 0.062294099 |
| Working F/#: 1.389777 | Coeff on r 6: −0.055291125 |
| Image Space N.A.: 0.3518967 | Coeff on r 8: −3.1120665 |
| Object Space N.A.: 0.002499992 | |
| Stop Radius: 0.625 | Coeff on r 10: 16.599235 |
| Paraxial Image Height: 0 | Coeff on r 12: −40.984209 |
| Paraxial Magnification: 0 | Coeff on r 14: 52.47658 |
| Entrance Pupil Diameter: 1.25 | Coeff on r 16: −28.392619 |
| Entrance Pupil Position: 0 | Maximum term: 0 |
| Exit Pupil Diameter: 3.289684 | Maximum rad ap: 0.65 |
| Exit Pupil Position: −4.382297 | Surface 2: COORDBRK |
| Field Type: Real Image height in Millimeters | Decenter X: 0 |
| | Decenter Y: 0 |
| Maximum Field: 0 | Tilt About X: 0 |
| Primary Wave: 0.55 | Tilt About Y: 0 |
| Lens Units: Millimeters | Tilt About Z: 0 |
| Angular Magnification: 0 | Order: Decenter then tilt |
| | Surface 3: BINARY_2 |
| Fields :4 | Coeff on r 2: 0 |
| Field Type: Real Image height in Millimeters | Coeff on r 4: 3.103906 |
| | Coeff on r 6: −53.637556 |

| # | X-Value | Y-Value | Weight | Coeff |
|---|---|---|---|---|
| 1 | 0.000000 | 0.000000 | 50.000000 | Coeff on r 8: 557.48685 |
| 2 | 0.000000 | 0.000000 | 100.000000 | Coeff on r10: −3312.0561 |
| 3 | 0.000000 | 0.000000 | 1.000000 | Coeffonr12: 11226.723 |
| 4 | 0.000000 | 0.000000 | 1.000000 | Coeff on r 14: −20198.113 |
| | | | | Coeff on r 16: 14960.501 |

Maximum term: 0
Maximum rad ap: 0.3359
Surface 4: STANDARD
Surface IMA: STANDARD
EDGE THICKNESS DATA:

Vignetting Factors

| # | VDX | VDY | VCX | VCY | Surf | X-Edge | Y-Edge |
|---|---|---|---|---|---|---|---|
| 1 | 0.000000 | 0.000000 | 0.000000 | 0.000000 | OBJ | −249.852501 | −249.852501 |
| 2 | 0.000000 | 0.000000 | 0.000000 | 0.000000 | STO | 1.852501 | 1.852501 |

TABLE 3-continued

System prescription data for the lens of FIG. 8
(from Zemax Prescription Data output)

| GENERAL LENS DATA: | | | | SURFACE DATA SUMMARY: | | |
|---|---|---|---|---|---|---|
| 3 | 0.000000 | 0.000000 | 0.000000 | 0.000000 | 2 | −0.111468 | −0.111468 |
| 4 | 0.000000 | 0.000000 | 0.000000 | 0.000000 | 3 | 0.857734 | 0.857734 |
| | | | | | 4 | 0.170000 | 0.170000 |
| | | | | | IMA | 0.000000 | 0.000000 |
| Wavelengths: 1 | | | | | | |
| Units: Microns | | | | | | |
| # | Value | Weight | | | | |
| 1 | 0.550000 | 1.000000 | | | | |

The MTF analyses of FIGS. 6, 7, 9 and 10 shows the image contrast, which can be thought of as the sharpness of focus, for different spatial frequencies. An MTF value of 1.0 corresponds to perfect visibility, while an MTF value of 0.2 is commonly taken to represent the limit of visibility. Images showing an MTF of less than 0.2 do not contain sufficient contrast to present distinguishable features. Lenses show large MTF values for low spatial frequencies (20 cycles/mm) and low MTF values for higher spatial frequencies (400 cycles/mm). This is another way of saying that lenses easily distinguish objects having a large separation (20 cycles/=50 microns center-to center separation) but have more difficulty distinguishing objects having a small separation (400 cycles/=2.5 microns separation).

The diffraction limit curves shown in the MTF plots of FIGS. 6, 7, 9 and 10 represent the theoretically best performance of the analyzed lens. The actual performance of a lens is usually reduced by aberrations, so the actual MTF of a lens falls below the diffraction limit. A small separation between the diffraction limited MTF and the actual MTF indicates that the lens has very few aberrations, while a large separation between these curves indicates that the lens suffers from large aberrations.

While the performance of the lens shown in FIG. 8 is slightly better than that of FIG. 5 in the case of zero decentration error, the performance of the lens of FIG. 8 is seriously degraded in the case of 50 microns decentration error, while the lens of FIG. 5 shows virtually no difference in performance. The lens of FIG. 5 is therefore more tolerant of decentration error than the lens of FIG. 8, and the lens of FIG. 5 is more likely to perform according to the design when molded with currently applicable molding tolerances.

A further improvement to a single lens microscope lens according to the present invention can be obtained by including one or more kinoform diffractive optic surfaces in the lens. Kinoforms provide additional degrees of freedom to control the performance of a lens. A positive kinoform surface has the opposite chromatic aberration as a positive refractive surface, so it is possible to perform chromatic aberration correction through the addition of a kinoform surface to a lens, resulting in an achromatic, or apochromatic single element lens.

For the optimization of a kinoform corrected asphere, the optical surface type is chosen to be the ZEMAX Binary 2 surface. This surface definition combines the even asphere refractive surface definition with an even order optical phase function defined by:

Eq. 10:

$$\Phi = \sum_{i=1}^{N} A_i \rho^{2i}$$

Where:
$\Phi$=optical phase
$A_i$=coefficients on even powers of $\rho$
$\rho$=radial coordinate of lens The diffractive parameters are set to zero for the initial rounds of optimization.

The manufacturing of a kinoform is limited by an upper value on the number of cycles per mm which can be cut by the diamond turning lathe. This number is typically on the order of 60 cycles per mm.

Given free reign to vary all of the asphere parameters, the base radii of curvature, and the polynomial binary optic parameters up to a high degree, a lens optimization program will generally over-design the diffractive surfaces to put too much power into them. Small period diffractive structures produce a greater amount of light scattering, which is both undesirable and difficult to tool. A preferable diffractive structure is that which provides the greatest degree of extra control over aberrations not controlled by the aspheric surfaces, using the smallest number of diffractive cycles to do so. Furthermore, if the polynomial orders of the diffractive surfaces are chosen to be too large, the optimization program will have difficulty with their optimization, and will tend to produce diffractive surfaces that individually contain large aberrations, even though the combination of the two diffractive surfaces may show small aberrations. If the individual diffractive surfaces each demonstrate large aberrations then their performance will be very sensitive to alignment errors. A pair of diffractive optical surfaces which divide the needed optical power, without individually suffering from large aberrations, will show a smaller sensitivity to alignment errors.

Figure 11:
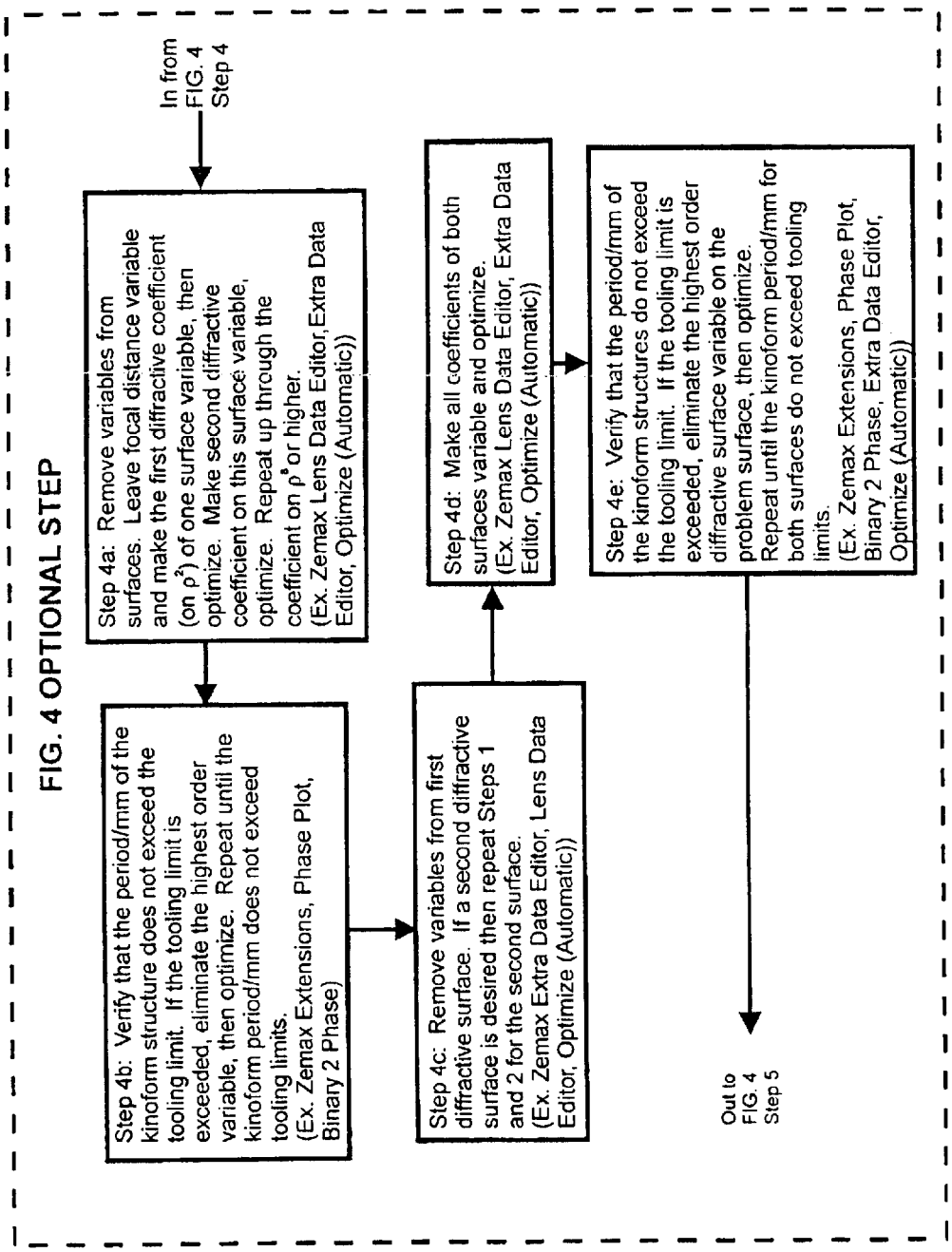
FIG. 11 illustrates additional methods for designing an optimized aspheric single lens microscope lens including kinoform surfaces.

The procedure for optimizing a double asphere, double kinoform single lens microscope lens follows the pattern presented above for optimization of a double asphere, with the additional steps of optimizing the kinoform surfaces one coefficient at a time after the aspheres have been optimized. The aspheres and kinoforms are then allowed to optimize at the same time, transforming the lens into a meniscus lens with the negative surface facing the specimen. The chromatic aberration correction provided by the kinoform surfaces allow the lens to optimize to a meniscus form that reduces spherical aberrations and field curvature. These additional optimization steps are schematically illustrated in FIG. 11. The steps of FIG. 11 fit into the "OPTIONAL: Optimize Diffractive Surface Parameters" element of FIG. 4.

According to one example, the wavelength chosen for optimization is 555 nm. This wavelength is preferred because it is the central or dominant wavelength emitted by a green LED. Any other suitable wavelength could be chosen. After the initial rounds of optimization two additional preferred wavelengths are added, 430 nm and 625 nm. These wavelengths were chosen because they are at the extreme ends of the visible spectrum and because they are the dominant wavelengths emitted by red and blue LED's, respectively. LED emission of any wavelength can be advantageously used with the presently described single lens microscopes.

For the system description of a single lens microscope lens it is convenient to define the field of the lens in terms of the object height at the focal plane. It is desirable to initially choose a large maximum field. If the lens does not optimize to an acceptable solution then the field can be reduced by a small amount and the lens optimized again. It is likewise desirable to choose a large entrance pupil. The two are not generally compatible. It is possible to obtain a good lens design for a large entrance pupil if the maximum field is small, but a lens will not optimize to as good a design if both the entrance pupil and the maximum field are large. The performance of the lens will generally be poor at all field positions because the optimization algorithm seeks the best average performance. Correspondingly, a good lens design can be obtained for a large maximum field with a small entrance pupil, but this results in a lens with a smaller numerical aperture and a lower resolution limit. It is therefore necessary to iterate from a large entrance pupil, large field design to some compromise design that combines a reasonably large numerical aperture with a reasonably large field diameter. The inventor has found that for a kinoform-corrected aspheric meniscus lens, a field diameter which is approximately 44 percent of the focal length of the lens, combined with a numerical aperture of approximately 0.26, yields excellent results.

Figure 12:
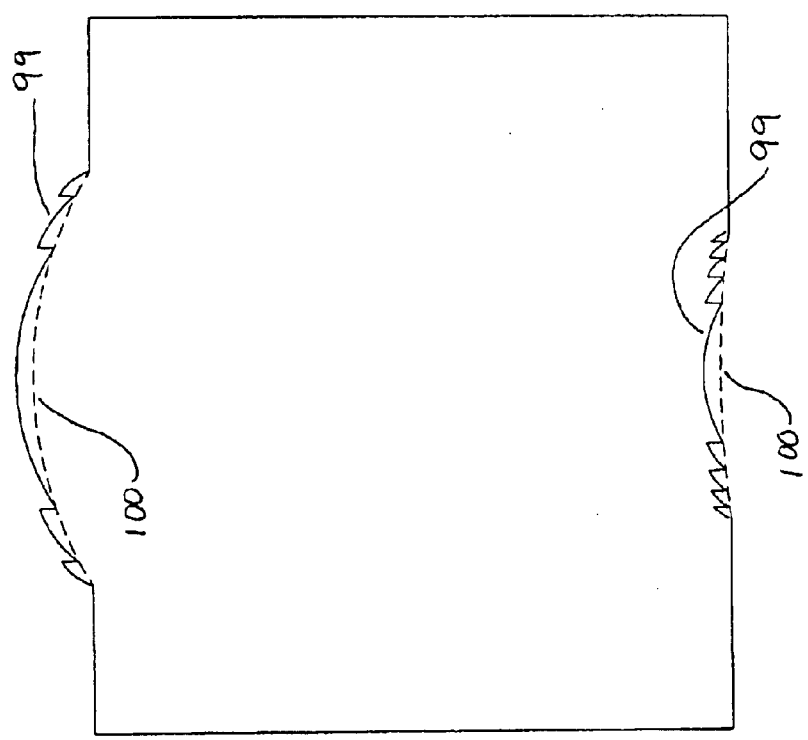
FIG. 12 schematically illustrates a particular kinoform-corrected double asphere mensicus lens design, with vertically exaggerated kinoform structure.

A preferred kinoform-corrected double asphere mensicus lens design, optimized to include 15 microns decentration error, is shown in FIG. 12. The shapes of the kinoform surfaces 99 are shown, with vertical exaggeration, superimposed on the lens. The aspheric lens surfaces 100 without the kinoform corrections are shown as dashed lines.

The inventor has discovered that the depth of field, image contrast, and resolution limit of a single lens microscope can be varied by controlling the effective numerical aperture of the single lens microscope. The effective numerical aperture of the lens can be controlled by the size of the aperture stop of the lens or by controlling the numercal aperture of the illumination.

If the numerical aperture of the illumination is equal to or greater than the numerical aperture of the lens, such that the illumination fills the full aperture of the lens, then the lens will provide optimum resolution with its smallest depth of field. If the numerical aperture of the illumination is reduced below that of the lens, the effective numerical aperture of the lens will become that of the illumination. Reducing the effective numerical aperture of the lens degrades the image resolution, increases the depth of field, and increases image contrast. It is thus possible to provide a range of values for image resolution, depth of field, and contrast by control of the numerical aperture of the illumination.

As an example, the inventor analyzed the depth of field of the lens of FIG. 12 for polychromatic illumination at three different spatial frequencies. The depth of field is taken at the central field position to be the distance between the two focal positions which show MTF=0.2. The maximum designed field diameter of this lens is 700 microns. This lens shows the following variation in depth of field as the effective aperture of the lens is varied (either by actual stopping-down of the lens or by reduction of the numerical aperture of the illumination):

TABLE 4

System prescription data for the lens of FIG. 12
(from Zemax Prescription Data output)

| GENERAL LENS DATA: | SURFACE DATA SUMMARY: |
|---|---|
| Surfaces 6 | Surf Type Comment |
| Stop: 1 | Radius Thickness G |
| System Aperture: Entrance Pupil | OBJ STANDARD |
| Diameter = 0.9 | Infinity −250 |
| Glass Catalogs: schott MISC | STO BINARY_2 |
| Ray aiming: Paraxial Reference, | 0.8149668 1.500001 ACR |
| cache on | 2 COORDBRK − |
| X Pupil shift: 0 | 0 |
| Y Pupil shift: 0 | 3 BINARY_2 3.680825 |
| Z Pupil shift: 0 | 0.500871 |
| Apodization: Uniform, factor = | 4 COORDBRK − |
| 0.00000E + 000 | 0 |
| Effective Focal Length: 1.66678 | 5 STANDARD Infinity |
| (in air) | 0.17 |
| Effective Focal Length: 1.66678 | IMA STANDARD |
| (in image space) | Infinity |
| Back Focal Len.: −0.004788269 | |
| Total Track: 2.170872 | SURFACE DATA DETAIL: |
| Image SpaceF/#: 1.851978 | |
| Paraxial Working F/#: 1.838367 | Surface OBJ: STANDARD |
| Working F/#: 1.860923 | Surface STO: BINARY_2 |
| Image Space N.A.: 0.2624062 | Coeff on r 2: 0 |
| Object SpaceN.A. : 0.001799997 | Coeff on r 4: −0.516054 |
| Stop Radius: 0.45 | Coeff on r 6: 13.629313 |
| Paraxial Image Height: 0.3375589 | Coeff on r 8: −227.55884 |
| Paraxial Magnification: 0.006619142 | Coeff on r 10: 2115.4776 |
| Entrance Pupil Diameter: 0.9 | Coeff on r 12: −11185.584 |

TABLE 4-continued

System prescription data for the lens of FIG. 12
(from Zemax Prescription Data output)

GENERAL LENS DATA:

Entrance Pupil Position: 0
Exit Pupil Diameter: 0.8278122
Exit Pupil Position: −1.537878
Field Type: Real Image height in Millimeters
Maximum Field: 0.35
Primary Wave: 0.587562
Lens Units Millimeters
Angular Magnification 1.087203

Fields : 4
Field Type: Real Image height in Millimeters

| # | X-Value | Y-Value | Weight |
|---|---------|---------|--------|
| 1 | 0.000000 | 0.000000 | 20.000000 |
| 2 | 0.000000 | 0.202000 | 20.000000 |
| 3 | 0.000000 | 0.286000 | 1.000000 |
| 4 | 0.000000 | 0.350000 | 1.000000 |

Vignetting Factors

| # | VDX | VDY | VCX | VCY |
|---|-----|-----|-----|-----|
| 1 | 0.000000 | 0.000000 | 0.000000 | 0.000000 |
| 2 | 0.000000 | 0.000000 | 0.000000 | 0.000000 |
| 3 | 0.000000 | 0.000000 | 0.000000 | 0.000000 |
| 4 | 0.000000 | 0.000000 | 0.000000 | 0.000000 |

Wavelengths: 3
Units: Microns

| # | Value | Weight |
|---|-------|--------|
| 1 | 0.430000 | 1.000000 |
| 2 | 0.587562 | 1.000000 |
| 3 | 0.656273 | 1.000000 |

SURFACE DATA SUMMARY:

Coeff on r 14: 31392.146
Coeff on r 16: −36310.574
Maximum term: 4
Maximum rad ap: 0.45
Term on P to 2: −30.643108
Term on P to 4: 0.0032017608
Term on P to 6: −3.275432
Term on P to 8: 1.4140634
Surface 2: COORDBRK
Decenter X: 0.015
Decenter Y: 0
Tilt About X: 0
Tilt About Y: −0.583
Tilt About Z: 0
Order: Decenter then tilt
Surface 3: BINARY_2
Coeff on r 2: 0
Coeff on r 4: 2.5855269
Coeff on r 6: −131.16532
Coeff on r 8: 5368.7736
Coeff on r 10: −114599.88
Coeff on r 12: 1360778.9
Coeff on r 14: −8511957
Coeff on r 16: 21886632
Maximum term: 3
Maximum rad ap: 0.3359
Term on P to 2: −28.267665
Term on P to 4: 0.79594381
Term on P to 6: −2.4457279
Surface 4: COORDBRK
Decenter X: −0.015
Decenter Y: 0
Tilt About X: 0
Tilt About Y: 0.583
Tilt About Z: 0
Order: Decenter then tilt
Surface 5: STANDARD
Surface IMA: STANDARD

EDGE THICKNESS DATA:

| Surf | X-Edge | Y-Edge |
|------|--------|--------|
| OBJ | −249.870410 | −249.870410 |
| STO | 1.370411 | 1.370411 |
| 2 | 0.033460 | 0.033460 |
| 3 | 0.467411 | 0.467411 |
| 4 | 0.000000 | 0.000000 |
| 5 | 0.170000 | 0.170000 |
| IMA | 0.000000 | 0.000000 |

TABLE 2

Depth of field as a function of effective numerical aperture for 100 cycles/mm
Spatial frequency: 100 cycles per mm
(image resolution of 10 microns):

| Effective Lens Aperture (mm) | Effective Numerical Aperture | Depth of Field (microns) | Peak MTF value |
|---|---|---|---|
| 0.9 | 0.262 | 65 | 0.85 |
| 0.675 | 0.2 | 79 | 0.81 |
| 0.45 | 0.135 | 127 | 0.73 |
| 0.22 | 0.066 | 307 | 0.47 |
| 0.15 | 0.0045 | 352 | 0.26 |

TABLE 2

Depth of field as a function of effective numerical aperture for 250 cycles/mm
Spatial frequency: 250 cycles per mm
(resolution of 4 microns):

| Effective Lens Aperture (mm) | Effective Numerical Aperture | Depth of Field (microns) | Peak MTF value |
|---|---|---|---|
| 0.9 | 0.262 | 33 | 0.63 |
| 0.675 | 0.2 | 37 | 0.54 |
| 0.45 | 0.135 | 60 | 0.37 |
| 0.22 | 0.066 | NA (not resolved) | 0.03 |
| 0.15 | 0.0045 | NA (not resolved) | 0.0 |

Thus at an image resolution of 10 microns, controlling the effective numerical aperture the lens of FIG. 12 over the range 0.262–0.0045 enables selection of a depth of field that ranges from 65 microns to 352 microns.

Thus at an image resolution of 4 microns, controlling the effective numerical aperture the lens of FIG. 12 over the range 0.262–0.135 enables selection of a depth of field that ranges from 33 microns to 60 microns.

TABLE 2

Depth of field as a function of effective numerical
aperture for 757 cycles/mm
Spatial frequency: 757 cycles per mm
(resolution of 1.3 microns)

| Effective Lens Aperture (mm) | Effective Numerical Aperture | Depth of Field (microns) | Peak MTF value |
|---|---|---|---|
| 0.9 | 0.262 | 11 | 0.27 |
| 0.675 | 0.2 | NA (not resolved) | 0.0 |
| 0.45 | 0.135 | NA (not resolved) | 0.0 |
| 0.22 | 0.066 | NA (not resolved) | 0.0 |
| 0.15 | 0.0045 | NA (not resolved) | 0.0 |

Thus at a resolution of 1.3 microns, the lens of FIG. 12 attains a depth of field of 11 microns at full aperture. Reduction of the effective aperture below 0.8 mm reduces the MTF below the threshold of visibility. This example demonstrates clearly that depth of field of a single lens microscope can be controlled over a wide range by means of controlling the effective numerical aperture of the lens. These methods of controlling the depth of filed of a single lens microscope are applicable to single lens microscope lenses of any design, including but not limited to ball lenses, double convex spheric lenses, spheric meniscus lenses, double convex aspheric lenses, aspheric meniscus lenses, kinoform-corrected spheric lenses, kinoform-corrected aspheric lenses, and kinoform-corrected aspheric meniscus lenses, among others.

At the finest resolution analyzed here, 1.3 microns, the depth of field is 11 microns, or +/−5.5 microns from the focal plane. Humans can easily distinguish focus differences amounting to a 2 percent change in the MTF value. The difference in the peak MTF (0.27) and the MTF at the extents of the depth of field (0.20 by definition) is 0.7, or 7 percent. Since humans can easily distinguish 2 percent differences in MTF values, the eye can differentiate about 4 levels of depth above the focal plane and 4 levels below, for a total of 8 levels. If we divide the depth of field, 11 microns, by the number of distinguishable depth levels, 8, we find that the eye can attain a depth resolution of about 1.3 microns. Considering that the spatial resolution of this lens is about 1.3 microns in the X-Y plane, and the depth (Z dimension) resolution is also 1.3 micron, it can be seen that the lens of FIG. 12 provides a balanced visual perception of the three dimensions of a microscopic specimen.

A high quality Planapo 150× compound microscope objective lens can also attain this balance, but at the cost of field diameter. While the lens of FIG. 12 has a maximum designed field diameter of 700 microns, a compound microscope utilizing a 10× eyepiece with a planapo 150× objective lens will have a field diameter on the order of 70 microns, or less. Thus the lens of FIG. 12 shows 100 times more area of the specimen than would be visible with this compound microscope arrangement. Aperture optimized single lens microscopes according to the present invention thus provide a balanced visual perception of the shape of microscopic specimens while maintaining a large field of view. This beneficial result cannot be accomplished with a compound microscope.

Aperture optimized single lens microscopes provide additional and unexpected image benefits. It is a widely held belief, among those microscopists that are aware of single lens microscopes, that single lens microscopes produce images which are inferior to the images produced by compound microscopes. While it is true that the ultimate useful magnification of single lens microscopes (about 500×) cannot match the ultimate useful magnification of the best compound microscopes (about 1,200×), the inventor has discovered that the single lens microscope is capable of providing hitherto unrecognized, useful image properties as compared to compound microscope images.

A compound microscope divides the image magnification between the objective lenses and the eyepiece lenses. A 150× compound microscope typically utilizes a 10× eyepiece and a 15× objective. The focal length, f (in mm), of a lens is determined by its magnification, M, following the formula:

$$f=250/M \qquad \text{Eq. 11:}$$

Where:
f=focal length in millimeters
M=magnification

A 15× objective lens therefore has a focal length of 16.7 mm. This long focal length limits the numerical aperture, NA, of a compound microscope objective lens, and therefore controls the compound microscope's resolution limit according to the Rayleigh criterion. A typical NA for a school-grade 150× compound microscope objective is 0.17, yielding a diffraction limited theoretical resolution of 2.0 microns. The actual resolution of the objective will be larger than this by a factor of at least 1.25 because of the optical aberrations of the individual lens elements, misalignments between lenses, and optical and mechanical tolerances. The actual resolution limit of this objective will therefore be no better than 2.5 microns.

A single lens microscope must accomplish the entire magnification with its single lens. The focal length of a 150× single lens is therefore:

$$f=250/150=1.67 \text{ mm} \qquad \text{Eq. 12:}$$

The short focal length and maximum aperture diameter of an aperture optimized single lens microscope result in a larger numerical aperture. A larger numerical aperture provides a superior resolution limit. The lens of FIG. 12 has a numerical aperture of 0.262, yielding a theoretical resolution of 1.3 microns at an illumination wavelength of 550 nm. (Illumination with blue light at a wavelength of 0.44 microns results in a theoretical resolution of 1.0 micron.) The actual aberrated resolution of the lens of FIG. 12 is nearly identical to its theoretical resolution because the lens has been designed to eliminate aberrations through the use of aspheric and kinoform surfaces, and there are no other lens elements to contribute aberrations and misalignment errors. Thus, unexpectedly, the resolution limit of the 150× single lens of FIG. 12 embodiment significantly surpasses the resolution limit of a typical 150× compound microscope optical system.

In addition to the superior resolution provided by the kinoform-corrected aspheric meniscus lens of FIG. 12, this lens provides additional benefits over an optimized ball lens: it has substantially less field curvature, it reveals the true color of a specimen, and it provides a larger back focus to enable deeper examination into a slide.

The large numerical aperture and short focal length of an aperture optimized single lens microscope according to the present invention provide additional benefits. As shown above, the depth of field of a single lens microscope depends inversely on its numerical aperture. Compound microscope objectives, typically having a relatively small numerical aperture, have a large depth of field, producing an image that is in focus over a large range of depth positions, similar to the image produced by a telephoto lens. This kind of image does not provide strong visual depth cues, so the image appears flattened, as though everything is at the same distance from the eye. It has generally been assumed that it is desirable for a microscope to have a large depth of field, but the inventor has discovered that a shallow depth of field provides valuable depth cues that are missing from the image produced by a conventional microscope. Aperture optimized single lens microscopes according to the present invention provide such a shallow depth of field.

Many microscopic subjects, such as live paramecium, appear flattened and two dimensional when viewed through a conventional microscope. These same subjects reveal their third dimension when viewed by means of aperture optimized single lens microscopes according to the present invention. The shallow depth of field provided by aperture optimized single lens microscopes according to the present invention produced differences in focus between the front and back surfaces of the microscopic subject which highlight its roundness in a novel and astonishing way. While a paramecium viewed with a conventional microscope appears flattened, that same paramecium shows its true three dimensional form when viewed with aperture optimized single lens microscopes according to the present invention. As a further example, spirochete bacteria appear to be flat, wiggling sine waves when viewed with a conventional microscope, but aperture optimized single lens microscopes according to the present invention reveal the spirochetes to actually be helical coils!

The shallow depth of field of aperture optimized single lens microscopes according to this invention also provide a novel optical sectioning effect that is similar to that produced by a scanning confocal microscope. Referring to a live paramecium again, the lens of an aperture optimized single lens microscope according to the present invention can be focused on the upper surface of the paramecium, showing its cilia in sharp detail, then focused on the midplane of the creature, highlighting its nucleus and contractile vacuoles, then focused on its lower surface and its cilia. As an additional example, the delicate, bell-shaped and lace-like glassy shells of radiolaria can be confusing to view by means of a conventional microscope because both the upper and lower surfaces of the radiolarian are in focus at the same time. The shell of a radiolarian is pierced with a regular network of holes and the large depth of field of a conventional microscope causes the patterns of both the upper and lower surfaces to appear to be superimposed, making it very difficult to distinguish the two surfaces from each other. When viewed through aperture optimized single lens microscopes according to the present invention, the upper and lower surfaces of radiolaria shells are easily distinguished by choosing one surface or the other to focus on. In both of these examples the features of the specimen in the focal plane stand out in sharp detail, while the features above and below the focal plane are muted.

Although many benefits are derived from having a shallow depth of field, situations may arise wherein a large depth of field is preferred. Aperture optimized single lens microscopes according to the present invention can be altered to provide a large depth of field by restricting its aperture stop diameter of the lens. The resulting lens exhibits a larger depth of field but it suffers from a reduction in resolution because of the smaller aperture. One embodiment of aperture optimized single lens microscopes according to the present invention includes a multiplicity of single lenses having different magnifying powers and/or different depths of field, which can be slid or rotated into position for use. One particularly useful combination is a large depth of field 150× lens and a shallow depth of field 150× lens. The former acts as a survey lens, allowing the user to quickly scan a specimen volume for an item of interest, while the latter acts as a detail lens, providing high resolution and shape-revealing images of the selected region.

As stated above, the effective numerical aperture of aperture optimized single lens microscopes according to the present invention can also be controlled by the numerical aperture of the illumination.

A further novel benefit provided by aperture optimized single lens microscopes according to this invention is an enhancement of image contrast Live bacteria are difficult to see by means of a conventional microscope in bright-field illumination because they do not present sufficient contrast. Dark-field illumination used with 300× or higher is typically required for viewing living bacteria, but the nature of dark field illumination is to present the subject as bright light-scattering points against a dark background. This effectively transforms each bacterium into a scattering point-source of coherent light, producing diffractive effects which degrade the image. Aperture optimized single lens microscopes according to the present invention can produce images having high contrast using bright-field illumination, enabling live bacteria to be easily seen at 150× without the need to resort to dark-field illumination. A further benefit is provided because the bright-field image of aperture optimized single lens microscopes according to the present invention is not degraded by diffractive effects as much as a conventional dark-field would be. Although dark-field illumination can be used with aperture optimized single lens microscopes according to the present invention, it is not preferred, since it does not usually provide significant benefits over bright-field illumination.

Figure 13:
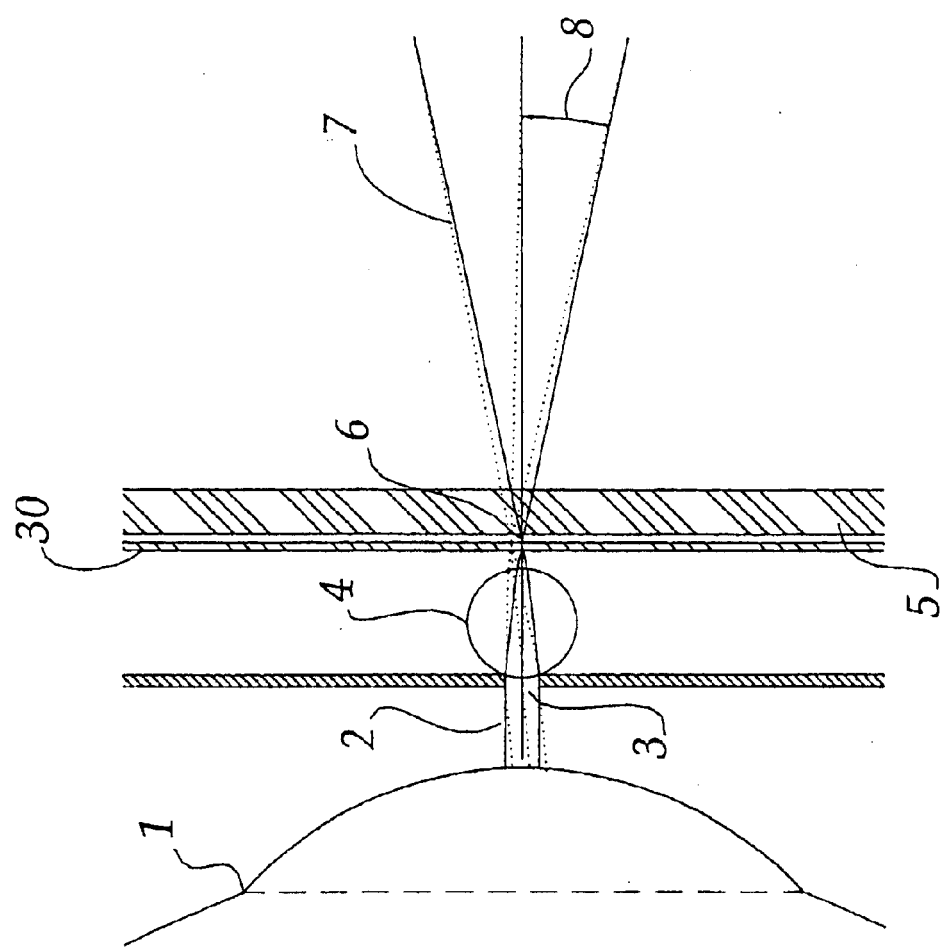
FIG. 13 illustrates aspects of single lens microscopes according to the present invention.

Additional aspects of the present invention may be understood by further examination of the figures. FIG. 13 illustrates aspects of single lens microscopes according to the present invention. An observer's eye 1 receives diverging image rays 2 through optimized aperture 3 from lens 4. Lens 4 is focused on microscope slide 5 bearing specimen 6 at the lens focus. The diverging image rays 2 form a magnified virtual image of specimen 6 which appears to the eye 1 to lie approximately 250 mm outward from the eye 1. Illumination rays 7 pass through the under surface of slide 5 to illuminate the specimen 6.

The use of an aperture optimized to provide the best resolution from a single lens microscope is an important aspect of single lens microscopes according to this invention. Although the lens shown in FIG. 13 is a ball lens, a lens of any form may be used, including any of the lenses disclosed above, with the diameter of the aperture optimized to maximize the lens performance. Because of the short focal length of a high magnification single lens, the lens 4 must be in close proximity to the specimen 6 being examined. The observer's eye 1 must be in close proximity to the optimized aperture 3 in order to receive the image rays 2 from different field positions. If the eye 1 is far from the optimized aperture 3 then only image rays from the center of the field will enter the eye, the rays from the field positions away from the center will be cut off by the edge of the pupil of the observer's eye 1. The pupil of the observer's eye thus functions as the field stop of a single lens microscope.

Figure 14:
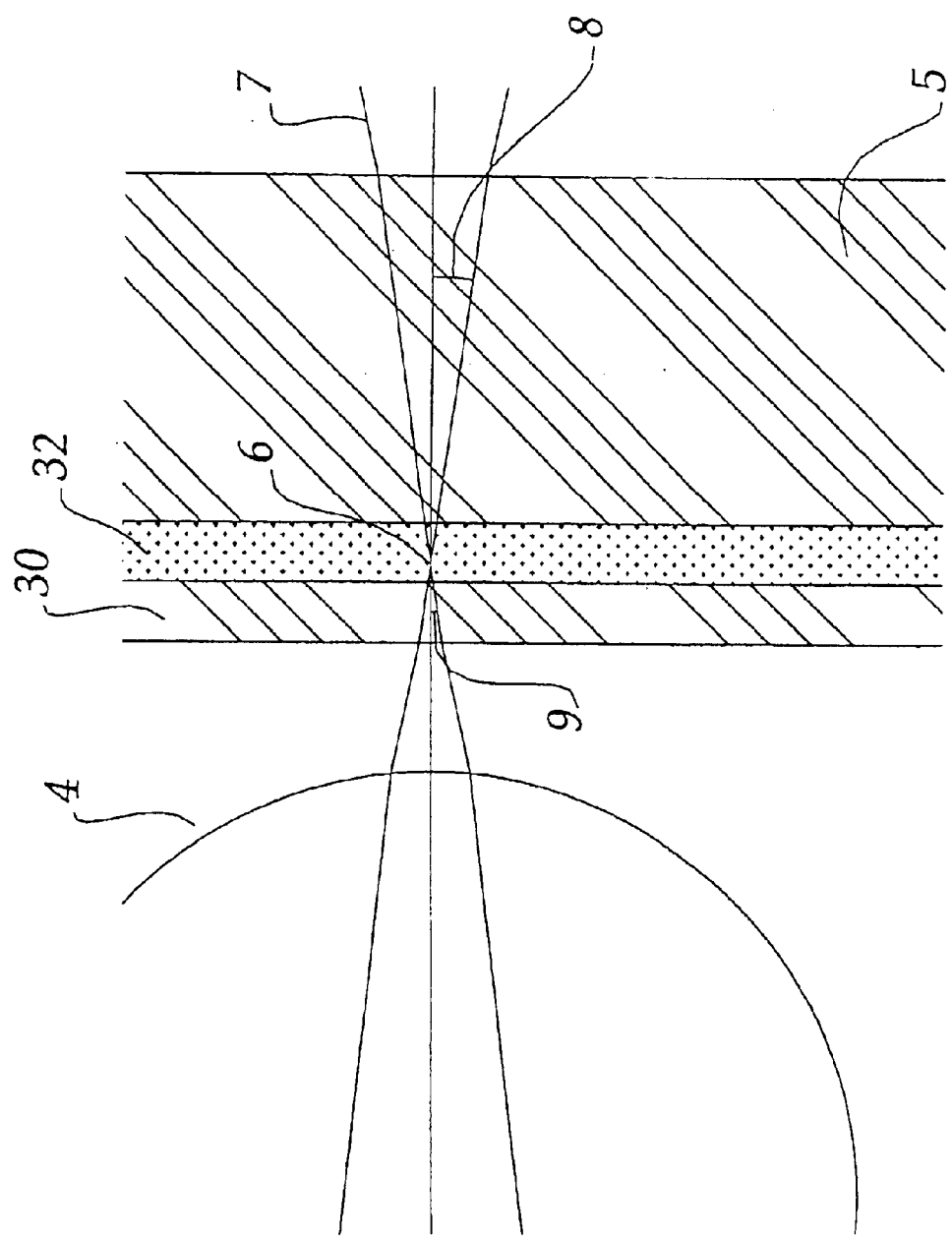
FIG. 14 illustrates a detailed view of the a focal region of a single lens microscope according to the present invention.

FIG. 14 illustrates a detail view of the focal point of the single lens microscope shown in FIG. 13. The light rays shown originate from the specimen 6, enter the lens 4 and fill the optimized lens aperture 3. The half angle 9 of this light cone, measured in the medium 32 holding the specimen, is the value U used to determine the numerical aperture of the lens. The numerical aperture of the lens determines the resolution limit set by the Rayleigh criterion. The half angle 8 of the light cone 7 illuminating the specimen, again measured in the medium 32 holding the specimen, determines the numerical aperture of the illumination.

Figure 15:
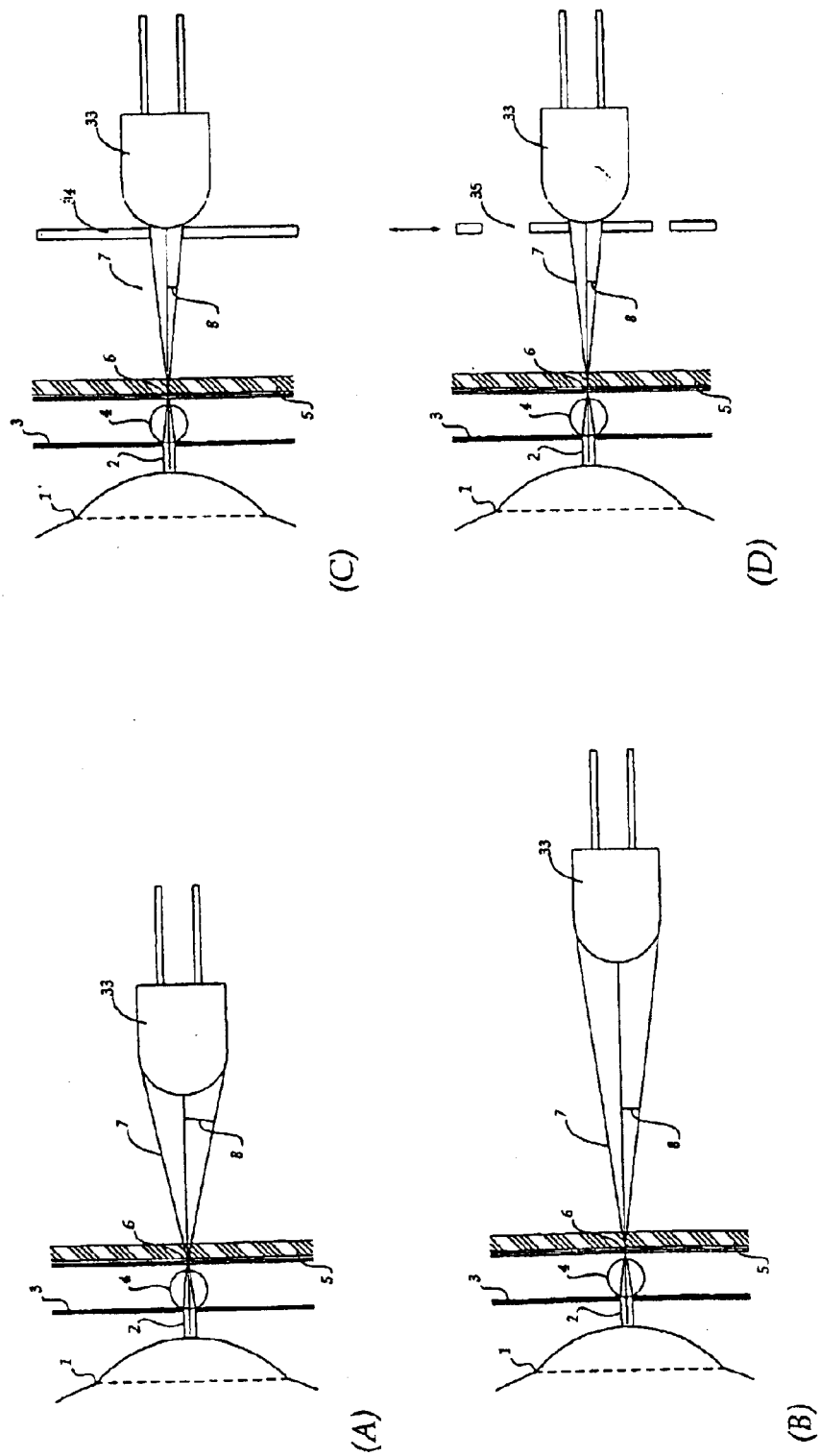
FIGS. 15–16 illustrate structures and mechanisms for controlling the numerical aperture of the illumination.
Figure 16:
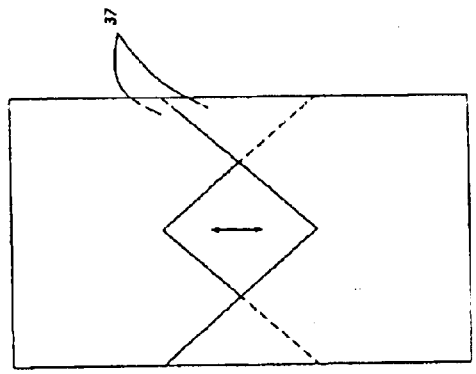
Figure 16:
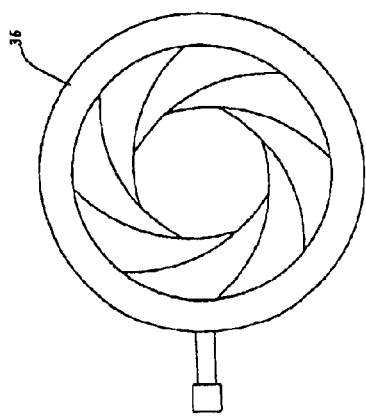
Figure 16:
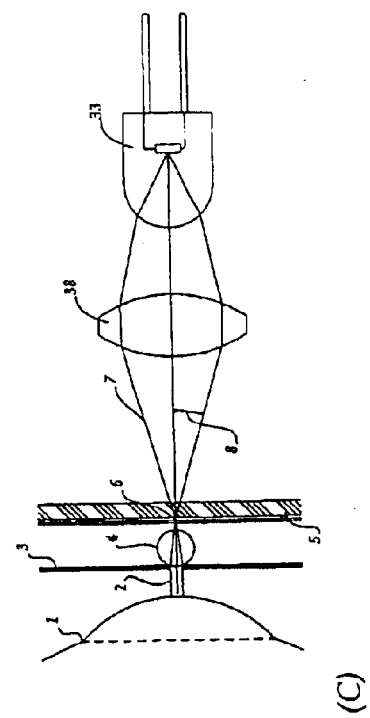

The numerical aperture of the illumination 7 can be controlled by many different means, some of which are illustrated in FIG. 15. If the illumination source 33 is an extended source, such as a frosted incandescent light bulb or an LED with a diffusing lens, then its numerical aperture can be controlled by moving it closer to, or further from, the specimen 6. Alternatively, the numerical aperture of an extended source can be controlled by the use of an aperture 34, a multiplicity of selectable apertures 35. In addition, FIG. 16 illustrates other devices or mechanisms that can be used to control the illumination numerical aperture of devices or microscopes according to the present invention. These include a variable aperture, such as an iris aperture 36 or two notched plates 37 that can be positioned to create an aperture of variable size. In addition, a focusing system 38 may be used to control the half angle 8 of the cone of illumination 7. These methods may be combined, such as by incorporating a variable aperture with a focusing system to provide a means to control the numerical aperture of the illumination 7.

Because of the need to have the eye 1 in close proximity to the microscope slide 5 in a single lens microscope, there is a risk of injury to the eye from the sharp edges of the microscope slide 5. There is a further risk of injury to the eye 1 if the microscope slide 5 or cover glass 30 breaks, resulting in splinters of glass that may fall into, or be projected into, the eye 1, or if the specimen 6 or the specimen medium 32 fall off the slide into the eye 1. Single lens microscope s according to the present invention can therefore be improved by providing structure between the eye 1 and the microscope slide 5.

Figure 17:
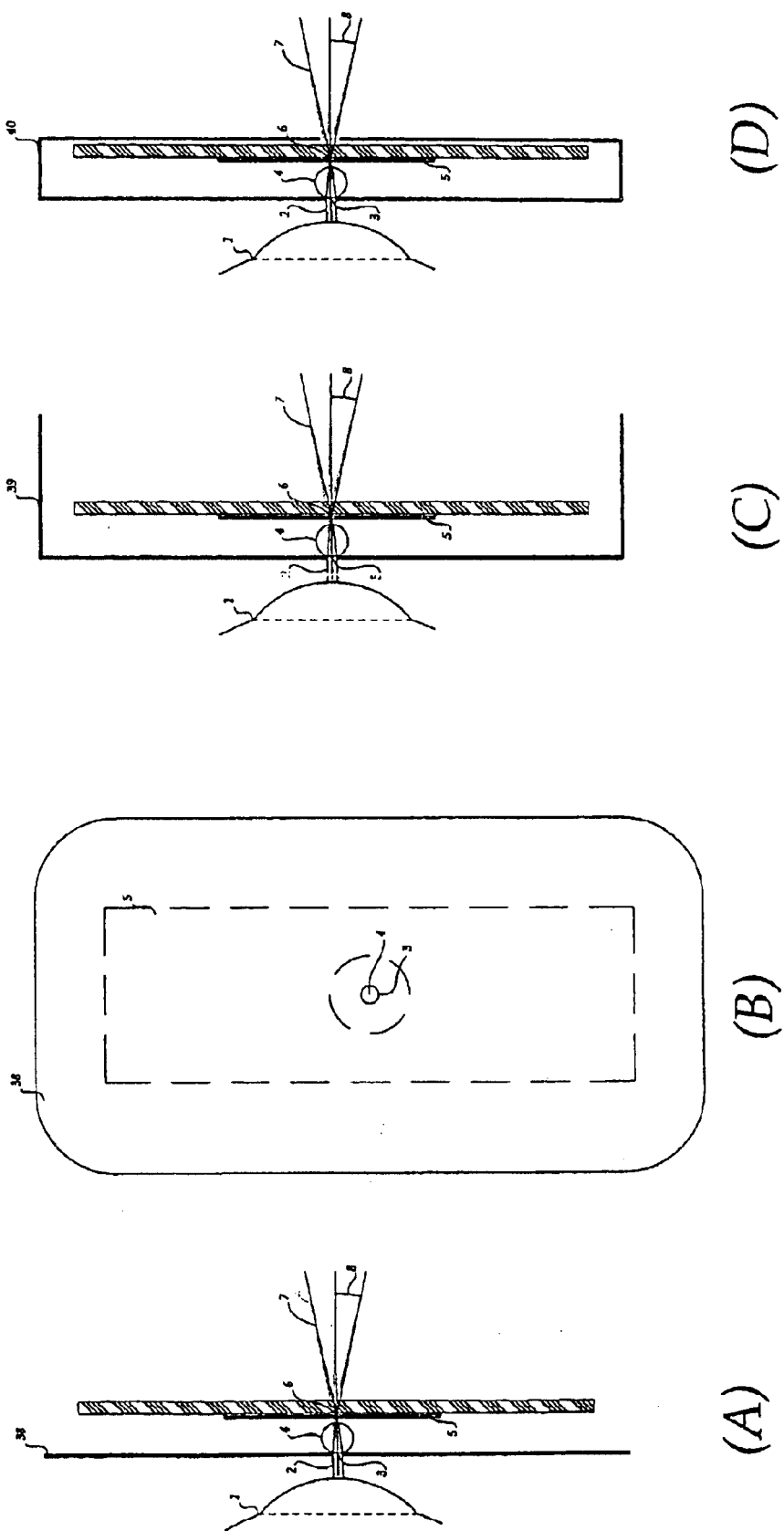
FIG. 17 illustrates structures provided to protect the eye.

As illustrated in FIG. 17a, the structure 38 provided to protect the eye 1, whether formed of one component or more, includes the optimized lens aperture 3, extends beyond the edges of the microscope slide 5 as illustrated in FIG. 17b, and does not contain any substantially unfilled openings between the eye 1 and the slide 5. The optimized lens aperture 3 does not constitute an unfilled opening in the structure because it is filled by the lens 4. Additional protection for the eye is provided if one or more sides of the structure are enclosed, forming a partial box 39 as illustrated in FIG. 17c. FIG. 17d illustrates that further protection is provided if the structure forms a box 40 that encloses, or substantially encloses, the whole microscope slide 5. Openings in the faces of the structure that do not face the eye 1 do not substantially diminish the protection provided.

Figure 18:
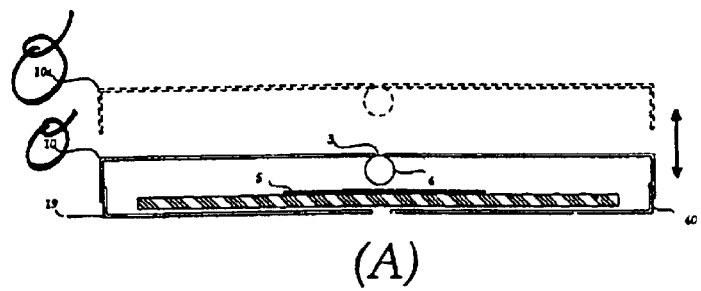
FIG. 18 illustrates methods for opening and closing structures protecting the eye.
Figure 18:
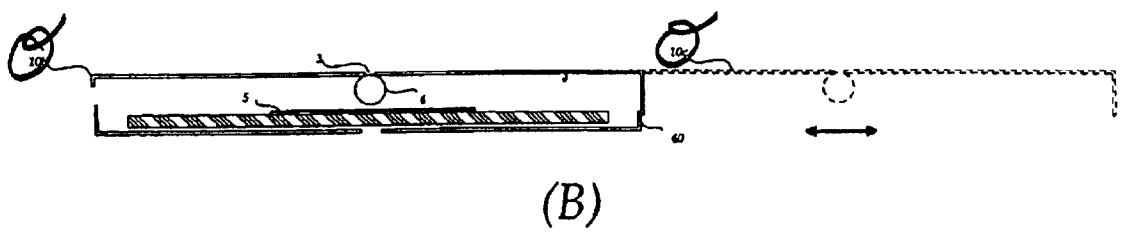
Figure 18:
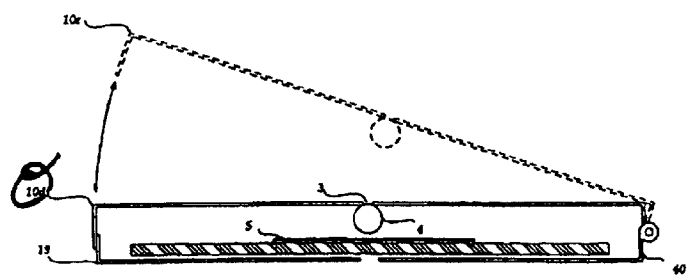
Figure 19:
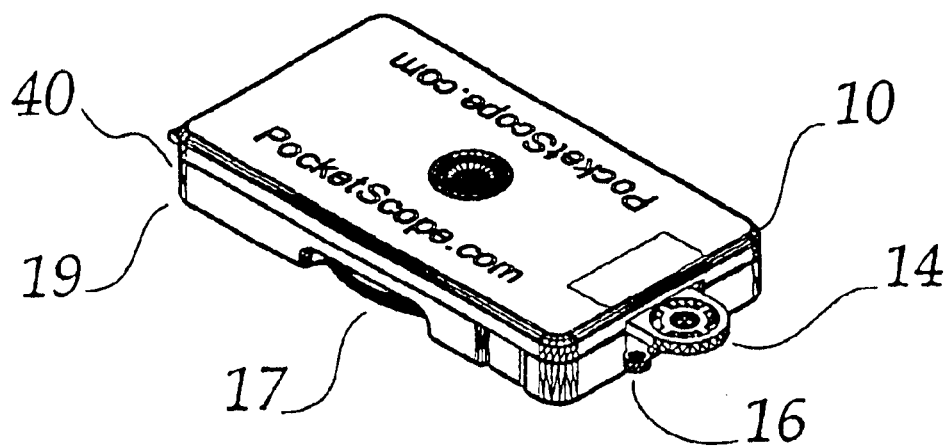
FIG. 19 illustrates a perspective view of a particular microscope according to the present invention.
Figure 20:
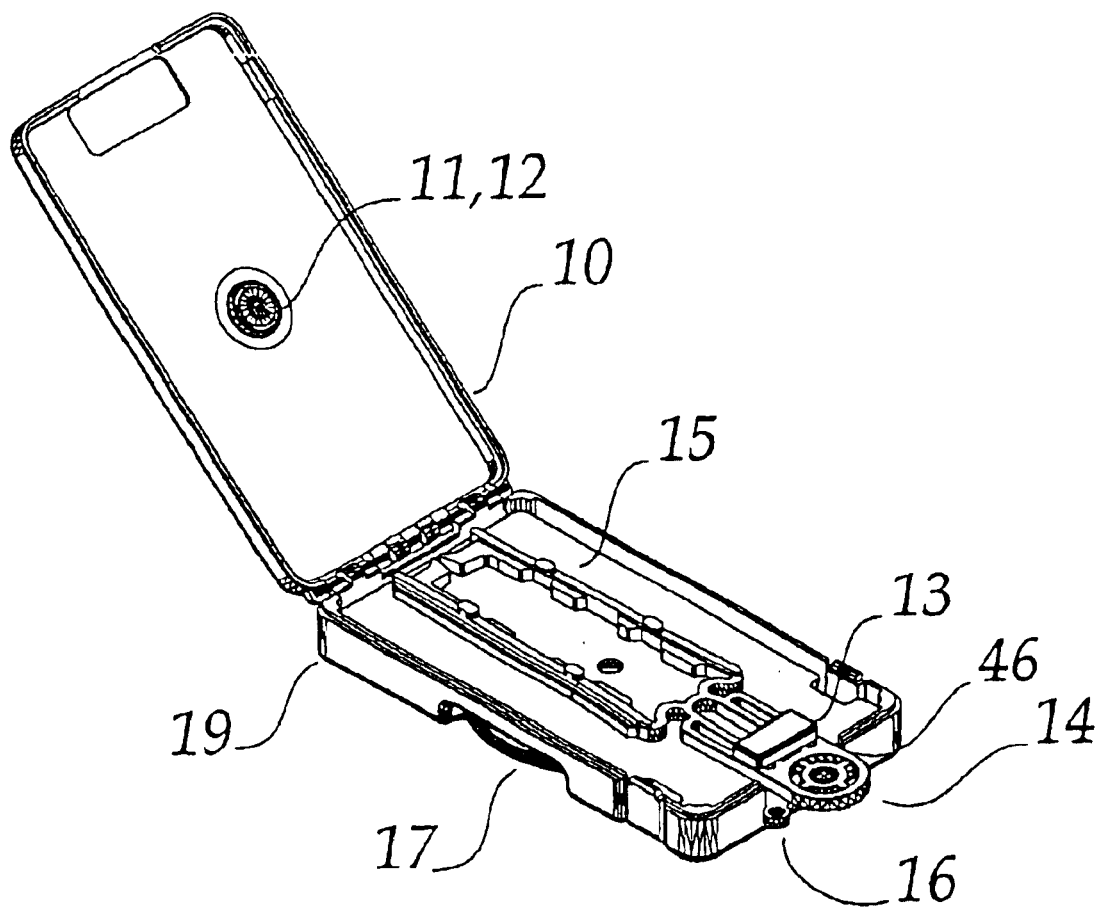
FIG. 20 illustrates a perspective view of a particular microscope according to the present invention in the open configuration for slide loading.

In order to facilitate access to the microscope slide, FIG. 18 illustrates how structure 40 according to the present invention may be constructed to be opened and closed by providing a removable cover 10 bearing the lens 4 and a base 19 bearing the microscope slide 5. Cover 10 may be removable from base 19 by lifting in a direction substantially perpendicular to its largest surface, as shown in FIG. 18a, by sliding in a direction substantially parallel to its largest surface, as shown in FIG. 18b, by hinge rotation substantially about an edge of base 19, ash shown in FIG. 18c, or by a combination of these means, such as first sliding cover 10 in a direction parallel to its largest surface, followed by hinge rotation about an edge of base 19. FIGS. 19 and 20 illustrate a particular embodiment of the structure 40 according to the present invention wherein the cover 10 is connected by a hinge pin 20 (shown in FIG. 21) to the base 19.

A further improvement to devices or microscopes according this invention can be provided by incorporation of a lock or catch 43 to secure the cover 10 to the base 19 in the closed position. A particular example of a catch 43 on the base and a lip 44 on the cover is illustrated in FIGS. 19–22.

Devices or microscopes according to the present invention can be further improved by the addition of a focusing structure or mechanism to move the microscope slide 5 and lens 4 closer together or further apart. The lens 4 forms an image of that part of the specimen 6 that lies in the lens' 4 focal surface. Movement of the specimen 6 into coincidence with the focal surface brings the specimen into focus, while movement of the specimen 6 out of coincidence with the focal surface brings the specimen out of focus. Either the lens 4 can move with respect to the specimen 6, the specimen 6 can move with respect to the lens 4, or both lens 4 and specimen 6 can move with respect to each other. A number of devices or mechanisms can be used to provide the relative movement between the slide 5, bearing the specimen 6, and the lens 4 to accomplish focus control. A stable focus mandates that a mechanical connection exist between the slide 5 and the lens 4, and that this mechanical connection is adjustable to vary the distance between the lens 4 and the slide 5. This mechanical connection to accomplish focus control can include a stage 15 to hold the slide 5, a device or mechanism to secure the lens 4 to the cover 10, and a device or mechanism to move the stage 15 with respect to the cover 10, or visa versa.

Figure 21:
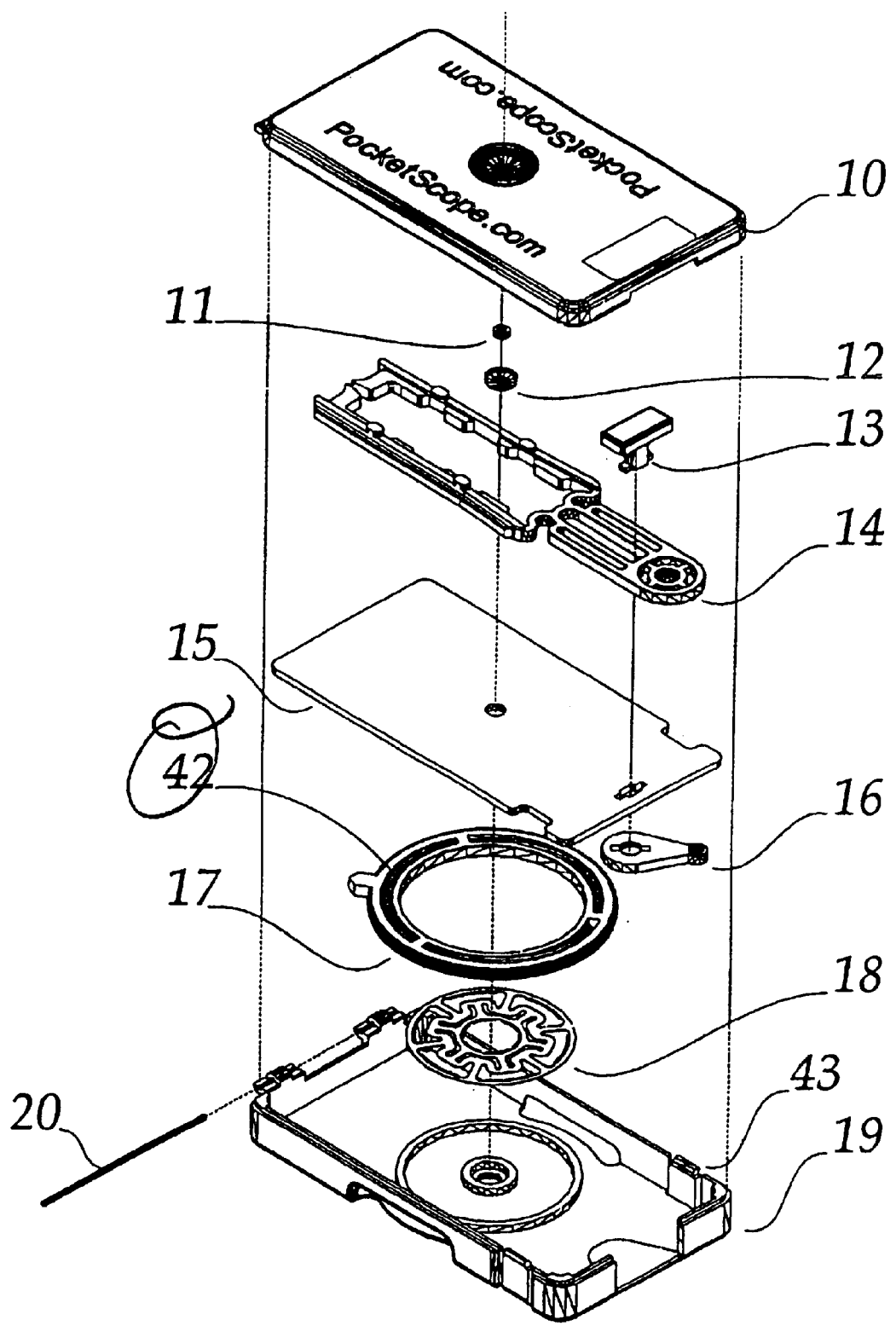
FIG. 21 illustrates a perspective exploded view of a particular microscope according to the present invention showing the upper surfaces of the component parts.

The focus movement device or mechanism can include a screw-jack, a scissors jack, a rack and pinion, a cam and follower mechanism, a simple lever, a compound lever, a pantographic linkage, a four-bar linkage, one or more inflatable vessels or bladders, one or more pistons and cylinders, a cable and pulley arrangement, motor driven actuators, piezoelectric actuators, inchworm drives, or other similar mechanical, electromechanical, pneumatic, hydraulic, or piezoelectric means or combinations thereof. A preferred focus device, discussed in detail later, is shown in FIGS. 20 and 21. It consists of a cam and follower mechanism that raises and lowers the stage 15 with respect to the lens 4.

Providing a stage 15 to support the microscope slide 5 inside of the structure 40 is an additional improvement to devices or microscopes according to the present invention. The stage 15 preferably forms a surface for the positioning of the slide in a plane parallel to the lens 4, so that different parts of the specimen 6 may be examined by movement of the slide in the plane of the stage 15 without altering the position of the slide 5 with respect to the focal plane of the lens.

Because a microscopic specimen typically is not visible to the unaided eye, it is usually not possible to align the position of specimen exactly at the focus of a single lens microscope before viewing it through the microscope. Furthermore, as in the case of observation of live single-celled animals such as are found in pond water, the subject being observed may move around underneath the cover glass of the microscope slide. Thus it is desirable to be able to move the microscope slide while one is observing it. Devices or microscopes according to the present invention can accordingly be further improved by providing an internal slide holding device or mechanism to hold the slide inside of the structure 40 combined with an externally accessible device or mechanism to enable manipulation of the slide position.

This internal slide holding device or mechanism and external control device or mechanism can be designed in many ways. The coupling between the exterior control device or mechanism and the interior slide holding device or mechanism may be accomplished by magnets on the slide holding device or mechanism which are magnetically coupled to magnets exterior to the microscope such that the movement of one set of magnets on the outside cause magnets on the slide holding device or mechanism to track that movement. In such an arrangement it may be necessary to utilize an intermediary coupling device or mechanism to bridge the gap between the back or side of the structure enclosing the microscope slide and the slide holding device or mechanism.

Another device or mechanism to control the position of the microscope slide from the outside of the structure is to physically attach a handle to the microscope slide holding device or mechanism and to provide that the handle extends outside of the structure containing the slide. An external handle connected to the internal slide holding device or mechanism can be further enhanced by providing a guiding device or mechanism for the handle such that the motion of the handle, and therefore the slide, is restricted by tracks or guides. This guiding device or mechanism may include a pivot and slide point that allows the slide holding device or mechanism to be rotated about a fixed point and translated with respect to that point. Alternatively, the guiding device or mechanism may include a compound linkage that provides a more complex movement to the slide in response to exterior manipulation of the handle. The guiding device or mechanism may include any combination of translation and rotation that restricts the movement of the slide holding device or mechanism to the plane of the stage, including one direction of translation and one direction of rotation; two directions of rotation and one direction of translation; two directions of rotation and two directions of translation; one direction of rotation and two directions of translation; or two directions of rotation.

Figure 23:
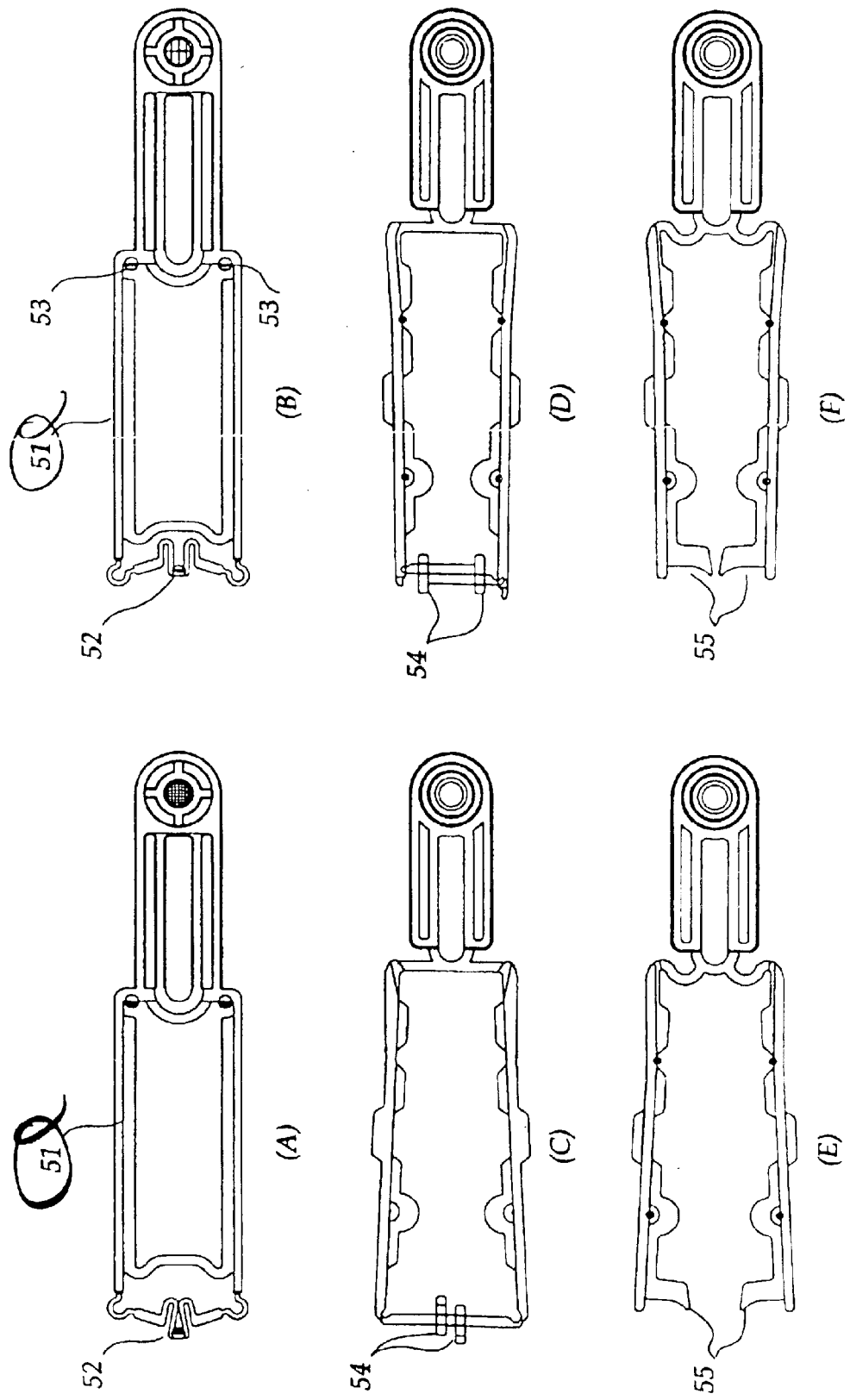
FIG. 23 illustrates structures and devices for holding microscope slides.

FIG. 23 illustrates several structures or mechanisms for holding a microscope slide. FIG. 23a–b show a structure that has rigid sides but a flexing slide gripping member 52. FIG. 23a shows the slide gripping member 52 flexed outward, providing space for a microscope slide to fit in the recessed center of the slide holder 41. The slide gripping member 52 can be flexed into a closed position, shown in FIG. 23b to provide a gripping force against the slide catches 53. The sides of design of FIG. 23c–d flex open when finger tabs 54 are pressed together, allowing a slide to be placed in between the sides of the slide holder. When pressure is released from the finger tabs 54 the sides of the slide holder close to grip the edges of the slide. The design of FIG. 23e–f works in a similar manner, excepting finger tabs 55 are spread apart to open the holder and released to allow the slide holder to close and grip the slide.

A preferred internal slide holding device or mechanism, external slide control device or mechanism, and guiding device or mechanism is shown in FIGS. 19–22. The slide guide 14 includes a slide holding device or mechanism 41 that is enclosed by the structure 40. The handle 42 of the slide guide 14 is constrained to move in the plane of the stage 15 by the clamp 13. The shaft of the clamp 13 restricts the motion of the slide guide 14 handle to translation in the direction of the handle slot 45 and rotation about the clamp 13. The handle 42 of the slide guide 14 extends out of the structure 40 through an opening 46 (FIG. 20) in the end opposite the hinge.

Figure 22:
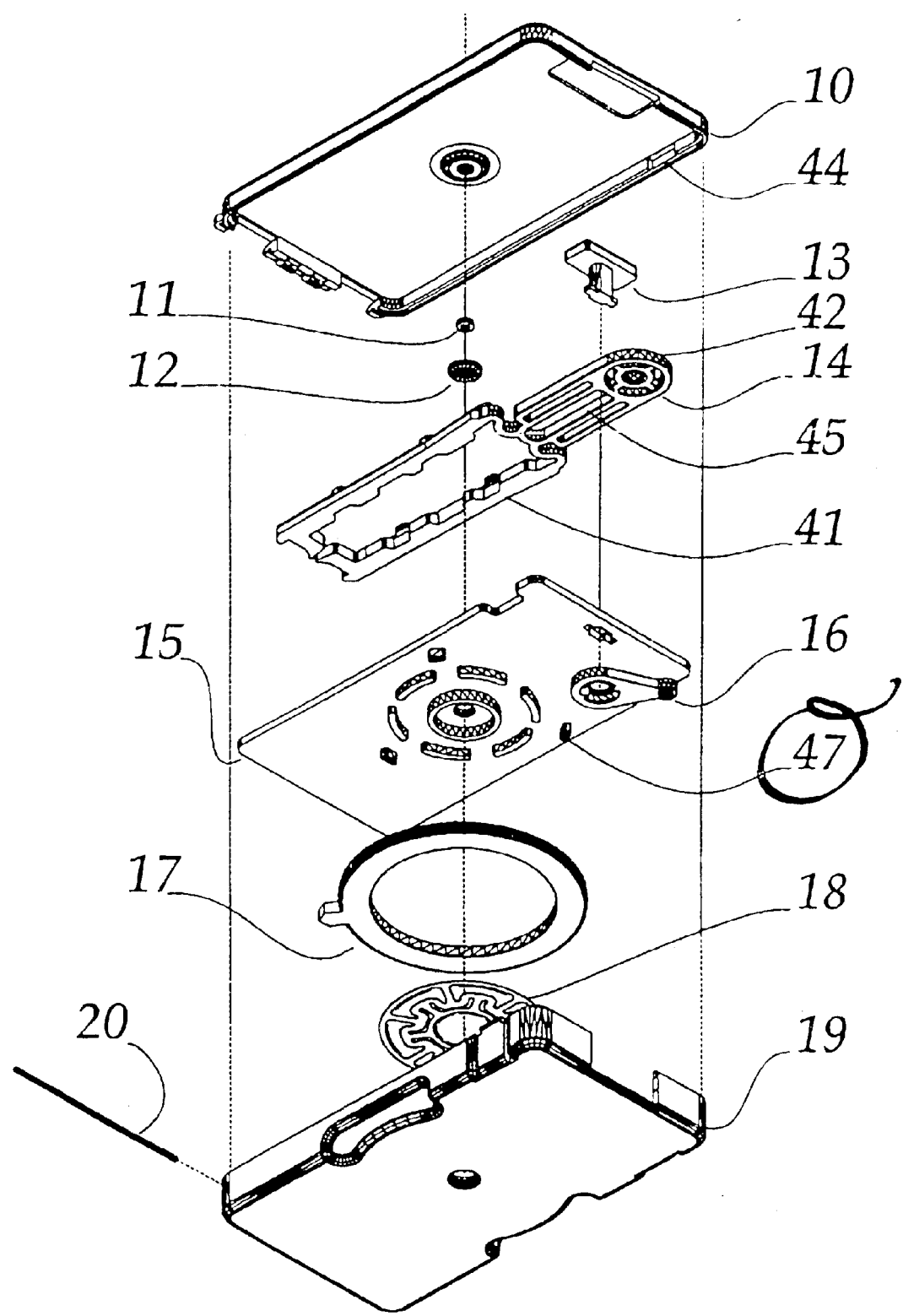
FIG. 22 illustrates an underside perspective exploded view a particular microscope according to the present invention showing the under surfaces of the component parts.

When a teacher uses devices or microscopes according to the present invention in a classroom, she may wish to locate a point of interest on a microscope slide and then lock the slide in position so the microscope can be passed around from student to student without dislodging the slide from its desired position. Accordingly, devices or microscopes according to the present invention can be improved by incorporating a slide position locking device or mechanism. One example of a slide locking mechanism, illustrated in exploded view in FIGS. 21–22, is a cam or screw structure 16 combined with a clamp structure 13 to provide a clamping force between the slide guide 14 and the stage 15. Other devices, structures or mechanisms that provide a binding, jamming, clamping, or gripping force between the slide guide 14 and the stage 15 can also serve this purpose. Examples of devices, structures, or mechanisms to lock to position of the slide include magnets, wedges, screws, levers, ratchets, gears, and cams.

Figure 24:
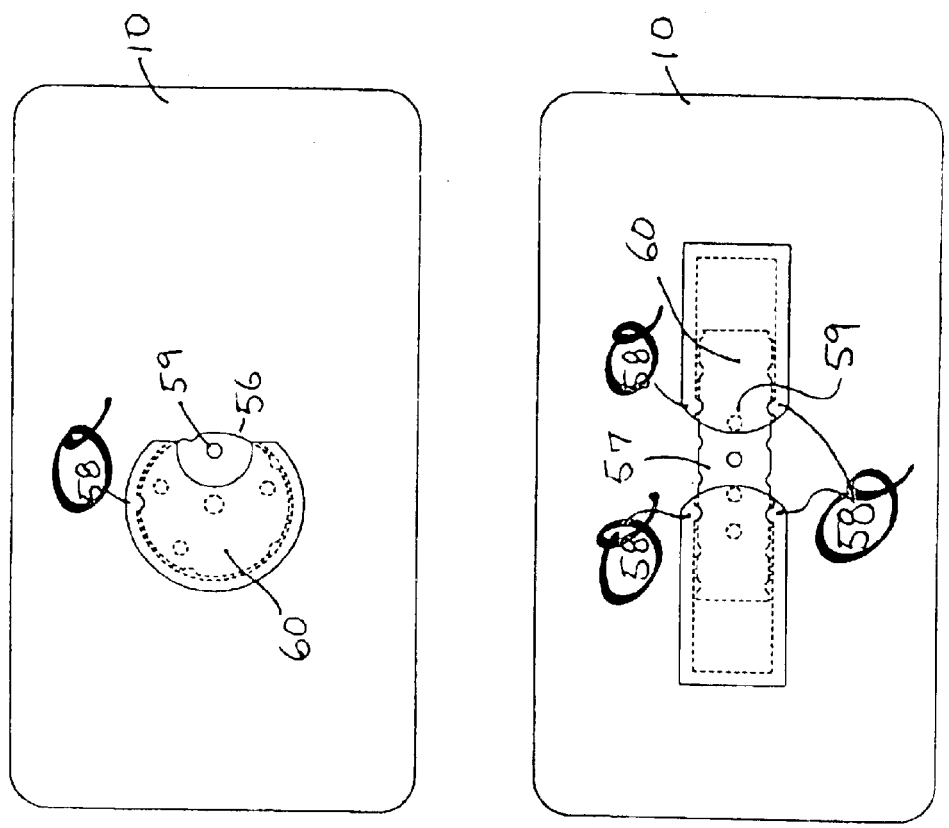
FIG. 24 illustrates structures and mechanisms for providing multiple selectable single lenses.

Devices or microscopes according to this invention can be further enhanced by providing a multiplicity of lenses 59 having different magnifying powers on a selectable carrier. Such a carrier can take the form of a rotatable disk 56 or a sliding member 57 that can be moved into position over the microscopic specimen, as illustrated in FIG. 24. Detents may be used to provide a positive stop for locating the lenses in position, and a blank section 60 on the lens carrier may be provided to enable the lenses to be all rotated or translated under a dust cover for their protection when not in use.

Figure 25:
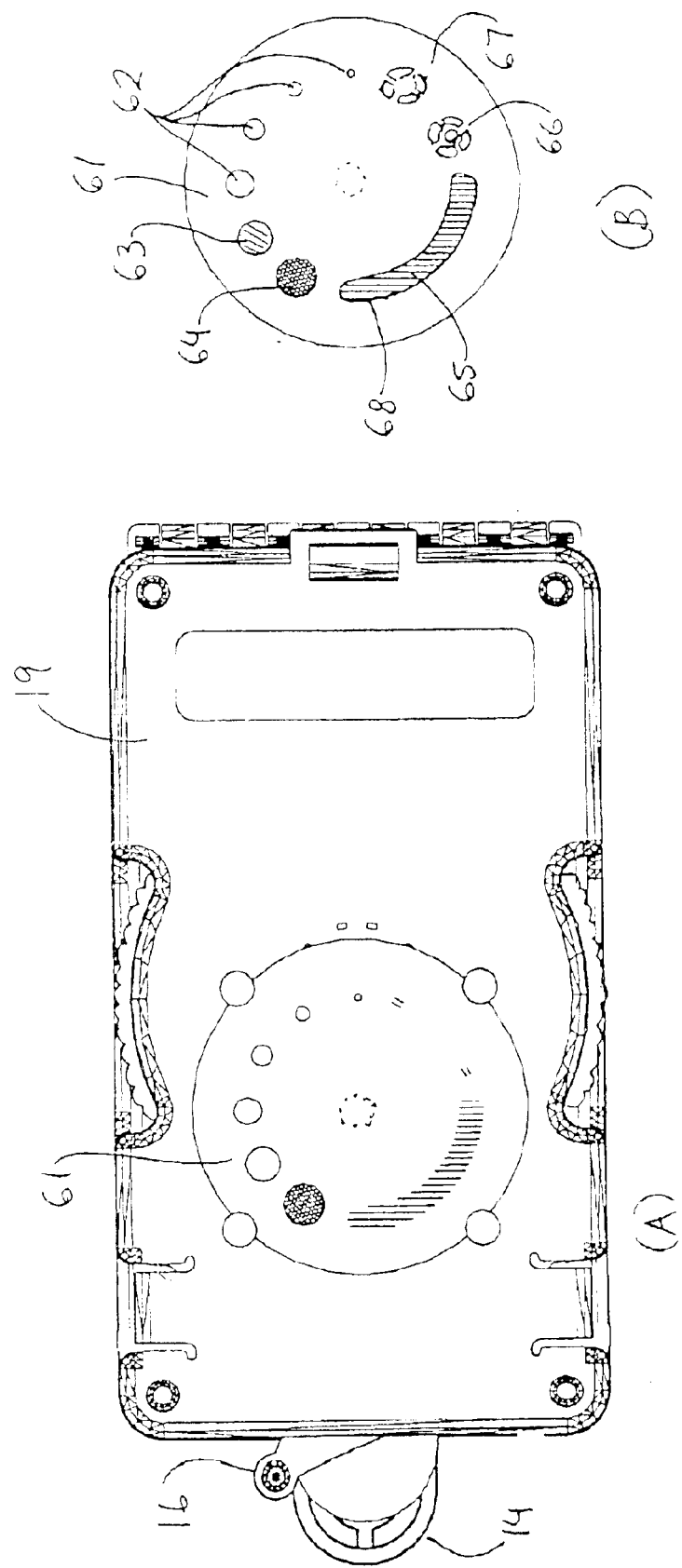
FIG. 25 illustrates a multiple aperture device as used with a particular microscope according to the present invention.

An additional improvement to devices or microscopes according to the present invention can be provided by a multiplicity of apertures included in a rotatable disk or in a sliding carrier. These apertures can be used to control the numerical aperture of the illumination, and thereby control the depth of field, resolution, and image contrast of the microscope. FIG. 25a illustrates one example of a rotatable aperture disk 61 attached to the underside (i.e. the side opposite the lens) of a microscope according to the present invention. As shown in FIG. 25b such a rotatable aperture disk 61 can include apertures 62 of various diameters for illumination numerical aperture control, color filters 63, condenser lenses 64, polarizing filters 65, Rheinberg illumination filter and stop assemblies 66, dark field illumination stops 67, and other illumination control elements. An advantageous method for using a polarizing filter 65 is shown in FIG. 23b. An oblong, curved hole 68 carries, or is covered with, linearly polarizing material 65. First providing a piece of linear polarizing material between the eye and the lens, rotation of the aperture disk through 90 degrees causes the orientation of the polarizing film 65 to rotate through that angle, thereby providing a mechanism to control the polarizer/analyzer angle.

Illumination can be provided by natural sources, or more preferably, by artificial light sources, such as incandescent light bulbs, fluorescent light bulbs, electrically activated phosphors, and solid-state light production devices such as LEDs. LEDs are advantageous to use with microscopes according to the present invention because of their typically narrow-band emission. The narrow band emission provides several benefits. Many microscopic specimens reveal different details under different colors of illumination, so the choice of one color of illumination can reveal details not visible under another color of illumination. Furthermore, the narrow-band emission of LEDs can create strong contrasts in specimens with absorption peaks near to, or overlapping, the LED emission band. In addition, the use of narrow-band illumination substantially eliminates chromatic aberrations and thereby improves image quality.

Figure 26:
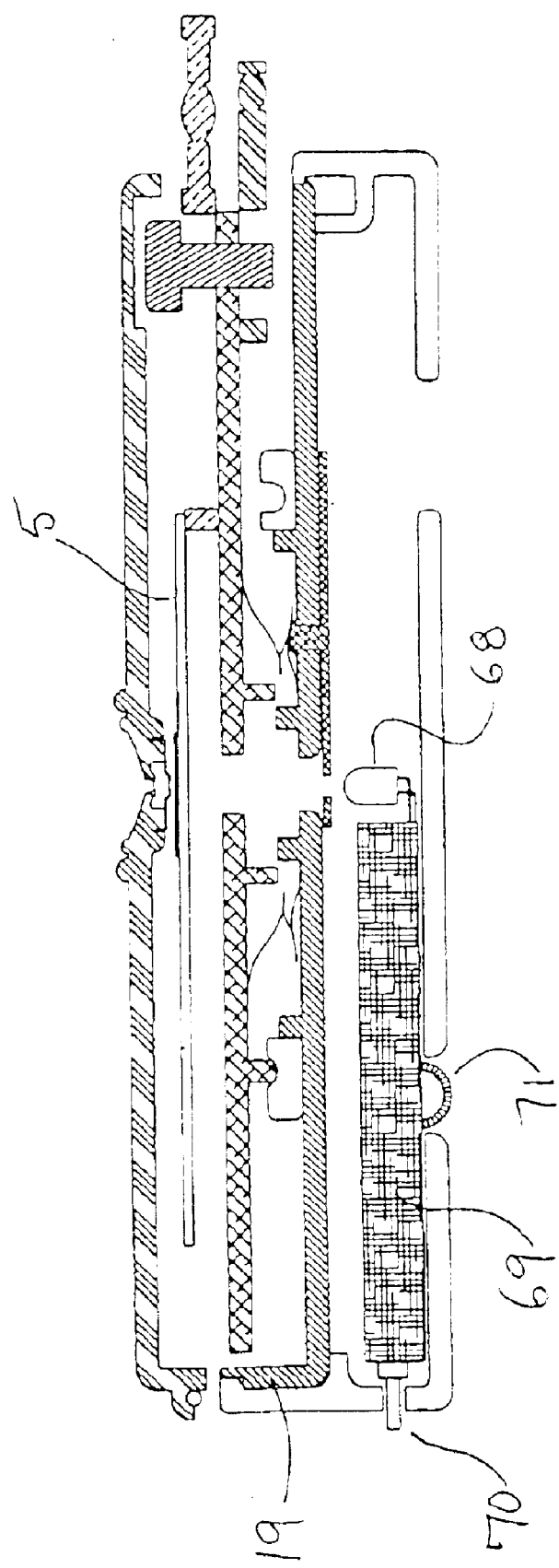
FIG. 26 illustrates an illuminator for microscopes according to the present invention.

Even more preferably, LEDs used for illumination can be battery powered. Even more preferably, an LED based, battery powered illuminator can be made to be attachable to microscopes according to the present invention. This enhancement to microscopes according to the present invention can be further improved by the addition of an on/off switch. Yet greater improvement can be gained by incorporating a multiplicity of LEDs having different colors. An improvement in the simplicity of this device can be gained by utilizing a 'full spectrum' LED that is capable of providing red, green and blue from a single unit. Any of these may be enhanced by the addition of brightness control devices, such as variable resistors, for the control of brightness and blending of colors. FIG. 26 illustrates one example of an LED-based illuminator which can be used with, and/or attached to, the base 19 of one embodiment of microscopes according to the present invention. LED 68 provides illumination to the slide 5. Battery power 69 may be provided, preferably with a power switch 70 and more preferably with a brightness control 71. The LED 68 can be of any variety, including single color, bicolor, tricolor, and full spectrum, including red, green, and blue LED chips in a single unit.

Figure 27:
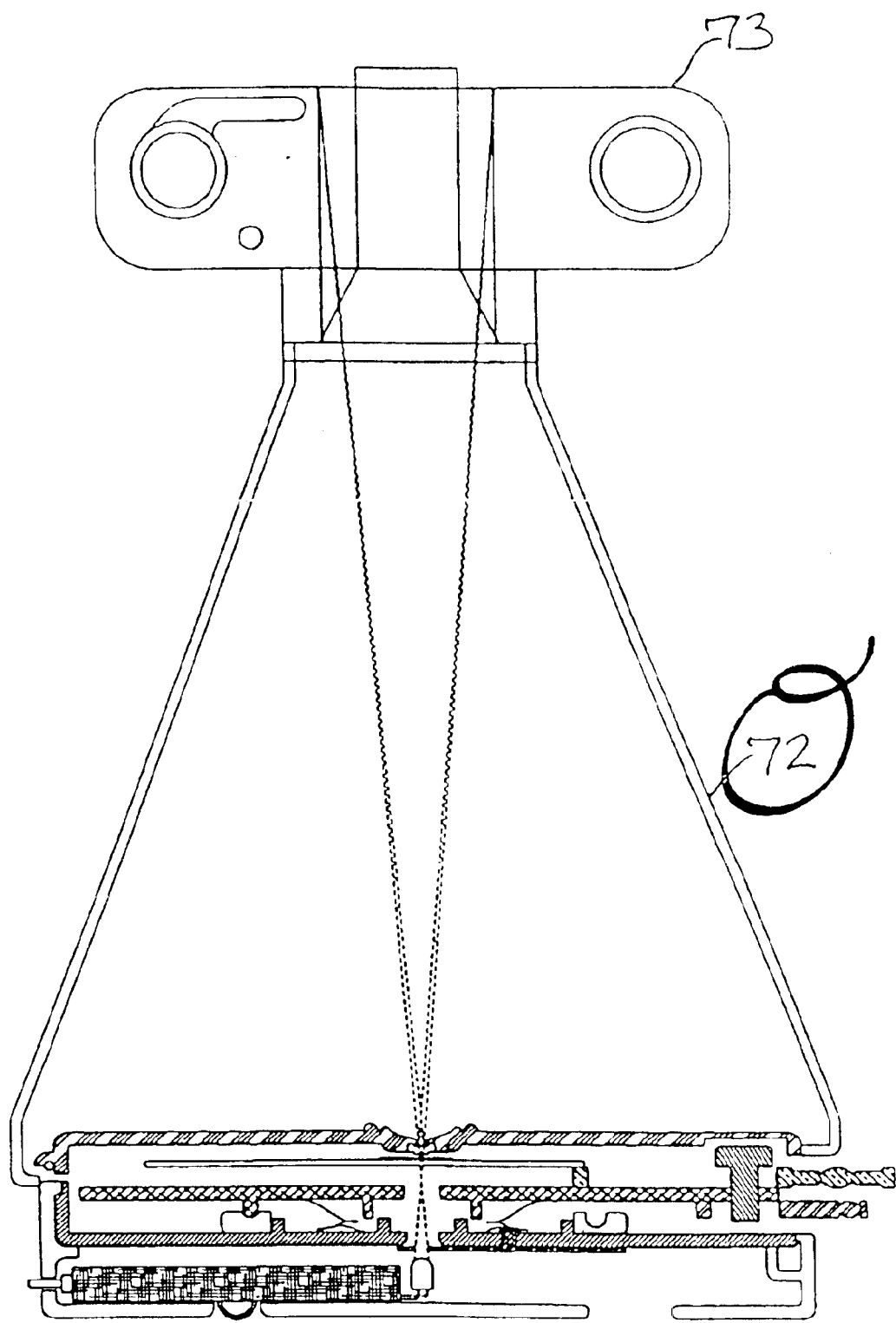
FIG. 27 illustrates one example of a photomicrography adapter for microscopes according to the present invention.

Devices or microscopes according to this invention can be further improved by the addition of a photomicrography adapter structure that attaches to the ocular surface of the microscope and provides a substantially light-tight coupling to a camera. FIG. 27 illustrates one example of a photomicrography adapter attached to a microscope according to the present invention. While the illumination for making the photograph is shown in FIG. 27 as being provided by an LED illuminator, like that shown in FIG. 26, many different illumination sources could be used, including natural light, incandescent light, fluorescent light, photographic flash, or other suitable light source. Additionally, while FIG. 27 illustrates the use of a film still camera 73 with a photomicrography adapter, cameras of other kinds may be used, including movie cameras, video cameras, and digital cameras. In each case the camera lens is removed, if possible, and the image projected by the lens of the microscope is focused onto the imaging surface to record an image. In the case of a film camera, CCD, or electronic camera, a time exposure may be used to obtain sufficient image exposure.

The inventor has also discovered that stereo-photographs of microscopic specimens may be taken in an unconventional manner with microscopes according to the present invention. Stereo-photographs are usually taken by utilizing two camera lenses, separated by a distance, that take two photographs of the same scene from different viewpoints. Alternatively, one camera lens may be used if it is shifted in position between photographs, thereby providing the difference in viewpoint required. The inventor has determined that stereo-photographs of microscopic subjects can be taken using devices and microscopes according to the present invention by providing the illumination from different angles between photographs. This may be accomplished by moving the illumination source with respect to the microscope, by moving the microscope with respect to the illumination source, by using two illumination sources, separated by the desired amount, which are used sequentially, or by using an off-center aperture that can be positioned to provide illumination from one direction, the repositioned to provide illumination from a second direction, or any combination of these methods. The effect of altering the position, or apparent position, of the illumination source is to effectively alter the viewpoint of the image, thereby accomplishing what is required to create a stereo image pair.

Description of a Particular Single Lens Microscope

One single lens microscope according to the present invention is now further disclosed. It is an easy to use, low cost, light weight, and portable microscope with an optimized lens aperture, that is designed for use with conventional microscope slides, and which includes either one lens of a chosen magnifying power or interchangeable lenses of various magnifying powers and/or depths-of-field, and having a light admitting aperture, or a multiplicity of apertures disposed on a moveable aperture diaphragm, for control of illumination collimation. The mechanical and structural components of the microscope can be manufactured from a variety of materials, including metal, wood, plastic, and even paperboard. The preferred material is a high impact injection-molded polymer, such as ABS, polycarbonate, nylon, or glass-fiber reinforced nylon. The optics are durable, inexpensive, and have an optical performance superior to many compound microscopes costing 10 to 20 times as much.

The mechanical design of this microscope has been driven by the goals of facilitating ease of use and of enhancing the safety of use. Design features facilitating ease of use include a simple and precise focus mechanism, a slide guide for precise slide positioning, a slide position lock, superior optics providing a high resolution, high contrast image using available light, and overall dimensions which allow the microscope to be carried in a clothes pocket or suspended from a neck lanyard. Safety features include enclosure of the microscope slide within the microscope body and the use of an ocular that is embedded in a large, relatively flat surface providing eye protection for the user. If the microscope slide should break, its pieces are contained inside of the body of the microscope, protecting the user from contact with the sharp glass fragments. The large ocular-bearing surface acts as a safety shield for the user's eye, providing substantial eye protection as compared to the small, hard metal tube that bears the ocular of a compound microscope. An additional safety feature of the preferred embodiment is its durable, impact resistant design.

Compound microscopes are commonly damaged by 'crashing' an objective lens into a slide, breaking the slide and/or damaging the lens. The design of the microscope protects the lens from direct contact with the slide. Furthermore, the limited range of focusing motion and the flexure of the structural elements of the microscope limit the force which can be applied if the slide is 'crashed' into the lens assembly, greatly reducing the possibility of damaging either the lens or the slide.

Furthermore, the microscope slide is held by a slide holder which protects the slide from mechanical impact and protects the user from direct contact with the sharp edges of the microscope slide, but allows the user to conveniently position the slide. The slide guide, incorporating the slide holder, provides an external handle for positioning the slide through translation and rotation motions about a pivot point. The slide holder is designed to spring closed to securely grip the long edges of slides of roughly 'standard' length, width, and thickness (75 mm×25 mm×1 mm). Commercially available 'standard' microscope slides may vary from the standard dimensions by as much as 5 percent in length and width, and up to 50 percent in thickness. The slide holder is designed to accommodate the whole range of actual 'standard' slide dimensions that may be encountered by the user. Small catches in the slide holder, overlapping the upper surface of the microscope slide, help to prevent the slide from being dislodged from the slide holder should the microscope be dropped or turned upside down. A locking mechanism is provided to allow the user to easily lock the slide guide in any desired position.

The lens of the microscope can be an optimized aperture ball lens, a double convex lens, a meniscus lens, an aspheric lens, a kinoform-corrected aspheric double convex lens, a kinoform-corrected aspheric meniscus, or any combination of these or other suitable lens form. The microscope lens can be manufactured from glass or from polymeric materials by a variety of means, including high precision injection molding. One preferred lens design, disclosed in FIG. 12, has been optimized to obtain high resolution, high magnification, and large back focus.

An aperture optimized ball lens provides a surprisingly good balance of image features. The inventor has discovered that having a single aperture on the eye side of the lens and not including a field-restricting aperture on the object side of the lens-provides a very large field of view. The image of a conventional microscope is vignetted, restricting the user's view to a hard edged circular image. An eye-side aperture optimized ball lens, or other eye-side aperture optimized double convex lens of spheric or aspheric form, is not so limited; such lenses can present a large central image zone having good resolution surrounded by an even larger zone of gradually diminishing resolution. This enables the user to locate the object of interest outside the central field of view and to easily move the object to the center for viewing. Since the optical design of single lens microscopes according to the present invention presents a virtual image to the eye, the image is upright and not reversed left to right. The combination of upright image and large field of view make of single lens microscopes according to the present invention well suited for examining live moving specimens.

Compound microscopes require high light intensity to illuminate the subject because of the large amount of light lost by reflection from lens surfaces and absorbed by the substantial thickness of glass. With only two lens surfaces and minimal lens thickness, an aperture optimized single lens microscope according to the present invention utilizes light with great efficiency, providing optimized image resolution at the maximum aperture diameter to achieve that resolution, enabling bright images to be seen using natural and available light sources as well as artificial illumination.

FIG. 19 illustrates a perspective view of the microscope with cover 10 in the closed and latched configuration. Focus ring 17 is accessible through the oblong slots in base 19 for manual rotation and focus control. Slide guide 14 and lock lever 16 project from the end of the housing so that the user may use them to control the position of the slide and to regulate the clamping force holding the slide guide 14 in position.

FIG. 20 illustrates a perspective view of the microscope in the open configuration for slide loading. Lens 11 and lens retainer 12, mounted in cover 10, are pivoted away from the slide guide 14, providing unobstructed access to the slide guide 14 for slide loading and initial slide positioning. Slide guide 14 is mechanically retained against stage 15 by clamp 13 and lock lever 16, thereby restricting the slide guide 14 movement to rotation and translation in the plane of the upper surface of the stage 15.

FIGS. 21 and 22 illustrate exploded views of the microscope, showing the upper surfaces and the under surfaces, respectively, of the component parts. Cover 10, incorporating a molded cavity to hold lens 11 (illustrated in FIG. 29), forms the upper aperture for lens 11. Lens retainer 12 fits over lens 11 and the edges of the lens retainer 12, bearing outwardly directed locking tabs, are pressed into a corresponding annular groove in cover 10 (illustrated in FIG. 29) to mechanically retain lens 11 and to form the lower aperture of lens 11. Clamp 13 passes through the handle slot of slide guide 14, through slot in stage 15 and through slot in lock lever 16. The flat faces of the clamp 13 shaft, matching the flat sections of the stage 15 slot, prevent rotational movement of the clamp 13. The shaft sides of the clamp 13 between the flat faces are cylindrical, with a diameter equal to the width of the slot in the slide guide 14, to ensure constant two-line contact between the clamp 13 shaft and the slide guide 14 slot. Tabs at the bottom of lock 13 constitute cam-followers for cam surfaces on the underside of lock lever 16, shown in FIG. 22. Slide guide 14, incorporating a handle and a slide holding means, rests on upper surface of stage 15 with clamp 13, in combination with lock lever 17 cam, providing a variable clamping pressure between slide guide 14 and stage 15. Stage 15 incorporates a central illumination aperture, spring 18 attachment bosses and three focus ring 17 cam-follower posts on its underside, shown in FIG. 22. The focus ring 17 bears three identical helical cam surfaces in its upper face which engage the three stage 15 cam-follower posts to provide focusing movement of stage 15 in a direction substantially normal to the large surfaces of both the cover 10 and the base 19. The large surfaces of the cover 10 and the base 19 are disposed in substantially parallel planes when the present invention is in a closed configuration.

The base 19 incorporates a central illumination aperture that is substantially aligned with the cover 10 lens aperture, the lens retainer 12 aperture, and the stage 15 aperture. The diameter of the base 19 illumination aperture is used to control the illumination numerical aperture. A small illumination aperture provides a small illumination numerical aperture, while a large illumination aperture provides larger illumination numerical aperture. The numerical aperture of the illumination affects the image contrast and the ultimate image resolution. In general, small numerical aperture illumination will improve contrast at the expense of image resolution, obtaining the increase in contrast through coherent interference effects. Highly coherent illumination produces a lower image resolution because of collective reinforcement of diffractive interference effects for a large proportion of the light. A larger illumination numerical aperture improves image resolution at the expense of contrast by suppressing the collective reinforcement of diffractive interference effects while increasing scatter. The base 19 aperture diameter is chosen to balance these effects. An alternative embodiment incorporates an aperture selection device in the base 19, such as a circular aperture disc or a linear aperture slider, to provide a variety of apertures to facilitate optimization of illumination properties for different microscopic subjects and illumination conditions. These aperture selection devices may also be combined with color filters, condenser lenses, and other optical elements to provide further control of the conditions of illumination.

Finger pressure catches are incorporated into the sides of the base 19 to secure the base 19 to the cover 10. The overhanging base 19 catch-surfaces engage with corresponding recesses in the cover 10 to hold the unit closed for use. Application of finger pressure to both base 19 catches causes them to deflect inward, disengaging them from the cover 10 recesses and allowing the unit to be opened.

The focus ring 17 fits over the larger circular boss on the upper surface of the base 19. This larger circular boss acts as a simple bushing for the focus ring 17 rotation in the plane of the upper surface of the base 19. The edges of the focus ring 17 are accessible through the curved slots in both long sides of the base 19 so that the user may manually rotate the focus ring 17.

The outer toothed ring of the spring 18 attaches to the outermost, circular-segment-shaped bosses on the underside of stage 15 by pressure fit, with the long straight spring 18 arms passing between the bosses. The inner toothed ring of the spring 18 attaches to the small central ring-shaped boss on the upper surface of the base 19 by pressure fit. The inner circular boss on the underside of the stage 15 acts as a tool to enable the press fit of the inner toothed ring of spring 18 over the spring attachment boss of the base 19. Other structures can be used to attach the spring 18 to the stage 15 and the base 19, such as eliminating the teeth on the spring 18 and including locking tabs on the stage 15 and the base 19 to securely hold the inner and outer rings of the spring 18.

The spring 18 holds the stage 15 cam-follower posts in compression against the corresponding cam surfaces of the focus ring 17, enabling the stage 15 cam-follower posts to remain in constant contact with the focus ring 17 cam surfaces. Spring 18 also serves to mechanically join the stage 15, the focus ring 17, and the base 19.

The user of the microscope moves and positions a microscope slide for viewing by rotating and translating the slide guide 14 around the shaft of the clamp 13. This movement may create torques that could temporarily tilt or twist the stage out of position from its untorqued, static position. The hexagonally symmetric double cantilever shape of spring 18, its large diameter, and its position concentric with the focus ring 17 stabilizes the stage by providing strong resistance to both rotation and translation in the plane of the base 19. The stage 15 is further stabilized by the use of three cam-follower posts which prevent the stage 15 from rocking if one of the posts is a different length. Four or more stage 15 cam-follower posts would not provide this stability. The large diameter of the focus ring 17 and the placement of the two stage 15 cam-follower posts closest to the clamp 13 further improve the stability of the stage 15. These two stage 15 cam-follower posts are symmetrically located at the greatest distance from the midline of the long axis of the stage 15, thereby providing the greatest lever arm length to resist roll around the midline of the long axis of the stage 15. The elements of the focusing mechanism thereby provide smooth and precise linear translation of the stage 15 while suppressing undesirable roll, pitch, and yaw of the stage 15.

The microscope is focused by rotation of the focus ring 17, causing the focus ring 17 cam surfaces to push the stage 15 upward, against the spring 18 force, by means of the cam-follower posts, bringing the slide upward into the focal zone of the lens 11. Rotation of the focus ring 17 in the opposite direction causes the stage 15 to lower out of the lens 11 focus, the spring 18 supplying the force needed to keep the stage 15 cam-follower posts in contact with the focus ring 17 cam surfaces. The slide guide 14, clamp 13, and lock lever 16 are attached to the stage 15 and move with it.

The focus ring 17 has a short post protruding from its edge that limits its rotation by creating a mechanical interference with the inner surfaces of the sides of the base 10. This prevents the focus ring 17 from being rotated through an angle larger than that subtended by the cam surfaces, thereby preventing the cam-follower posts of stage 15 from 'jumping the ends' of the cam surfaces.

Figure 28:
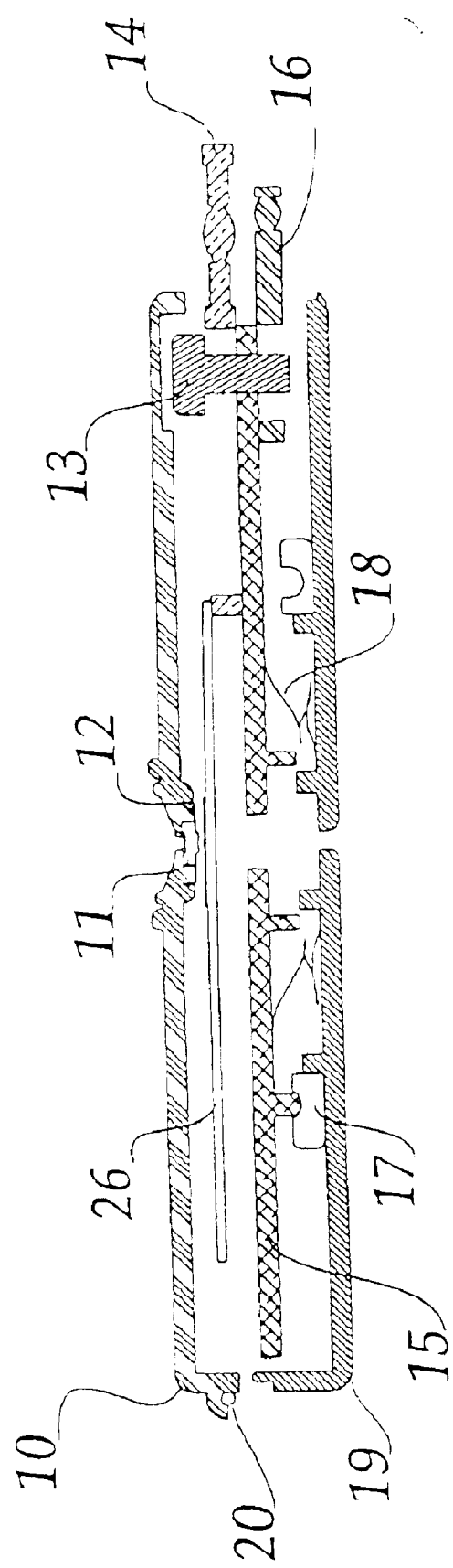
FIG. 28 illustrates a lengthwise cross-section view down the centerline of a particular microscope according to the present invention showing the functional relationship of the component parts.

FIG. 28 illustrates a lengthwise cross-section view down the centerline of the microscope showing the functional relationship of the component parts, particularly the focus mechanism. Since many of the components have holes and openings in the plane of the cross-section, different styles of cross-hatching are used in FIG. 28 to distinguish the components. The cover 10 is shown in the closed and latched position and a microscope slide 26 is shown in the position it is held by the slide guide 14. In use, the lower surface of the lens 11 and the microscopic subject under the cover glass on the slide 26 are separated by the focal length of the lens. The movement of the slide 26 in the direction normal to the plane of the lens is adjusted by the focus means, comprising the base 19, the focus ring 17, the spring 18, and the stage 15. Rotation of the focus ring 17 in the plane of the base 19 causes the focus ring cam surfaces to push the stage 15 cam follower posts upward, carrying the slide guide 14 and the slide 26 with it. Rotation of the focus ring 17 in the opposite direction causes the spring 18 to pull the stage 15 cam follower posts down the focus ring 17 cam surfaces, lowering the stage 15, the slide guide 14, and the slide 26. The spring constant of spring 18 can be easily controlled by selection of material type and the material thickness.

Figure 29:
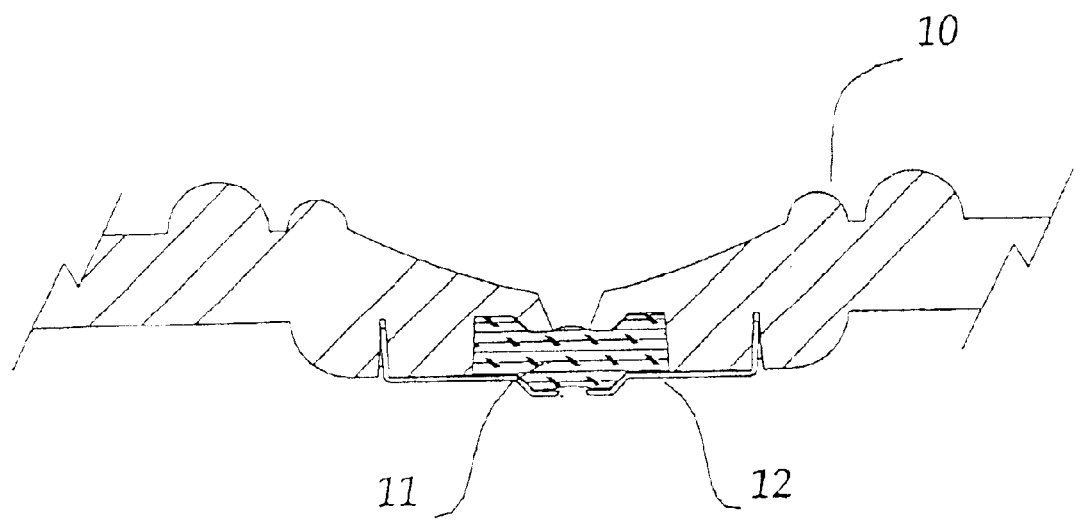
FIG. 29 illustrates a cross-section detail of one example of a particular lens and lens retainer according to the present invention.

FIG. 29 illustrates a cross-section detail of one embodiment of the lens 11 and lens retainer 12. The cover 10 incorporates a molded cavity to hold and position lens 11 and to provide the upper optical aperture for lens 11. Cover 10 lens cavity contains a conical alignment surface that matches the conical alignment surface on the upper face of lens 11. These alignment surfaces center lens 11 on the upper optical aperture in the cover 10. The lens retainer 12 fits over the lens 11, forming the lower optical aperture and mechanically securing the lens to the cover 10. The raised edge of lens retainer 12 bears outwardly directed locking tabs which are pressed into a corresponding annular groove in cover 10, thereby providing mechanical resistance to the removal of the lens retainer 12 from the cover 10.

Figure 30:
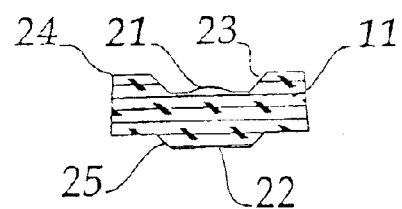
FIG. 30 illustrates an isolated cross-section of a one example of a particular lens according to the present invention.

FIG. 30 illustrates a cross-section detail of one embodiment of the lens 11. Lens 11 has an upper optical surface 21 having the form of a convex asphere with kinoform diffractive aberration correction. The lower optical surface 22 of lens 11 has the form of a concave asphere with kinoform diffractive aberration correction. The combination of optical surfaces 21 and 22 comprise a flat-field apochromatic singlet meniscus lens. Conical alignment surface 23 on the upper surface of lens 11 corresponds to a matching conical alignment surface in the cover 10. Raised flange 24 provides scratch protection for the upper optical surface 21 during handling prior to assembly. The lower optical surface 22 does not need a protective flange since it is already recessed inward from the bottom surface of lens 11. The lower surface of lens 11 bears a conical relief 25 that projects the lower optical surface 22, and its surrounding flat, downward from the inside surface of the cover 10, thereby increasing the clearance between the slide catches on the upper surface of the slide guide 14 and the inside surface of the cover 10.

Figure 31:
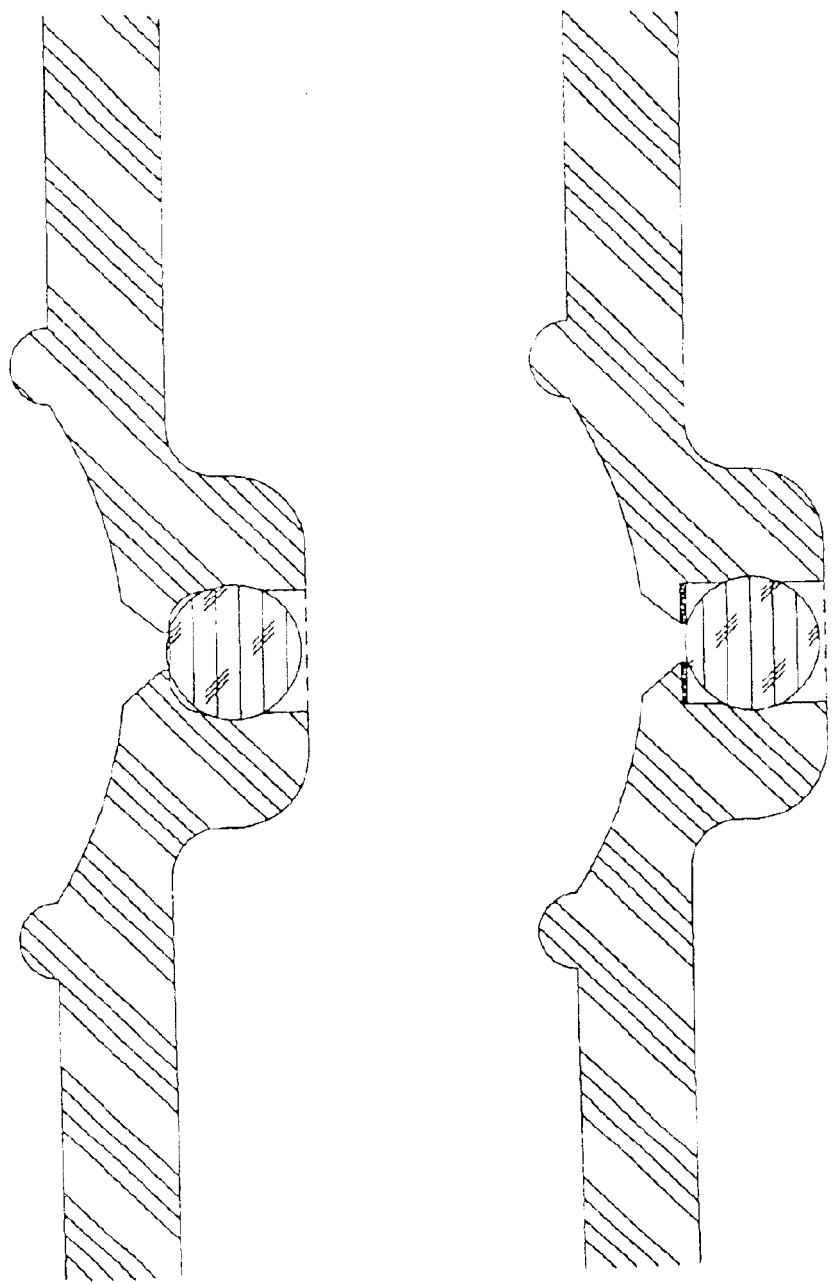
FIG. 31 illustrates methods for mounting a ball lens and providing an aperture.

FIG. 31a, b illustrates a cross-section detail of an aperture optimized ball lens 50 and a structure to hold the ball lens 50 in cover 10. The structure illustrated in FIG. 31a includes an optimized lens aperture 3 formed as an integral part of the cover 10. The ball lens 50 is held by interference fit in a cylindrical, or substantially cylindrical recess 82. The diameter of the ball lens 50 is slightly greater than the diameter of recess 82, thereby providing compression force to retain ball lens 50. The outer surface of the cover 10 may preferably include a recessed area 85 and a raised circular rim 90 to guide the user into the correct eye position with respect to the lens 50. The outer surface may even more preferably include an optical relief 87 to facilitate a wide field of view. FIG. 31b illustrates an alternative embodiment including a separate aperture disk 83 that is inserting in recess 82 prior to the insertion of the ball lens 50. The ball lens 50 is preferably recessed slightly from the bottom edge of recess 82 to provide protection from accidental scratching of the lens by microscope slides or cover glasses. More preferably, the bottom edge of the lens mount 101 can be beveled or radiused to provide a deflecting function for slide edges that may come into contact with the ball lens mount 101.

The preferred material for the cover 10, stage 15, and the base 19 is an opacified high-impact injection-moldable polymer such as ABS or polycarbonate. The preferred material for the clamp 13, slide guide 14, stage 15, lock lever 16, and focus ring 17 is a strong, resilient, low shrinkage injection-moldable polymer such as nylon or polycarbonate. The preferred material for the lens retainer 12 is a thin, strong, corrosion resistant and formable metal such as brass, or stainless steel. The preferred material for the spring 18 is a thin, strong, corrosion resistant hardened metal such as hard brass, phosphor bronze, or hard stainless steel, or a tough, resilient, low creep polymer such as nylon. The preferred material for the hinge pin 20 is a corrosion resistant metal such as brass or stainless steel.

A preferred order of assembly can be used to permanently lock all of the parts together, thereby rendering the microscope resistant to disassembly and to accidental loss of parts. The clamp 13 and locking lever 16 are first used to secure the slide guide 14 to the stage 15. The spring 18 is then pressed in place onto the bosses on the underside of the stage 15. The center of the spring 18 then rests against the small circular boss on the underside of the stage 15. The inner diameter of this boss is slightly larger than the outer diameter of the small circular spring boss on the upper surface of the base 19. The focus ring 17 is positioned over its boss on the base 19 and rotated to provide the lowest stage 15 position. The lock lever 16 is then rotated to point outward from the stage 15 and the long axis of the stage 15 assembly is aligned with the long axis of the base 19. With the lock lever 16 projecting through the wide notch in the end of the base 19 opposite the hinges, the stage 15 assembly is pressed downward onto the base. The small circular boss of stage 15 then presses the inner ring of spring 18 over the spring boss of base 19, mechanically attaching the stage 15 assembly to the base 19, trapping the focus ring 17 in between. The rotation of lock lever 16 is then limited by the edges of the notch at the end of the base 19, thereby preventing the disassembly of the lock lever 16 and the clamp 13. The cover 10 is secured to the base 19 by means of hinge pin 20. Semi-cylindrical end caps on the hinge elements of the cover 10 prevent accidental sliding of the hinge pin 20 out of the hinge.

To use this microscope, the finger pressure catches in the base 19 are depressed inward and the cover 10 is swung open. A microscope slide is then secured in the slide holder section of the slide guide 14 and positioned to center the subject over the illumination aperture in the stage 15. The lock lever 16 may be rotated to apply clamping pressure to hold the position of the slide guide, and then the cover 10 is closed and latched. The outer face of the cover 10 is then turned toward the user's eye and the user sights through the lens 11 and the base 19 illumination aperture toward a light source. The cover 10 lens aperture is then brought up to the eye, with the cover 10 typically resting against the user's eyebrow ridge and cheekbone to provide stability. The focus ring 17 is then rotated to obtain the clearest image and the slide is moved as desired by first releasing some clamping pressure by rotation of the lock lever 13 and then pivoting and sliding the handle of the slide guide 14.

Fiberoptics and Other Uses of Lenses According to the Present Invention

The application of the lens according to the present invention, such as those shown in or similar to FIG. 12, for instance, is not restricted to single lens microscopes. This or similar lens design can be used to advantage for other applications, including fiber optic coupling, medical endoscopes, optoelectronic component coupling, laser diode beam shaping and focusing, optical disk readers, and other applications, without restriction.

Figure 32:
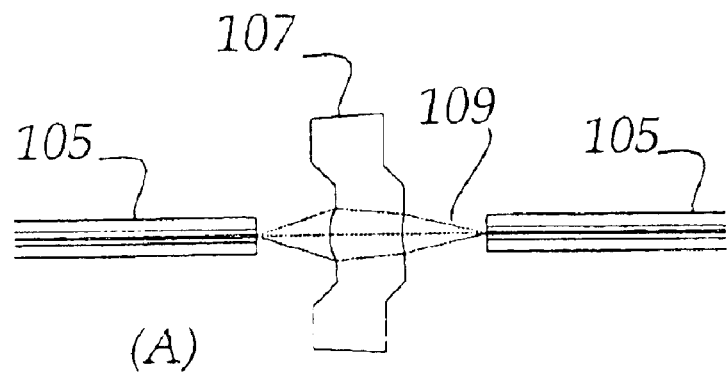
FIG. 32 shows aspects of lenses according to the present invention used in fiberoptics applications.
Figure 32:
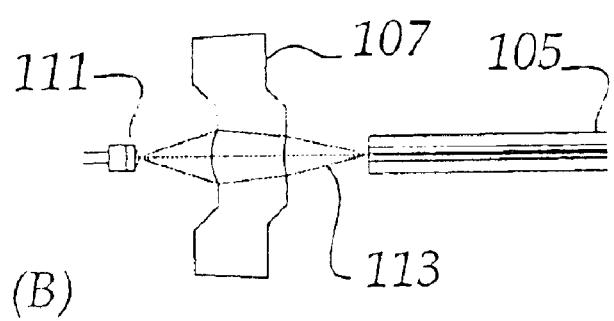
Figure 32:
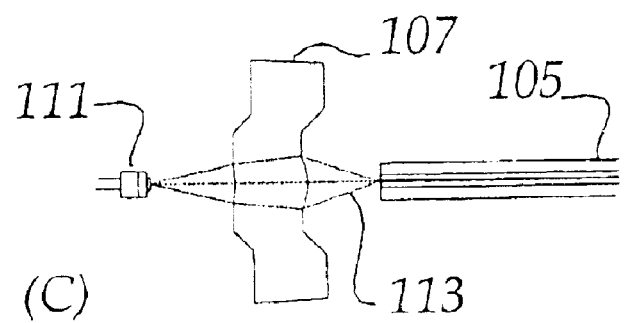

In particular, FIG. 32 illustrates the application of the lenses according to the present invention, such as but not limited to the sort of lens shown in FIG. 12 to several optical fiber applications. FIG. 32a illustrates the lens 107, used to couple two optical fibers 105. Light transmission 109 may proceed from left to right or right to left in this FIG. An advantage of lens 107 over ball lenses for fiber to fiber coupling is that the diffraction-limited focal spot of lens 109 is smaller than that of an equivalent ball lens, enabling higher coupling efficiency between fibers. The kinoform surfaces of lens 107 make this lens substantially achromatic, so that different wavelengths will be focused to the same point, thereby eliminating wavelength dependent fiber numerical aperture effects that can degrade a transmitted signal.

FIG. 32b illustrates the use of lens 107 to couple an optoelectronic device 111 to an optical fiber 105. Two cases can be considered. In the first case the optoelectronic device 111 may be a light emitter, such as a modulated laser diode, and lens 107 collects the light emitted 113 from the light emitter 111, then launches it into the optical fiber 105. In this case light propagates from left to right. In the second case the optoelectronic device 111 may be a light detector, such as photodiode or phototransistor, and the lens 107 collects light emitted 113 from the optical fiber 105 and focuses it on the light detector 111. In this case light propagates from right to left.

FIG. 32c illustrates the same two cases as FIG. 32b, but the orientation of the lens 107 is shown as reversed from that of FIG. 32b.

The particular embodiments of the invention having been described above are not limiting of the present invention, and those of skill in the art can readily determine that additional embodiments and features of the invention are within the scope of the appended claims and equivalents thereto.

What is claimed is:

1. A microscope adapted for viewing an object positioned on a microscope slide, wherein the microscope slide is positioned within a structure, the microscope comprising:
   (a) one and only one lens having a optical axis;
   (b) a structure adapted to support the lens; the structure comprising
      (i) a device adapted to position the microscope slide a specific distance from the lens; and
      (ii) a device adapted to move and position the microscope slide in a plane perpendicular to the optical axis of the lens,
   wherein the structure has substantially no openings between a viewer's eye and the microscope slide and at least partially encloses the microscope slide and the object being viewed when the microscope is in use in order to minimize the possibility of injury to the viewer's eye.

2. The microscope of claim 1, wherein the lens comprises an aperture optimized lens.

3. The microscope of claim 1, wherein the structure substantially encloses the object being viewed.

4. The microscope of claim 1, wherein the structure comprises a hinged box having four sides, a top, and a bottom, wherein the top is adapted to support the lens and the bottom adapted to support the object.

5. The microscope of claim 1, wherein the structure comprises (i) an upper portion defining an optimized aperture containing the lens and (ii) a lower portion defining a surface adapted to position the object.

6. The microscope of claim 1, wherein the device adapted to move and position the microscope slide in a plane perpendicular to the optical axis of the lens comprises an object positioning device and a locking apparatus adapted to lock and hold the device in position relative to the structure.

7. The microscope of claim 6, wherein the locking apparatus comprises a clamp adapted to at least partially restrict translational motion or rotational motion or both of the object positioning device with respect to the structure.

8. The microscope of claim 6, wherein the locking apparatus is selected from the group consisting of magnets, wedges, screws, levers, ratchets, gears, clamps, and cams.

9. The microscope of claim 6, wherein the locking apparatus comprises (i) a cam structure; and (ii) a clamp, wherein tightening of the cam structure causes the clamp to secure the object positioning device.

10. The microscope of claim 6, wherein the strength of the lock provided by the locking apparatus is adjustable.

11. The microscope of claim 1, further comprising a plurality of apertures on the structure, wherein the apertures may be maneuvered for various viewing effects.

12. The microscope of claim 11, wherein the apertures are on a carrier that is a rotatable disk or a sliding member.

13. The microscope of claim 11, wherein the plurality of apertures comprises apertures having features selected from the group consisting of various diameters, filters, colored filters, polarizing filters, Rheinberg illumination filter and stop assemblies, dark field illumination stops, condenser lenses, illumination control elements, and any combination thereof.

14. The microscope of claim 1, further comprising an illumination controlling system.

15. The microscope of claim 14, wherein the illumination is provided by a natural light source or an artificial light source or both.

16. The microscope of claim 15, wherein the light source comprises a source selected from the group consisting of sunlight, firelight, incandescent light, fluorescent light, electrically activated phosphors, photographic flash, solid-state light production devices, LEDs, transmitted light, and reflected light.

17. The microscope of claim 14, wherein the illumination controlling system comprises one or more light admitting apertures in the structure.

18. The microscope of claim 17, wherein the structure comprises (i) a top cover supporting the lens; and (ii) a bottom cover providing the one or more light admitting apertures.

19. The microscope of claim 1, further comprising a device for capturing and reproducing an image of the object being viewed.

20. The microscope of claim 19, further comprising a multiplicity of illumination angles, provided either sequentially or simultaneously, to produce stereoscopic image pairs.

21. The microscope of claim 1, wherein the lens is selected from the group consisting of a ball lens, a glass ball lens, a double convex lens, a meniscus lens, an aspheric lens, a kino-form-corrected aspheric double convex lens, a kino-form-corrected aspheric meniscus, a flat-field apochromatic single-element simple microscope lens, a piano/spheric convex lens, a piano/aspheric convex lens, a piano/diffractive lens, a piano/diffractive-spheric convex lens, a piano/diffractive-aspheric convex lens, a diffractive piano/spheric convex lens, a diffractive piano/aspheric convex lens, a double convex spheric/spheric lens, a double convex spheric/aspheric lens, a double convex aspheric/aspheric lens, a double convex diffractive-spheric/aspheric lens, a double convex spheric/diffractive-aspheric lens, a double convex aspheric/diffractive-aspheric lens, a double convex diffractive-aspheric/diffractive-aspheric lens, a spheric/spheric meniscus lens, a spheric/aspheric meniscus lens, an aspheric/aspheric meniscus lens, a diffractive/diffractive meniscus lens, a diffractive-spheric/spheric meniscus lens, a diffractive-spheric/diffractive-spheric meniscus lens, a diffractive-spheric/aspheric meniscus lens, a spheric/diffractive-aspheric meniscus lens, an aspheric/diffractive-aspheric meniscus lens, and a diffractive-aspheric/diffractive-aspheric meniscus lens.

22. The microscope of claim 21, wherein the lens is fabricated from a gradient refractive or diffractive index material.

23. The microscope of claim 1, further comprising (i) an optimized aperture defining the lens; and (ii) a positionable slide holder;

wherein the positionable slide holder positions the object for viewing substantially parallel to the optimized aperture.

24. The microscope of claim 1, wherein the lens has an optical axis; and further comprising a positionable slide holder;

wherein the positionable slide holder positions the object for viewing substantially perpendicular to the optical axis of the lens.

25. The microscope of claim 24, wherein the positionable slide holder comprises a slide holding portion and a slide positioning portion.

26. The microscope of claim 25, wherein:

(i) the slide holding portion is adapted to hold a slide and comprises a first magnet; and (ii) the slide positioning portion comprises a second magnet on the exterior of the structure;

wherein movement of the slide positioning portion causes the slide holding portion to track the movement.

27. The microscope of claim 25, wherein (i) the slide holding portion is adapted to hold a slide and is at least partially surrounded by the structure; and (ii) the slide positioning portion is a handle that extends at least partially outside the structure;

wherein movement of the slide positioning portion causes relative movement of the slide holding portion.

28. The microscope of claim 25, wherein the slide holding portion has a slide gripping frame section for receiving a microscope slide.

29. The microscope of claim 25, wherein the slide positioning portion comprises a handle section having a long axis adapted to provide linear translation in the direction its long axis and rotation about a fixed point.

30. The microscope of claim 24, wherein the positionable slide holder comprises:

(i) a frame having a length and a width slightly larger than a microscope slide, the length and width forming a base adapted to receive a slide, (ii) the frame having one or more raised edges approximating the thickness of a microscope slide, (iii) the one or more raised edges having one or more catch surfaces adapted to engage upper surfaces of a microscope slide in order to retain the microscope slide in the positionable slide holder; and (iv) a handle extending from the frame for manipulating the position of the frame.

31. The microscope of claim 1, further comprising a focusing system adapted to focus an image of the object for a viewer by altering the spatial relation of the lens and the object being viewed with respect to one another.

32. The microscope of claim 31, wherein the focusing system comprises a mechanical connection selected from the group consisting of a focus ring, a screw-jack, a scissors jack, a rack and pinion, a cam and follower mechanism, a simple lever, a compound lever, a pantographic linkage, a four-bar linkage, one or more inflatable vessels or bladders, one or more pistons and cylinders, a cable and pulley arrangement, motor driven actuators, piezoelectric actuators, inchworm drives, an electromechanical mechanism, a pneumatic mechanism, a hydraulic mechanism, a piezoelectric mechanism, and any combination thereof.

33. The microscope of claim 31, wherein the focusing system comprises:
(i) a stage adapted to display a slide, wherein the slide can be positioned on the stage without altering the position of the slide with respect to a focal plane of the lens; and
(ii) a mechanical connection adapted to move the stage in relation to the lens.

34. The microscope of claim 33, wherein the structure further comprises a tension mechanism between the stage and the mechanical connection in order to provide contact between the stage and the mechanical connection.

35. The microscope of claim 34, wherein the tension mechanism provides stabilization to resist displacement of the stage in a plane substantially parallel to the focal plane of the lens.

36. The microscope of claim 31, wherein the focusing system prevents contact between the lens and the object being viewed.

37. The microscope of claim 31, wherein the focusing system comprises:
(i) a focus ring to maneuver the object with respect to the lens; and
(ii) an aperture selection device comprising a plurality of apertures adapted to allow varying amounts of light to enter the structure.

38. The microscope of claim 31, wherein the image is focused by moving the stage along the direction of the optic axis of the lens by a cam and follower mechanism.

39. The microscope of claim 38, wherein the structure comprises a top cover and a bottom cover,
wherein the stage is positioned between the top cover and the bottom cover and further comprises an upper surface and a lower surface, the upper surface providing a surface for viewing and the lower surface comprising a plurality of cam follower elements,
wherein the focus mechanism is positioned between the stage and the bottom cover, and further comprises an upper surface and a lower surface, the upper surface having a plurality of ramped cam surfaces corresponding to the plurality of cam follower elements,
wherein interaction between the cam follower elements and the ramped cam surfaces allows focusing and prevents rocking of the stage.

40. The microscope of claim 38, comprising three cam follower elements.

41. A microscope support structure, comprising:
(a) one and only one aperture optimized lens;
(b) a slide positioning mechanism adapted to move and position the microscope slide in a plane perpendicular to the axis of the lens; and
(c) a focusing system adapted to focus an image of an object;
wherein the support structure defines a substantially enclosed space adapted to receive a slide for viewing.

42. The microscope support structure of claim 41, further comprising:
(i) a top cover supporting the lens; and
(ii) a base adapted to support a microscope slide,
wherein the top cover and the base are at least partially separable from one another in order to allow access to a microscope slide.

43. The microscope support structure of claim 42, wherein the at least partial separability between the top cover and base is provided by a connection means selected from the group consisting of the top cover and base being completely removable from one another, the top cover being adapted to slide off the base, and the top cover and base being hinged.

44. A microscope support structure comprising:
a substantially enclosed space adapted to receive a slide for viewing, the microscope support structure comprising:
one and only one lens;
a slide positioning mechanism;
a focusing system adapted to focus an image of an object;
a top cover supporting the lens; and
a base adapted to support a microscope slide,
wherein the top cover and the base are hinged and wherein the top cover is separated from the base by rotation about the hinge.

45. The microscope support structure of claim 44, further comprising a coupling mechanism adapted to couple a non-hinged edge of the top cover to a non-hinged edge of the base to provide the substantially enclosed space.

46. The microscope support structure of claim 45, wherein the coupling mechanism is selected from the group consisting of a lock, a catch, a hook and lip mechanism, and finger pressure catches.

47. A pocket-sized microscope comprising a housing supporting a single lens, the microscope having no other lens, the housing adapted to retain and enclose a microscope slide for viewing and safety, the housing adapted to substantially enclose a microscope slide, the microscope further comprising features that position the microscope slide a specific distance from the lens and the move and position the microscope slide in a plane perpendicular to the axis of the lens.

48. A single lens microscope for viewing at least one object, comprising:
(a) a structure maintaining an aperture optimized lens; and
(b) a base, comprising:
(i) a slide positioning device adapted to move and position the microscope slide in a plane perpendicular to the axis of the lens,
(ii) a focusing mechanism, and
(iii) a light receiving controller,
wherein the structure and the base are opposable and adapted to at least partially enclose the at lease one object being viewed.

* * * * *